US011132122B2

(12) United States Patent
Kasatani

(10) Patent No.: US 11,132,122 B2
(45) Date of Patent: Sep. 28, 2021

(54) HANDWRITING INPUT APPARATUS, HANDWRITING INPUT METHOD, AND NON-TRANSITORY RECORDING MEDIUM

(71) Applicant: Kiyoshi Kasatani, Kanagawa (JP)

(72) Inventor: Kiyoshi Kasatani, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/839,276

(22) Filed: Apr. 3, 2020

(65) Prior Publication Data

US 2020/0326840 A1 Oct. 15, 2020

(30) Foreign Application Priority Data

Apr. 11, 2019 (JP) ............................ JP2019-075825
Mar. 23, 2020 (JP) ............................ JP2020-051620

(51) Int. Cl.
*G06F 3/0488* (2013.01)
*G06F 3/0482* (2013.01)
*G06F 3/0484* (2013.01)

(52) U.S. Cl.
CPC ........ *G06F 3/04883* (2013.01); *G06F 3/0482* (2013.01); *G06F 3/04845* (2013.01); *G06F 3/04847* (2013.01); *G06F 2203/04808* (2013.01)

(58) Field of Classification Search
CPC .................................................. G06F 3/04883
USPC ......................................................... 345/173
See application file for complete search history.

(56) References Cited

U.S. PATENT DOCUMENTS 9,237,246 B2 1/2016 Kemmochi et al.
9,769,183 B2 9/2017 Kanematsu et al.
10,397,638 B2 8/2019 Kanematsu et al.
10,419,618 B2 9/2019 Kato et al.
10,572,779 B2 2/2020 Kemmochi et al.
10,782,844 B2 9/2020 Farouki
2014/0354695 A1* 12/2014 Sakai .................... G06F 3/0485 345/650
2015/0154444 A1 6/2015 Kurita
2016/0308979 A1 10/2016 Kemmochi et al.
2016/0315935 A1 10/2016 Tsukuda et al.
2017/0310830 A1 10/2017 Kemmochi et al.
(Continued)

FOREIGN PATENT DOCUMENTS

EP 3343342 7/2018
JP 2015-230497 12/2015
(Continued)

OTHER PUBLICATIONS

Extended European Search Report for 20168338.0 dated Sep. 4, 2020.
Taiwanese Office Action for 109111656 dated May 13, 2021.

*Primary Examiner* — Long D Pham
(74) *Attorney, Agent, or Firm* — IPUSA, PLLC

(57) ABSTRACT

A handwriting input apparatus includes processing circuitry configured to cause control data with respect to an input device to be stored in association with identification information of the input device received from the input device; and reflect the control data associated with the identification information of the input device received from the input device in stroke data that is handwritten on the basis of a position of the input device in contact with a touch panel and displayed, and display information based on the stroke data on a display unit.

16 Claims, 59 Drawing Sheets

(56) References Cited

U.S. PATENT DOCUMENTS

| | | | |
|---|---|---|---|
| 2018/0082663 | A1 | 3/2018 | Kemmochi et al. |
| 2018/0232138 | A1 | 8/2018 | Kanematsu et al. |
| 2018/0234295 | A1 | 8/2018 | Koyama et al. |
| 2018/0292951 | A1 | 10/2018 | Kato et al. |
| 2018/0300543 | A1 | 10/2018 | Kawasaki et al. |
| 2018/0338065 | A1 * | 11/2018 | Zyskind ................ G06F 3/0442 |
| 2020/0045176 | A1 | 2/2020 | Fujii et al. |

FOREIGN PATENT DOCUMENTS

| | | |
|---|---|---|
| JP | 2018-026185 | 2/2018 |
| TW | I511028 | 12/2015 |
| TW | I609317 | 12/2017 |

* cited by examiner

FIG.9

| | DEFINED CONTROL ITEM EXAMPLE | DEFINED CONTROL DATA EXAMPLE |
|---|---|---|
| 401 | SELECTABLE CANDIDATE DISPLAY TIMER | TimerValue="500ms" |
| 402 | SELECTABLE CANDIDATE DELETE TIMER | TimerValue="5000ms" |
| 403 | HANDWRITING OBJECT APPROXIMATE RECTANGULAR AREA | Horizontal="50%" Vertical="80%" |
| 404 | ESTIMATED WRITING DIRECTION AND CHARACTER SIZE DETERMINATION CONDITIONS | MinDiff="10mm" MinTime="1000ms" DefDir="Horizontal" |
| 405 405a | SMALLER CHARACTER | FontStyle="MING BODY" FontSize="25mm" |
| 405 405b | MEDIUM-SIZE CHARACTER | FontStyle="MING BODY" FontSize="50mm" |
| 405 405c | LARGER CHARACTER | FontStyle="GOTHIC BODY" FontSize="100mm" |
| 406 | CONNECTING LINE DETERMINATION CONDITION | MinLenLongSide="100mm" MaxLenShortSide="50mm" MinOverlapRate="80%" |
| 407 | ENCLOSING LINE DETERMINATION CONDITION | MinOverLapRate="100%" |

FIG.10

HANDWRITING RECOGNITION DICTIONARY DATA EXAMPLE

| | BEFORE CONVERSION | AFTER CONVERSION | PROBABILITY |
|---|---|---|---|
| 604 | ぎ ~H1 | 議 ~C1 | 0.55 |
| | ぎ ~H1 | 技 ~C2 | 0.45 |
| 605 | ぎし ~H2 | 技士 ~C3 | 0.55 |
| | ぎし ~H2 | 技師 ~C4 | 0.45 |
| 606 | ぎじ | 疑似 | 0.30 |
| | ぎじ | 議事 | 0.25 |
| | ぎじ | 擬似 | 0.20 |
| | ぎじ | ギジ | 0.15 |

FIG.11

CHARACTER STRING CONVERSION DICTIONARY DATA EXAMPLE

| | BEFORE CONVERSION | AFTER CONVERSION | PROBABILITY |
|---|---|---|---|
| 607 | 議 ~C11 | 議事録 ~C12 | 0.95 |
| 607 | 技 ~C13 | 技量試 ~C14 | 0.85 |
| 608 | 技士 | 技士会 | 0.65 |
| 608 | 技師 | 技師長 | 0.75 |
| 609 | ぎじ | 議事録 | 0.95 |
| 609 | ぎじ | 技術士 | 0.85 |
| 609 | ぎじ | 技術 | 0.75 |
| 610 | 擬似 | 擬似相関 | 0.55 |
| 610 | 擬似 | 擬似的 | 0.50 |
| 610 | 擬似 | 擬似乱数 | 0.40 |

FIG.12

PREDICTIVE CONVERSION DICTIONARY DATA EXAMPLE

| | BEFORE CONVERSION | | AFTER CONVERSION | | PROBABILITY |
|---|---|---|---|---|---|
| 611 | 議事録 | C21 | 議事録の送付先 | C22 | 0.65 |
| 611 | 技量試 | C23 | 技量試を決裁 | C24 | 0.75 |
| 612 | 技士 | | 技士会連合会 | | 0.95 |
| 612 | 技術 | | 技師エンジニア | | 0.85 |
| 613 | 技術 | | 技術雑誌社 | | 0.65 |
| 614 | 擬似 | | 擬似体験 | | 0.45 |
| 614 | 擬似 | | 擬似逆行列 | | 0.35 |

FIG.13A

OPERATION COMMAND DEFINITION DATA EXAMPLE
(FOR A CASE WHERE THERE IS NO SELECTED OBJECT)

701 (C31, C32, C33)
Name="議事録テンプレートを読み込む" String="議事録" String="テンプレート"
Command="ReadFile https://%username%:%password%@server.com/template/minutes.pdf"

702 (C34, C32, C35)
Name="議事録フォルダーに保存する" String="議事録" String="保存"
Command="WriteFile https://%username%:%password%@server.com/minutes/%machinename%_%yyyy-mm-dd%.pdf"

703 (C37, C38, C39)
Name="印刷する" String="印刷" String="プリント"
Command="PrintFile https://%username%:%password%@server.com/print/%machinename%-"%yyyy-mm-dd%.pdf"

709 (C40, C41, C42)
Name="細ペン" String="細" String="ペン" Command="ChangePen fine"

710 (C43, C44, C42)
Name="太ペン" String="太" String="ペン" Command="ChangePen bold"

711 (C45, C45, C42)
Name="マーカー" String="マーカー" String="ペン" Command="ChangePen marking"

712 (C46, C47, C48, C49)
Name="テキスト方向を揃える" String="テキスト" String="向き" String="方向"
Command="AlignTextDirection"

FIG.13B

| | |
|---|---|
| | SYSTEM DEFINITION DATA EXAMPLE |
| 704 | username="taro.tokkyo" |
| 705 | password="x2PDHTyS" |
| 706 | machinename="My-Machine" |

FIG.14

| | OPERATION COMMAND DEFINITION DATA EXAMPLE (FOR A CASE WHERE THERE IS SELECTED OBJECT(S)) |
|---|---|
| 707 | Name="DELETE" Group="Edit" Command="Delete" |
| 707 | Name="MOVE" Group="Edit" Command="Move" |
| 707 | Name="ROTATE" Group="Edit" Command="Rotate" |
| 707 | Name="SELECT" Group="Edit" Command="Select" |
| 708 | Name="MAKE THICKER" Group="Decorate" Command="Thick" |
| 708 | Name="MAKE THINNER" Group="Decorate" Command="Thin" |
| 708 | Name="MAKE LARGER" Group="Decorate" Command="Large" |
| 708 | Name="MAKE SMALLER" Group="Decorate" Command="Small" |
| 708 | Name="DRAW UNDERLINE" Group="Decorate" Command="Underline" |

FIG.15

| | HANDWRITING INPUT STORED DATA EXAMPLES |
|---|---|
| 801 | DataId="1" Type="Stroke" PenId="1" Color="Black" Width="1 px" Pattern="Solid" Angle="0 dig" StartPoint="x1,y1" StartTime="yyyy-mm-ddThh:mm:ss.sss+09:00" EndPoint="xn,yn" EndTime="yyyy-mm-ddThh:mm:ss.sss+09:00" Point="x1,y1,x2,y2,x3,y3,...,yn,yn" Pressure="p1,p2,p3,...pn" |
| 802 | DataId="2" Type="Stroke" PenId="1" Color="Black" Width="1 px" Pattern="Solid" Angle="0 dig" StartPoint="x1,y1" StartTime="yyyy-mm-ddThh:mm:ss.sss+09:00" EndPoint="xn,yn" EndTime="yyyy-mm-ddThh:mm:ss.sss+09:00" Point="x1,y1,x2,y2,x3,y3,...,yn,yn" Pressure="p1,p2,p3,...pn" |
| 803 | DataId="3" Type="Group" PenId="2" Color="Black" Width="1 px" Pattern="Solid" Angle="90 dig" StartPoint="x1,y1" StartTime="yyyy-mm-ddThh:mm:ss.sss+09:00" EndPoint="xn,yn" EndTime="yyyy-mm-ddThh:mm:ss.sss+09:00" DataId="1" DataId="2" |
| 804 | DataId="4" Type="Text" PenId="3" Color="Black" Width="10 px" Pattern="Solid" Angle="180 dig" StartPoint="x1,y1" StartTime="yyyy-mm-ddThh:mm:ss.sss+09:00" EndPoint="xn,yn" EndTime="yyyy-mm-ddThh:mm:ss.sss+09:00" FontName="IPA Gothic" FontSize="50.0 pt" Text="What you dream" |
| 805 | DataId="5" Type="Text" PenId="4" Color="Black" Width="1 px" Pattern="Solid" Angle="270 dig" StartPoint="x1,y1" StartTime="yyyy-mm-ddThh:mm:ss.sss+09:00" EndPoint="xn,yn" EndTime="yyyy-mm-ddThh:mm:ss.sss+09:00" FontName="IPA Gothic" FontSize="10.0 pt" Text="I want to be an innovator" |

FIG.16A

| | |
|---|---|
| | CONTROL DATA EXAMPLES |
| 901 | PenId="1" Color="Black" Width="1 px" Pattern="Solid"" Angle="0 dig" |
| 902 | PenId="2" Color="Black" Width="1 px" Pattern="Solid" Angle="90 dig" |
| 903 | PenId="3" Color="Black" Width="10 px" Pattern="Solid" Angle="180 dig" |
| 904 | PenId="4" Color="Black" Width="10 px" Pattern="Dot" Angle="270 dig" |

HANDWRITING INPUT APPARATUS, HANDWRITING INPUT METHOD, AND NON-TRANSITORY RECORDING MEDIUM

BACKGROUND OF THE INVENTION

1. Field of the Invention

The present invention relates to a handwriting input apparatus, a handwriting input method, and a non-transitory recording medium.

2. Description of the Related Art

In a common computer-controlled whiteboard apparatus or an application capable of receiving a handwriting input (hereinafter referred to as a handwriting input apparatus), an input device is limited to a pen or a finger. For this reason, operation menus are provided for the user to use, in a switching manner, a pen function menu to change the colors of characters and an editing function menu to delete characters and so forth. Normally, color, thickness, and so forth can be selected with the use of the pen function menu; deleting, moving, size changing, rotating, cutting, copying, pasting, and so forth can be selected with the use of the editing function menu (for example, see Japanese Laid-Open Patent Application No. 2018-026185).

Japanese Laid-Open Patent Application No. 2018-026185 discloses a handwriting input apparatus where a menu of color setting, transparency setting, thickness setting, line type setting, stamp setting, and operation setting are displayed in response to pressing of a pen button by the user.

SUMMARY OF THE INVENTION

According to an aspect of the present invention, a handwriting input apparatus includes processing circuitry configured to cause control data with respect to an input device to be stored in association with identification information of the input device received from the input device; and reflect the control data associated with the identification information of the input device received from the input device in stroke data that is handwritten on the basis of a position of the input device in contact with a touch panel and displayed, and display information based on the stroke data on a display unit.

Other objects, features, and advantages of the present invention will become more apparent from the following detailed description when read in conjunction with the accompanying drawings.

BRIEF DESCRIPTION OF THE DRAWINGS

FIG. 9 depicts an example of defined control data;

FIG. 10 depicts an example of dictionary data of a handwriting recognition dictionary unit;

FIG. 11 depicts an example of dictionary data of a character string conversion dictionary unit;

FIG. 12 depicts an example of dictionary data of a predictive conversion dictionary unit;

FIGS. 13A and 13B depict examples of operation command definition data and system definition data stored by an operation command definition unit;

FIG. 14 depicts an example of operation command definition data for a case where there is a selected object selected with the use of a handwriting object;

FIG. 15 depicts handwriting input stored data stored by a handwriting input storage unit;

FIGS. 16A and 16B depict diagrams for illustrating pen ID control data stored by a pen ID control data storage unit;

DETAILED DESCRIPTION OF THE EMBODIMENTS

There has been a problem in that it is difficult to implement handwriting input in different settings depending on pens. For example, a plurality of users may use a handwriting input apparatus with pens, but it may be not possible for each user to perform handwriting with different settings depending on the pens.

In view of the above-described problem, an aspect of the present invention is intended to provide a handwriting input apparatus capable of implementing handwriting input with different settings depending on pens.

A handwriting input apparatus can be provided according to the aspect of the present invention with which it is possible to implement handwriting in different settings depending on pens.

According to an aspect of the present invention, an object is to allow a handwriting input apparatus to correctly identify handwriting objects such as handwriting characters handwritten by users who are in various directions with respect to the handwriting input apparatus so that also the handwriting objects handwritten by these users are in various directions with respect to the handwriting input apparatus accordingly.

According to the aspect of the present invention, the users are allowed to input angle information that allows the handwriting input apparatus to correctly identify the handwriting objects handwritten in the various directions in consideration of the various directions in which the handwriting objects are oriented because of being handwritten by the users who are in the various directions with respect to the handwriting input apparatus.

As examples of embodiments of the present invention, a handwriting input apparatus and a handwriting input method implemented by the handwriting input apparatus will be described with reference to drawings.

First Embodiment

<Comparison Example for Handwriting Input Apparatus>

For convenience of describing a handwriting input apparatus according to a first embodiment of the present invention, operation procedures of a handwriting input apparatus in a comparison example will be briefly described first.

Figure 1A:
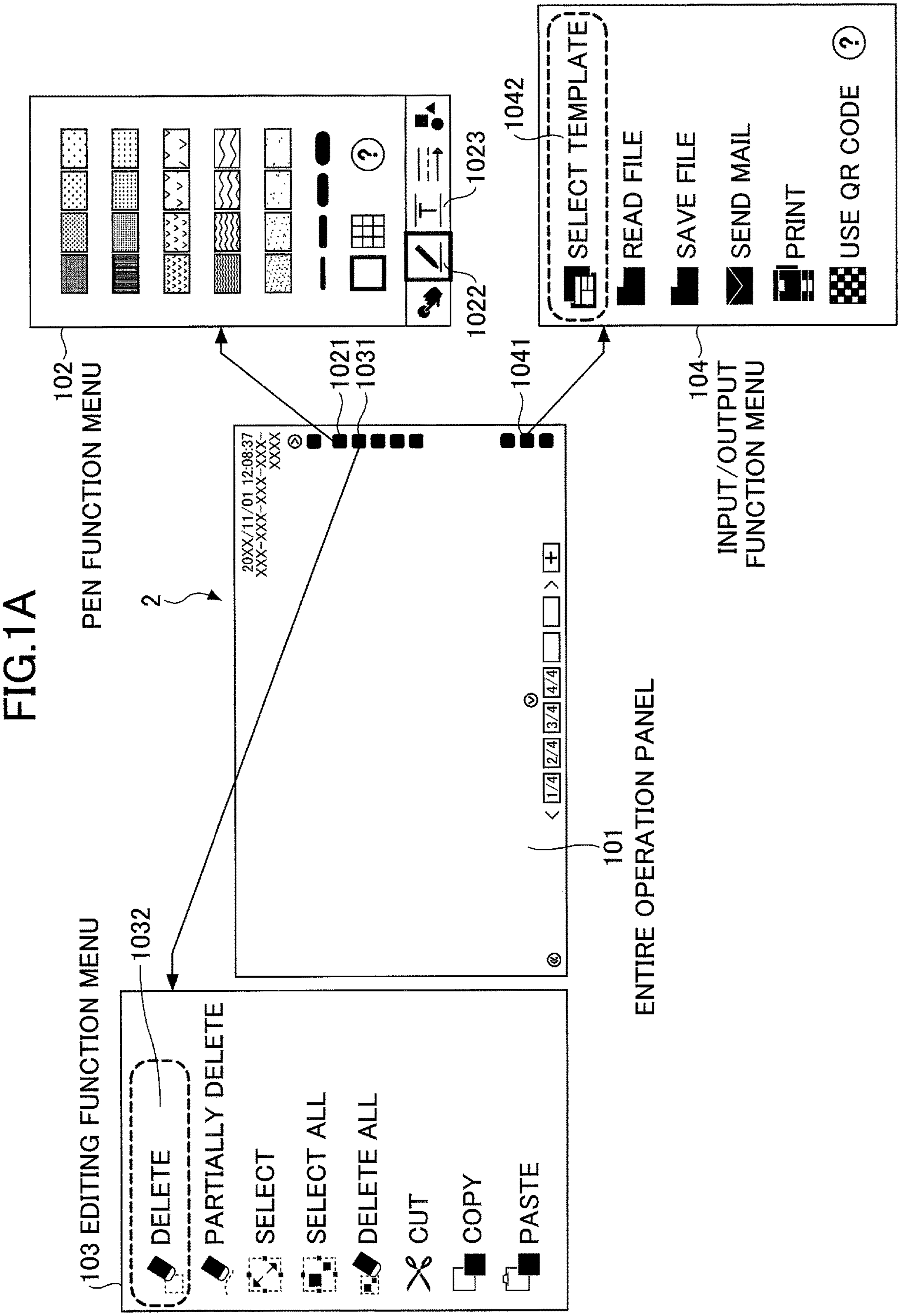
FIGS. 1A and 1B depict a comparison example of an operation menu displayed by a handwriting input apparatus.

FIG. 1A depicts an operation menu displayed by a handwriting input apparatus in a comparison example. A pen function menu button 1021 for displaying a pen function menu 102, an editing function menu button 1031 for displaying an editing function menu 103, and an input/output function menu button 1041 for displaying an input/output function menu 104 are displayed on an operation panel 101.

The pen function menu 102 allows the user to select a pen color, thickness, and operation mode. The pen function menu 102 includes a handwriting input mode button 1022 and a neat writing input mode button 1023. The editing function menu 103 allows the user to delete, select, cut, copy, or paste an object; and the input/output function menu 104 allows the user to read a template, read a file, save a file, perform printing, and so forth.

When the handwriting input mode button 1022 is pressed, information (coordinates of a pen) obtained from handwriting by the user is input as is. In response to the neat writing input mode button 1023 being pressed, text data is displayed, the text data being obtained as a result of characters, numerals, symbols, English characters, or the like, handwritten by the user, being identified and converted (into a neat version).

As an example of an operation procedure of a handwriting input apparatus in the comparison example, an operation procedure to be performed after the user handwrites straight lines or curved lines (hereinafter, referred to as strokes), to delete the strokes and newly write strokes with the pen will now be described. Unless otherwise specified, pressing with the pen means pressing with the tip of the pen.

(A1) The user presses the editing function menu button 1031 with the pen to cause the editing function menu 103 to be displayed.

(A2) In response to the user pressing a "delete" button 1032 of the editing function menu 103, the handwriting input apparatus automatically deletes the editing function menu 103.

(A3) In response to the user writing a line with the pen across a plurality of strokes to be deleted, the strokes are deleted.

(A4) The user then presses the pen function menu button 1021 with the pen.

Through the procedure, the strokes to be deleted are deleted and thus, the user is allowed to newly handwrite a stroke with the pen. Thus, according to the comparison example, as many as four steps are used for simply deleting strokes. Despite differences in the number of steps and screen transitions, many handwriting input apparatuses in the comparison example have similar user operating systems. Such a user operating system is generally common to computer products and is based on a user operating system for invoking a function a user wishes to use. According to such a user operating system, because the user cannot use a function without knowing how to invoke a function, it is a common practice for a handwriting input apparatus to, with the use of a tutorial function or a help function, provide the user with information for invoking a function.

Similarly, if the user wishes to input or output information such as a filing or printing information, the user causes the input/output function menu 104 to be displayed. For example, to read a template, the following procedure is performed.

(B1) In response to the user pressing the input/output function menu button 1041 with the pen, the input/output function menu 104 is displayed.

(B2) In response to the user pressing a "Template Selection" button 1042 in the input/output function menu 104 with the pen, the input/output function menu 104 is deleted and a template selection window is displayed.

(B3) The user presses left and right buttons with the pen to scroll a displayed image until a desired template is displayed.

(B4) In response to the user pressing the desired template with the pen, the template is read and the template selection window is deleted.

Similarly, in order to convert user-written, for example, characters to text data, the following procedure is performed.

(C1) The user presses the pen function menu button 1021 with the pen.

(C2) The user presses the neat writing input mode button 1023 with the pen.

Figure 1B:
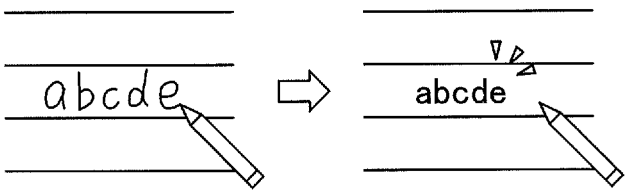

In the state of the neat writing input mode button 1023 having been pressed, handwriting characters "abcde" are converted to text data of "abcde", as depicted in FIG. 1B. The text data is displayed in fonts and thus, is of a neat version of characters.

Thus, a step-by-step user-operated procedure is used in the handwriting input apparatus in the comparison example. In other words, because the user operating system guiding the user to proceed to the next step in an explanatory manner is basically used, it is difficult for the user to intuitively operate the handwriting input apparatus.

<Example of Actual Use of Handwriting Input Apparatus>

A handwriting input apparatus 2 may be used not only in a state of being installed perpendicular to a floor, but also in a state of being held horizontally installed on a floor.

Figure 2A:
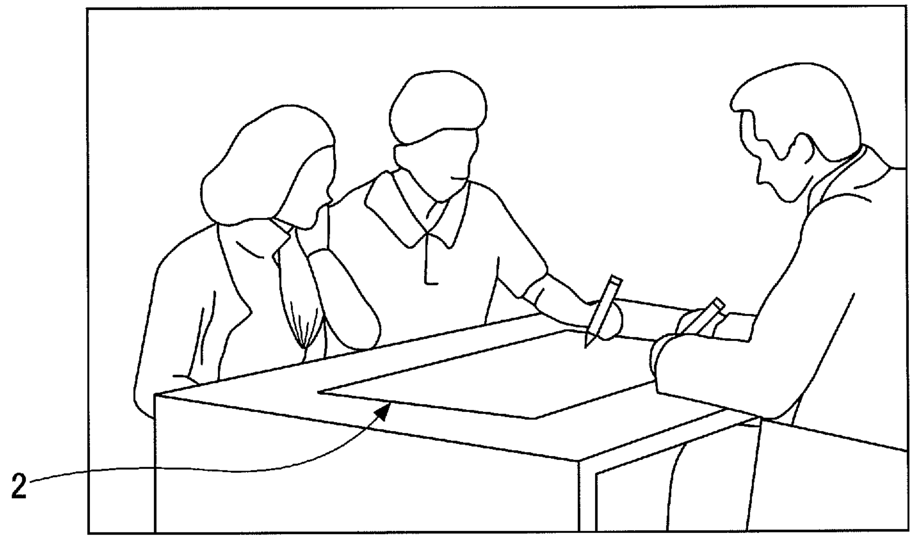
FIGS. 2A and 2B depict an example of using a handwriting input apparatus.
Figure 2B:
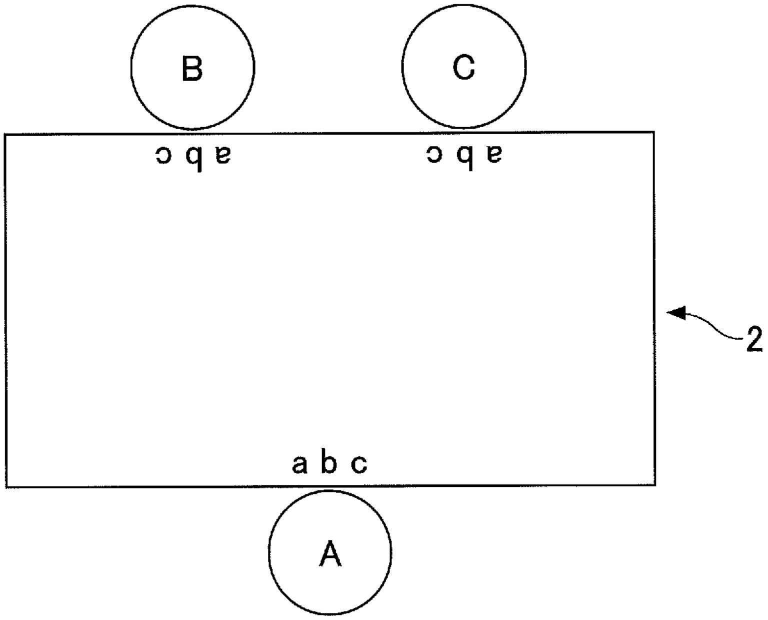

FIGS. 2A and 2B depict diagrams for illustrating an example of a use of the handwriting input apparatus 2. In FIG. 2A, the handwriting input apparatus 2 is installed on a desk with the display facing up (such a type of installation is referred to as flat installation). Users who sit on chairs and face each other around the handwriting input apparatus 2 (face-to-face in FIG. 2A) perform handwriting operations.

In such a case, normally, the user handwrites, for example, each character in the vertical direction in which the user can normally read the character (see FIG. 2B). However, in the neat writing input mode, handwriting recognition can be properly performed only when the user at a predetermined location (in a predetermined direction viewed from the handwriting input apparatus 2) handwrites characters. Assuming that the user A is a user at the predetermined location as depicted in FIG. 2B, the handwriting, for example, characters written by the user B and the user C are not correctly identified by the handwriting input apparatus 2 because the characters "abc" handwritten by the user B or C are inverted with respect to the characters "abc" handwritten by the user A.

This is because a common handwriting recognition engine can correctly identify characters only when handwriting of each character is in a predetermined direction. Correctly identifying means that identifying can be implemented with a practical recognition rate (or identification rate). A predetermined direction is, for example, the vertical direction when the handwriting input apparatus 2 is installed perpendicular to a floor (the vertical in a state of FIG. 5, (a), which will be described later).

When the handwriting input apparatus 2 is used in a state of being installed perpendicular to the floor (in a state of being mounted on a wall or a stand, etc.), it is unlikely that any inconvenience will occur because the user does not perform handwriting upside down. However, in the example of use as depicted in FIGS. 2A and 2B, when viewed from the handwriting recognition engine, the characters of the user B and the user C are rotated 180 degrees (inverted or upside down), and it is impossible to identify the handwriting characters correctly.

Depending on a computer or an operating system, an entire screen page can be rotated 90 degrees by a predetermined operation (e.g., "Ctrl"+"Alt"+"arrow" keys). In other words, the user can rotate the entire screen page for the handwriting recognition engine to correctly identify a handwriting object, for example, characters handwritten by the user. However, this method does not allow for handwriting character recognition, e.g., identifying handwriting, for example, characters written by mutually opposing users as in the case of FIGS. 2A and 2B.

<Outline of Processing of Handwriting Input Apparatus of Embodiment>

Therefore, in a handwriting input apparatus 2 according to the present embodiment, handwriting input can be implemented with a different setting depending on each user.

Figure 3:
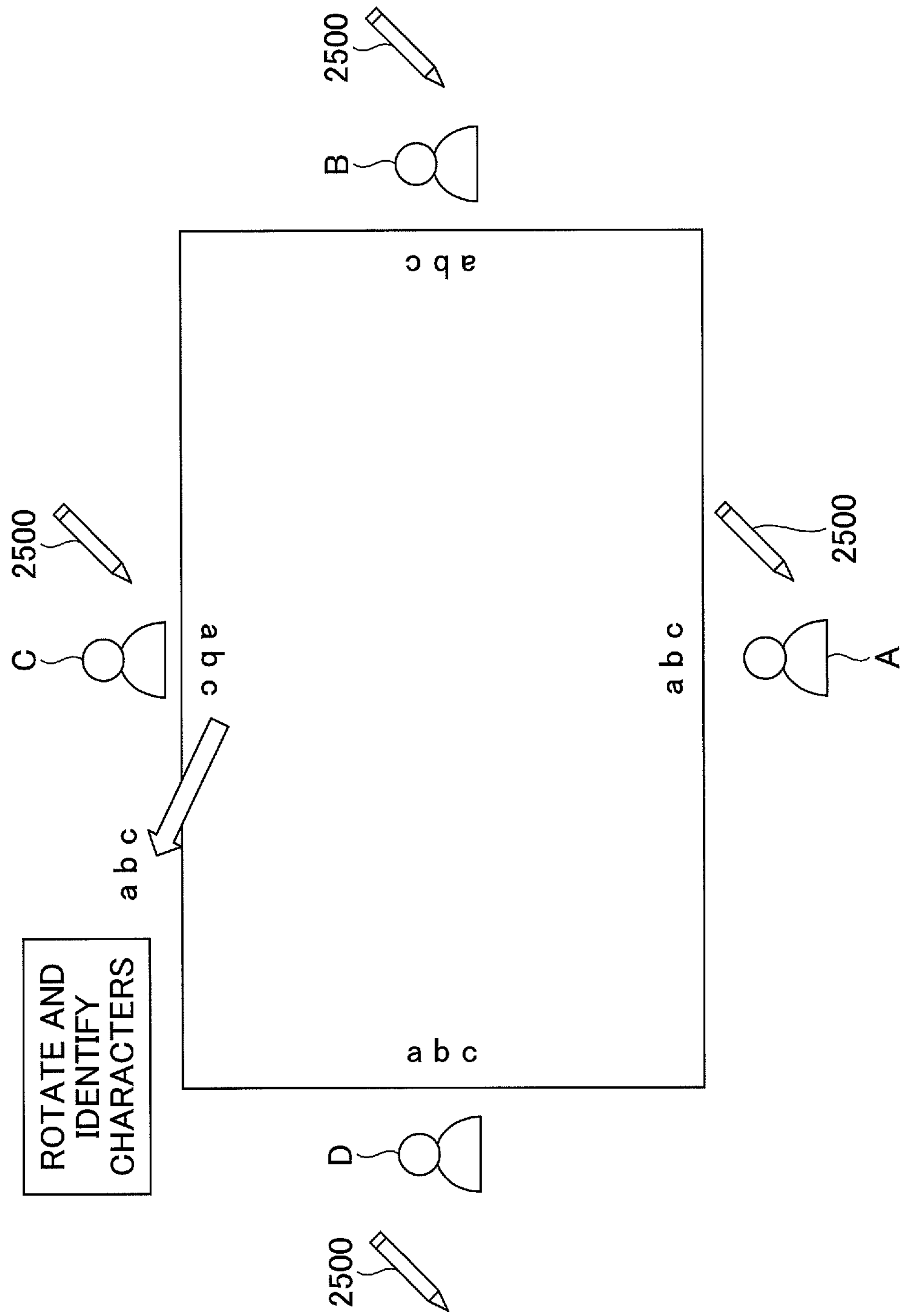
FIG. 3 depicts an outline of processing of the handwriting input apparatus.

FIG. 3 depicts an example of a diagram illustrating an outline of a process of the handwriting input apparatus 2. There are four users (A-D) around (four sides) of the handwriting input apparatus 2. For convenience of illustration, it is assumed that:

the angle of, for example, characters when handwriting from A's position is 0 degrees;

the angle of, for example, characters when handwriting from B's position is 90 degrees;

the angle of, for example, characters when handwriting from C's position is 180 degrees; and the angle of, for example, characters when handwriting from the position of Mr. D is 270 degrees.

Each user holds a pen 2500 and performs handwriting with the pen 2500. The pen 2500 stores identification information (hereinafter referred to as a pen ID). Using this ID, the handwriting input apparatus 2 associates a pen ID with corresponding angle information with respect to the direction in which the user handwrites characters. That is, when a user starts using the handwriting input apparatus 2, the user inputs angle information (90 degrees, 180 degrees, or 270 degrees) when the user handwrites, for example, characters using the pen 2500 (when the degree is 0, no input is needed). As will be described later in detail, it is possible, through a simple operation, to input the angle information with respect to, for example, character writing and cause the pen ID to be associated with the angle information.

In FIG. 3, each user handwrites, for example, characters "abc". The handwriting input apparatus 2 identifies the angle information using the pen ID of the pen 2500 that has handwritten "abc", rotates the handwriting "abc" with the angle information in a clockwise direction, and then performs character recognition. The rotation is performed internally, and the displayed, for example, characters are not actually rotated. Internally means that the handwriting input apparatus 2 processes the data. However, an operation guide that will be described later is displayed after being rotated counterclockwise. FIG. 3 depicts an example in which the characters "abc" written by the user C are rotated 180 degrees (not displayed because the characters are rotated only internally). Because the characters are oriented upright in FIG. 3 by the rotation (the angle becomes 0 degrees), the handwriting input apparatus 2 can correctly identify the characters.

As described above, according to the present embodiment, handwriting input can be implemented with a different setting (in this case, different angle information) depending on a pen (or a user). Therefore, even if users around the handwriting input apparatus 2 in a flat installation handwrite, for example, characters, the characters can be correctly identified by the handwriting input apparatus 2. In addition to angle information described above, also the font thickness, color, texture, and so forth can be set for each user.

<Terminology>

As an "input device", anything with which it is possible to perform handwriting onto a touch panel can be used. Examples include a pen, a human finger, a human hand, and a rod-like member. In addition, line-of-sight input may be made possible.

Stroke data denotes data that indicates a freely handwritten line. Stroke data has a set of successive points and may be interpolated as appropriate.

An operation command denotes a command that indicates an instruction to execute a specific process prepared to operate the handwriting input apparatus 2. According to the present embodiment, for example, operation commands of an editing system, a modifying system, an input/output system, and a pen state are examples of an operation command. In fact, all commands for operating the handwriting input apparatus 2, such as image rotation by 180 degrees, page switching, setting of an operation mode, and so forth are included in examples of an operation command.

Control data with respect to an input device is information concerning how to process stroke data input by the input device. Examples include color, thickness, pattern, and angle. In the present embodiment, control data with respect to an input device is described as pen ID control data. The pen ID control data is reflected in stroke data.

Information based on stroke data denotes information generated based on the stroke data. Examples include a candidate to which a handwriting recognized object may be converted and an operation command described above.

<Example of Pen's Appearance>

Figure 4:
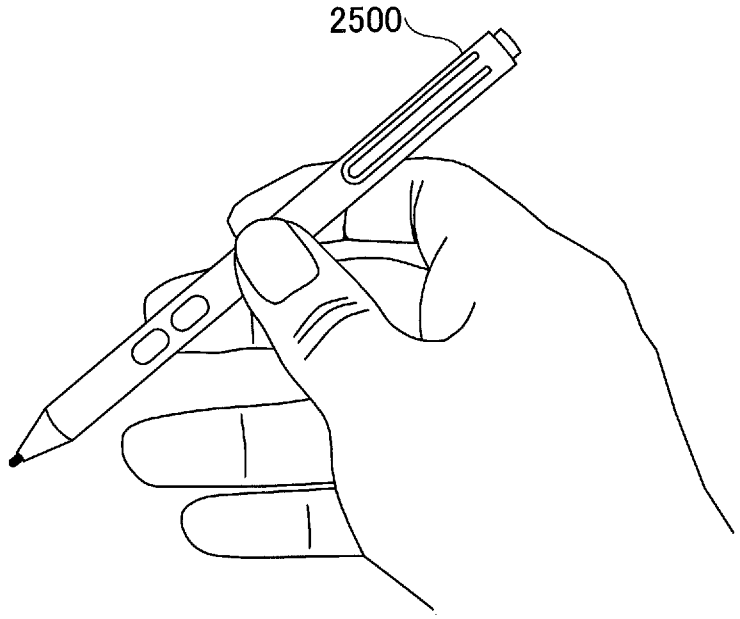
FIG. 4 depicts a perspective view of an example of a pen.

FIG. 4 depicts an example of a perspective view of a pen 2500. FIG. 4 depicts an example of a multifunctional pen 2500. The pen 2500, which has a built-in power supply and can transmit an instruction to the handwriting input apparatus 2, is called an active pen (a pen without power supply is called a passive pen). The pen 2500 of FIG. 4 has one physical switch on the tip of the pen, one on the rear end of the pen, and two on sides of the pen. The tip switch is for writing, the rear-end switch is for deleting, and the side switches are for assigning user functions. The pen 2500 of the present embodiment is provided with a non-volatile memory and stores a pen ID that is unique among pens.

Operation steps of a user who operates the handwriting input apparatus 2 can be reduced by using such a pen provided with these switches. Such a pen provided with switches is mainly an active pen. However, even a passive pen with no built-in power supply of an electromagnetic induction type can generate power with the use of only an LC circuit, and thus, also such an electromagnetic-induction passive pen can be used as a pen provided with switches described above. Other than such an electromagnetic-induction passive pen, also a pen provided with optical, infrared, or capacitance switches is a type of an active pen.

The user may assign one of the side switches to a pen function menu 102 and the other to an editing function menu 103. While it is convenient for the user to cause the pen function menu 102 or the editing function menu 103 to be displayed by pressing the corresponding side button of the active pen 110, there is no significant reduction of troublesomeness to the user in causing the pen function menu 102 or the editing function menu 103 to be displayed by pressing the side button each time of changing an object the user wishes to process.

By using the pen rear-end deleting switch, the above-mentioned steps of (A1), (A2), and (A4) can be omitted, and by using the pen rear-end instead of the pen tip in step (A3), it is possible to reduce the number of steps from 4 to 1 for the deleting procedure.

The hardware configuration of the pen 2500 is the same as a common control system including a communication function and a microcomputer. The coordinate input method of the pen 2500 may be an electromagnetic induction method or an active electrostatic coupling method, for example. The pen 2500 may have a writing pressure detection function, a tilt detection function, and/or a hover function (indicating a cursor before the pen touches the touch panel), for example.

<Overall Configuration of Handwriting Input Apparatus>

Figure 5:
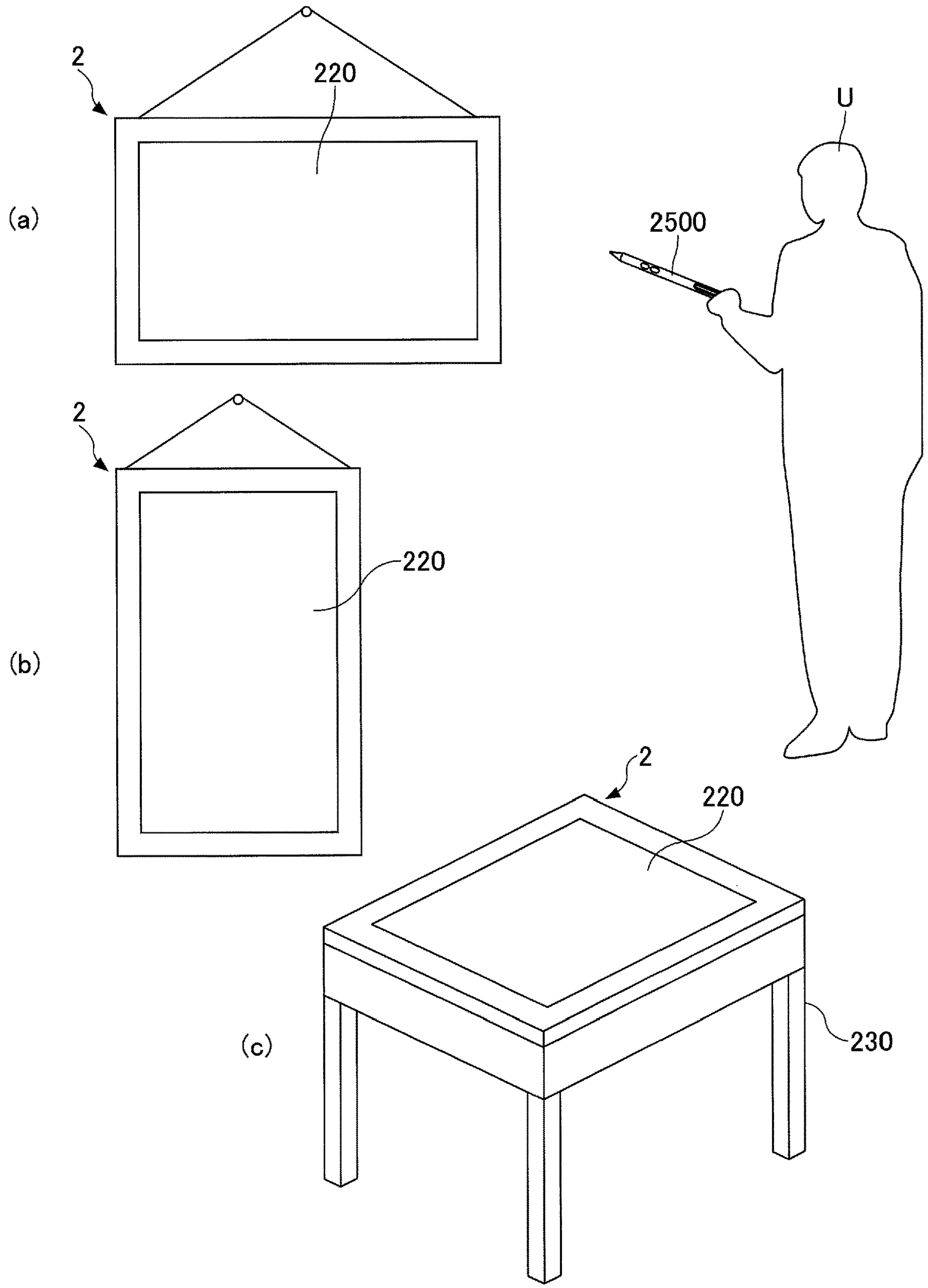
FIG. 5 depicts examples of overall views of the handwriting input apparatus.

An overall configuration of the handwriting input apparatus 2 according to the present embodiment will now be described with reference to FIG. 5. FIG. 5 depicts a diagram for illustrating an overall configuration of the handwriting input apparatus 2. In FIG. 5, (a), as an example of the handwriting input apparatus 2, the handwriting input apparatus 2 is used as an electronic blackboard that is horizontally long and is vertically suspended on a wall.

As depicted in FIG. 5, (a), a display 220 as an example of a display device is installed in the handwriting input apparatus 2. The user U handwrites (i.e., inputs or draws), for example, characters onto the display 220 using the pen 2500.

FIG. 5, (b) depicts a handwriting input apparatus 2 used as an electronic blackboard that is vertically long and is vertically suspended on a wall.

FIG. 5, (c) depicts a handwriting input apparatus 2 in flat installation on a desk 230. Because the handwriting input apparatus 2 is about 1 cm thick, it is not necessary to adjust the height of the desk even if such a type of handwriting input apparatus 2 is placed flat on an average desk. In addition, such a type of handwriting input apparatus 2 can be easily moved.

<Hardware Configuration of Apparatus>

Figure 6:
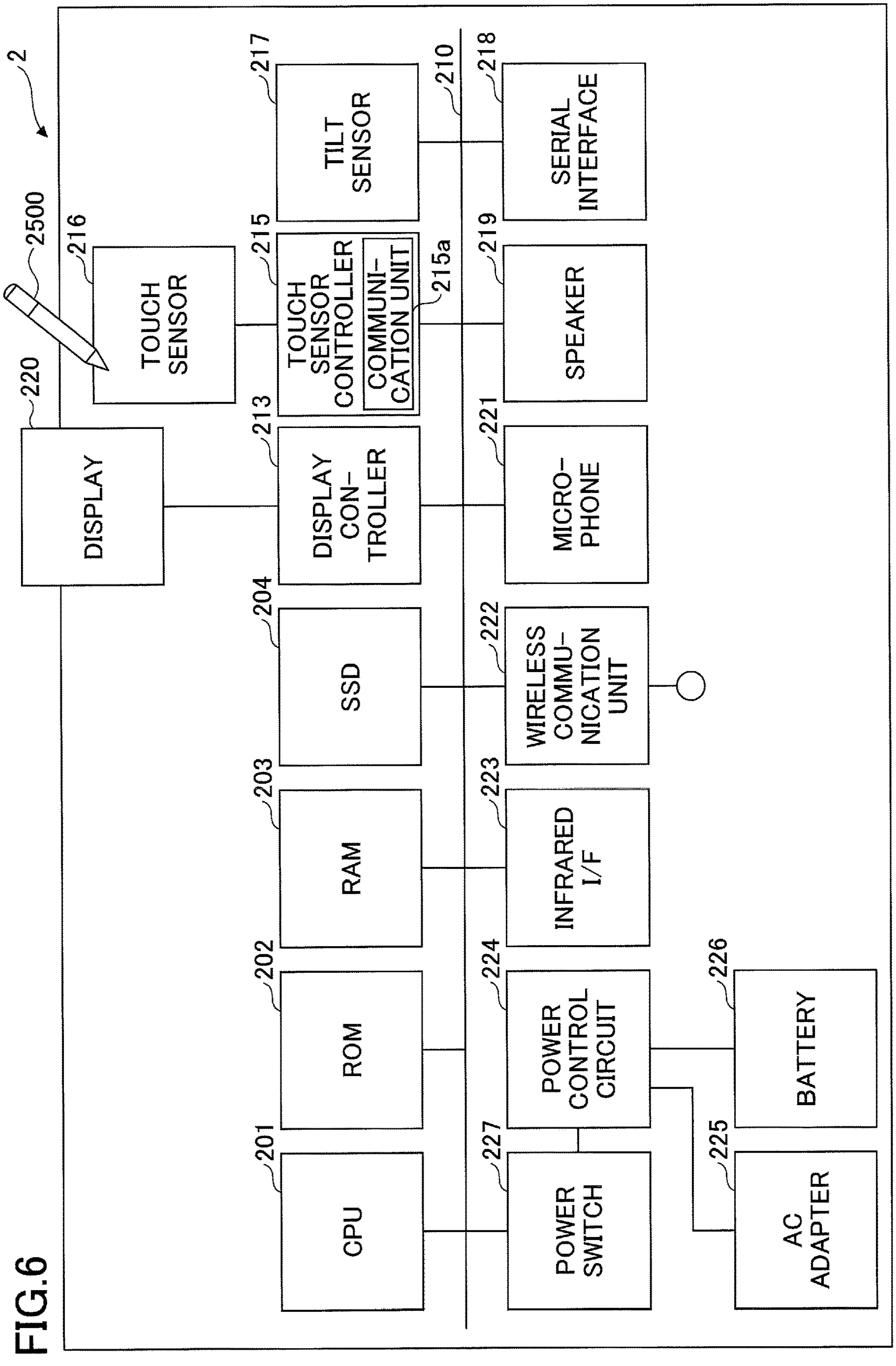
FIG. 6 depicts a hardware configuration of the handwriting input apparatus.

The hardware configuration of the handwriting input apparatus 2 will now be described with reference to FIG. 6. The handwriting input apparatus 2 has a configuration of an information processing apparatus or a computer as depicted in FIG. 6. FIG. 6 depicts one example of the hardware configuration of the handwriting input apparatus 2. As depicted in FIG. 6, the handwriting input apparatus 2 includes a CPU (Central Processing Unit), a ROM (Read-Only Memory) 202, a RAM (Random Access Memory) 203, and a SSD (Solid State Drive) 204.

The CPU 201 controls operations of the entire handwriting input apparatus 2. The ROM 202 stores programs used to drive the CPU 201 such as an IPL (Initial Program Loader). The RAM 203 is used as a work area of the CPU 201. The SSD 204 stores various data such as programs for the handwriting input apparatus 2.

The handwriting input apparatus 2 includes also a display controller 213, a touch sensor controller 215, a touch sensor 216, the display 220, a power switch 227, a tilt sensor 217, a serial interface 218, a speaker 219, a microphone 221, a wireless communication device 222, an infrared I/F 223, a power control circuit 224, an AC adapter 225, and a battery 226.

The display controller 213 controls and manages screen display to output an output image to the display 220. The touch sensor 216 detects that the pen 2500, the user's hand, or the like (the pen or the user's hand acts as the input device) is in contact with the display 220. The touch sensor 216 also receives a pen ID.

The touch sensor controller 215 controls processing of the touch sensor 216. The touch sensor 216 implements an input of coordinates and detection of the coordinates. A method for inputting coordinates and detecting the coordinates is, for example, a method using an optical system where two light emitting and receiving devices located at the upper and lower ends of the display 220 emit a plurality of infrared rays parallel to the display 220, which are reflected by a reflective member provided around the display 220, and receive light returned through the same optical path as the optical path of the emitted light by the light emitting and receiving devices. The touch sensor 216 outputs position information of infrared rays emitted by the two light emitting and receiving devices and interrupted by a touched object to the touch sensor controller 215; the touch sensor controller 215 determines the coordinate position that is the touched position of the object. The touch sensor controller 215 also includes a communication unit 215*a* that can communicate wirelessly with the pen 2500. For example, a commercially available pen may be used when the touch sensor controller 215 performs communication according to a standard such as Bluetooth. In response to one or more pens 2500 being registered in the communication unit 215*a* in advance, the user need not perform connection settings for causing a pen 2500 to be able to communicate with the handwriting input apparatus 2.

The power switch 227 is a switch for turning on and off the power of the handwriting input apparatus 2. The tilt sensor 217 is a sensor that detects the tilt angle of the handwriting input apparatus 2. The tilt sensor 217 is primarily used to detect whether the handwriting input apparatus 2 is used in the installation state of FIG. 5, (a), (b), or (c); the thickness of, for example, characters can be automatically changed depending on the installation state.

The serial interface 218 is a communication interface for an external device, such as USB. The serial interface 218 is used for input of information from the external device. The speaker 219 is used for sound output and the microphone 221 is used for sound input. The wireless communication device 222 communicates with a terminal held by the user and relays a connection to, for example, the Internet. The wireless communication device 222 can communicate via Wi-Fi, Bluetooth, or the like, and also, can communicate via any other communication standard. The wireless communication device 222 acts as an access point; as a result of the user setting the SSID (Service Set Identifier) and the password to the terminal that the user holds, the user can cause the terminal to connect with the access point.

The wireless communication device 222 may have the following two access points:

a. an access point→the Internet b. an access point→an intranet→a the Internet

The access point "a" is for an external (guest) user; the guest user cannot access the intranet, but can use the Internet.

The access point "b" is for an internal user (i.e., a user belonging to the company); the user can use the intranet and the Internet.

The infrared I/F 223 detects an adjacent handwriting input apparatus 2. Only an adjacent handwriting input apparatus 2 can be detected by using of the rectilinearity of infrared. Desirably, the infrared I/F 223 is provided one by one on each side of the handwriting input apparatus 2 so that it is possible to detect in which direction of the handwriting input apparatus 2 another handwriting input apparatus 2 is. As a result, the display screen can be widened by using the two handwriting input apparatuses 2 and it is possible to display, on the adjacent handwriting input apparatus 2, handwriting information (another page of handwriting information, assuming the size of one display 220 as the size of one page) written in the past.

The power control circuit 224 controls the AC adapter 225 and the battery 226 that are power sources for the handwriting input apparatus 2. The AC adapter 225 converts alternating-current power supplied by the commercial power supply to direct-current power.

In a case where the display 220 is in a form of so-called electronic paper, the display 220 consumes a little or no power to maintain displaying an image, so it is possible to drive the display 220 by the battery 226. As a result, it is possible to use the handwriting input apparatus 2 for an application such as a digital signage even in a place where it is difficult to connect a power source, such as an outdoor place.

The handwriting input apparatus 2 further includes a bus line 210. The bus line 210 includes an address bus, a data bus, and so forth for electrically connecting the elements such as the CPU 201 depicted in FIG. 6.

The touch sensor 216 is not limited to an optical type sensor. Various detection systems may be used, such as a touch panel of an electrostatic capacitance type where a touched position is determined by detecting of a change in capacitance; a touch panel of a resistive film type where a touched position is determined through a voltage change between two mutually facing resistive films; and an electromagnetic induction type where electromagnetic induction generated when a touched object touches a display section is detected and the touched position is determined. The touch sensor 216 may be of a system that does not use an electronic pen to detect presence or absence of touch of a pen tip. In this case, a fingertip or a pen-shaped rod can be used to implement a touch operation. Note that the pen 2500 need not have a long and thin pen-shape.

<Functions of Apparatus>

Figure 7A:
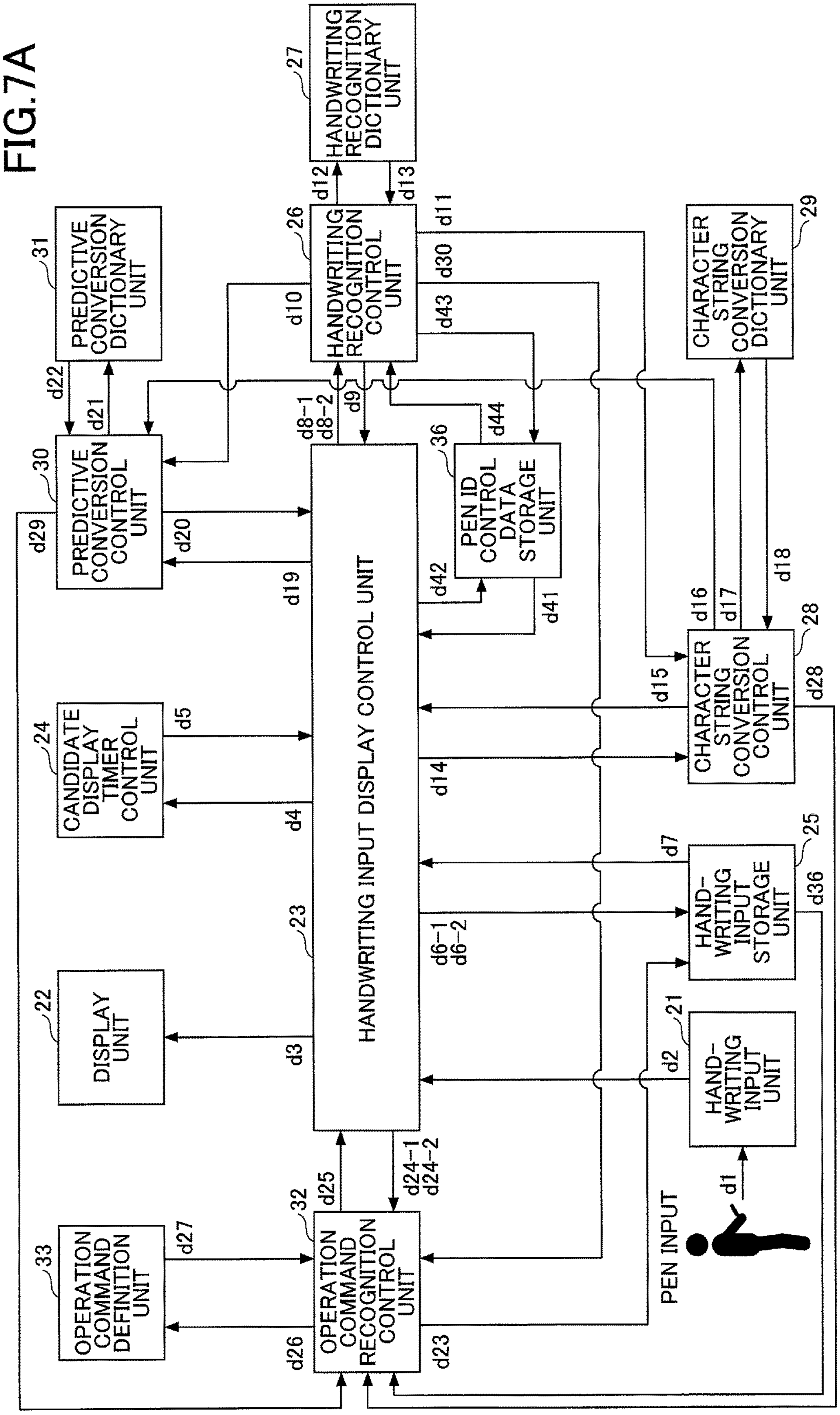
FIGS. 7A and 7B depict functional block diagrams for illustrating an example of functions of the handwriting input apparatus.

Functions of the handwriting input apparatus 2 will now be described with reference to FIG. 7A. FIG. 7A depicts an example of a functional block diagram for illustrating functions of the handwriting input apparatus 2. The handwriting input apparatus 2 includes a handwriting input unit 21, a display unit 22, a handwriting input display control unit 23, a candidate display timer control unit 24, a handwriting input storage unit 25, a handwriting recognition control unit 26, a handwriting recognition dictionary unit 27, a character string conversion control unit 28, a character string conversion dictionary unit 29, a predictive conversion control unit 30, a predictive conversion dictionary unit 31, an operation command recognition control unit 32, and an operation command definition unit 33. These functions of the handwriting input apparatus 2 are implemented as a result of elements depicted in FIG. 6 operating according to instructions from the CPU 201 according to programs read from the SSD 204 and written in the RAM 203.

The handwriting input unit 21 is implemented by the touch sensor 216 and so forth, receives a handwriting input by the user, and receives a pen ID. The handwriting input unit 21 converts the user's pen input d1 into pen operation data d2 (pen removal, pen touch, or pen-coordinate data) and transmits the converted data to the handwriting input display control unit 23. The pen coordinate data is transmitted periodically as discrete values, and the coordinates between the discrete values are interpolated through calculation.

The display unit 22 is implemented by the display 220 and so forth to display a handwriting object or an operation menu. The display unit 22 converts drawing data d3 written in a video memory by the handwriting input display control unit 23 to data corresponding to the characteristics of the display 220 and transmits the converted data to the display 220. The display unit 22 displays information based on stroke data according to the position of the user.

The handwriting input display control unit 23 performs overall control concerning handwriting input and display. The handwriting input display control unit 23 processes pen operation data d2 from the handwriting input unit 21 and displays the pen operation data d2 by transmitting the pen operation data d2 to the display unit 22. Processing of the pen operation data d2 and display of strokes will be described in more detail later with reference to FIGS. 26-32.

The candidate display timer control unit 24 provides a display control timer for selectable candidates, generates timing for starting and stopping the timer, to start display of selectable candidates and to delete the display. The selectable candidates are handwriting recognized character string/language character string candidates, converted character string candidates, character-string/predictive-conversion candidates, and operation command candidates displayed in the operation guide that will be described later. The candidate display timer control unit 24 receives a timer start request d4 or a timer stop request d4 from the handwriting input display control unit 23 and transmits a timeout event d5 to the handwriting input display control unit 23.

The handwriting input storage unit 25 has a storage function for storing user data (a handwriting object and a character string object). The handwriting input storage unit 25 receives user data d6-1 from the handwriting input display control unit 23, and stores the data in the handwriting input storage unit 25. The handwriting input storage unit 25 receives an obtaining request d6-2 from the handwriting input display control unit 23, and transmits user data d7 stored in the handwriting input storage unit 25. The handwriting input storage unit 25 transmits position information d36 of a fixed object to the operation command recognition control unit 32.

The handwriting recognition control unit 26 is a recognition engine for performing on-line handwriting recognition. Unlike a common OCR (Optical Character Reader), characters (various languages not only Japanese but also English and so forth), numerals, symbols (%, $, &, and so forth), and geometric forms (lines, circles, triangles, and so forth) are identified, in parallel with the user's pen operations. Various algorithms have been devised for recognition methods; concerning the present embodiment, description of a detailed recognizing algorithm is omitted as well-known techniques may be used.

The handwriting recognition control unit 26 receives pen operation data d8-1 from the handwriting input display control unit 23, performs handwriting recognition, and stores thus obtained handwriting recognized character string candidates. The handwriting recognition control unit 26 stores language character string candidates obtained through conversion from the handwriting recognized character string candidates d12 with the use of the handwriting recognition dictionary unit 27. In response to an obtaining request d8-2 being received from the handwriting input display control unit 23, the handwriting recognition control unit 26 transmits the stored handwriting recognized character string candidates and language character string candidates d9 to the handwriting input display control unit 23.

The handwriting recognition dictionary unit 27 has dictionary data for handwriting recognized language conversion. The handwriting recognition dictionary unit 27 receives the handwriting recognized character string candidates d12 from the handwriting recognition control unit 26, converts the handwriting recognized character string candidates into the linguistically probable language character string candidates d13, and transmits the conversion result to the handwriting recognition control unit 26. For example, in a case of Japanese, the handwriting recognition dictionary unit 27 is used to convert Hiragana characters to Chinese characters or Katakana characters.

The character string conversion control unit 28 controls conversion into converted character string candidates. A "converted character string" is a character string that is likely to be created including a handwriting recognized character string or a language character string. The character string conversion control unit 28 receives the handwriting recognized character string candidates and the language character string candidates d1 from the handwriting recognition control unit 26, converts these candidates to converted character string candidates using the character string conversion dictionary unit 29, and stores the conversion result. In response to an obtaining request d14 being received from the handwriting input display control unit 23, the stored converted character string candidates d15 are transmitted to the handwriting input display control unit 23.

The character string conversion dictionary unit 29 has dictionary data for character string conversion. The character string conversion dictionary unit 29 receives the handwriting recognized character string candidates and the language character string candidates d17 from the character string conversion control unit 28 and transmits converted character string candidates d18 to the character string conversion control unit 28.

The predictive conversion control unit 30 receives the handwriting recognized character string candidates and the language character string candidates d10 from the handwriting recognition control unit 26, and receives the converted character string candidates d16 from the character string conversion control unit 28. The predictive conversion control unit 30 converts the handwriting recognized character string candidates, the language character string candidates d10, and the converted character string candidates d16 into predicted character string candidates using the predictive conversion dictionary unit 31. A "predicted character string" is a character string that is likely to be created including a handwriting recognized character string candidate, a language character string, or a converted character string. In response to an obtaining request d19 being received from the handwriting input display control unit 23, the predicted character string candidates d20 are transmitted to the handwriting input display control unit 23.

The predictive conversion dictionary unit 31 has dictionary data for predictive conversion. The predictive conversion dictionary unit 31 receives the handwriting recognized character string candidates, the language character string candidates, and the converted character string candidates d21 from the predictive conversion control unit 30, and transmits predicted character string candidates d22 to the predictive conversion control unit 30.

The operation command recognition control unit 32 receives the handwriting recognized character string candidates and the language character string candidates d30 from the handwriting recognition control unit 26, and receives the converted character string candidates d28 from the character string conversion control unit 28. The operation command recognition control unit 32 receives the predicted character string candidates d29 from the predictive conversion control unit 30. With respect to these character string candidates, the operation command recognition control unit 32 transmits operation command conversion requests d26 to the operation command definition unit 33 and receives operation command candidates d27 from the operation command definition unit 33. The operation command recognition control unit 32 stores the received operation command candidates d27.

In this regard, in response to operation command conversion requests d26 being partially the same as (i.e., partially or completely the same as) operation command definitions, the operation command definition unit 33 transmits operation command candidates d27 to the operation command recognition control unit 32.

The operation command recognition control unit 32 receives pen operation data d24-1 from the handwriting input display control unit 23 and transmits a position information obtaining request d23 for a fixed object that has been input and fixed to the handwriting input storage unit 25. The operation command recognition control unit 32 stores a fixed object, determined by the pen operation data, as a selected object (including position information). The operation command recognition control unit 32 identifies a selected object that satisfies a predetermined criterion with the position of the pen operation data d24-1. In response to an obtaining request d24-2 being received from the handwriting input display control unit 23, the stored selected object d25, identified as an operation command candidate, is transmitted to the handwriting input display control unit 23.

The pen ID control data storage unit 36 (which may be simply referred to as a storage unit) stores the pen ID control data. Before the handwriting input display control unit 23 transmits the display data to the display unit 22, the pen ID control data storage unit 36 transmits the pen ID control data d41 to the handwriting input display control unit 23. The handwriting input display control unit 23 draws, for example, characters, on the basis of the display data under the operating conditions stored in association with the pen ID. Further, before the handwriting recognition control unit 26 executes handwriting recognition, the pen ID control data storage unit 36 transmits angle information d44 of the pen ID control data to the handwriting recognition control unit 26, and the handwriting recognition control unit 26 rotates the stroke with the angle information stored corresponding to the pen ID and executes handwriting recognition.

After the handwriting recognition control unit 26 recognizes a straight line for setting the angle information when the user handwrites, for example, characters, the handwriting recognition control unit 26 transmits the angle information d43 of the pen ID control data to the pen ID control data storage unit 36 to store the angle information d43 in the pen ID control data storage unit 36 in association with the pen ID. After the operation command for setting the angle information is executed by the handwriting input display control unit 23, the handwriting input display control unit 23 transmits the pen ID control data d42 to the pen ID control data storage unit 36 and stores the execution result of the operation command (the angle information thus set by the user) in the pen ID control data storage unit 36 in association with the pen ID. Then, the stroke of the pen ID is rotated with the set angle information, and handwriting recognition is performed.

Figure 7B:
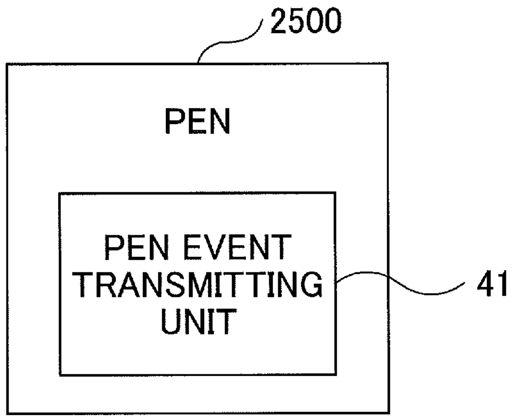

FIG. 7B depicts a functional block diagram for illustrating functions of the pen 2500. The pen 2500 includes a pen event transmitting unit 41. The pen event transmitting unit 41 transmits event data such as pen removal, pen touch, and pen coordinates to the handwriting input apparatus 2 with the pen-ID.

<User Authentication>

In the present embodiment, control is performed using the result of user authentication, and therefore, it is desirable that the handwriting input apparatus 2 has a function to authenticate the user. Therefore, the function related to user authentication will be described with reference to FIG. 8.

Figure 8:
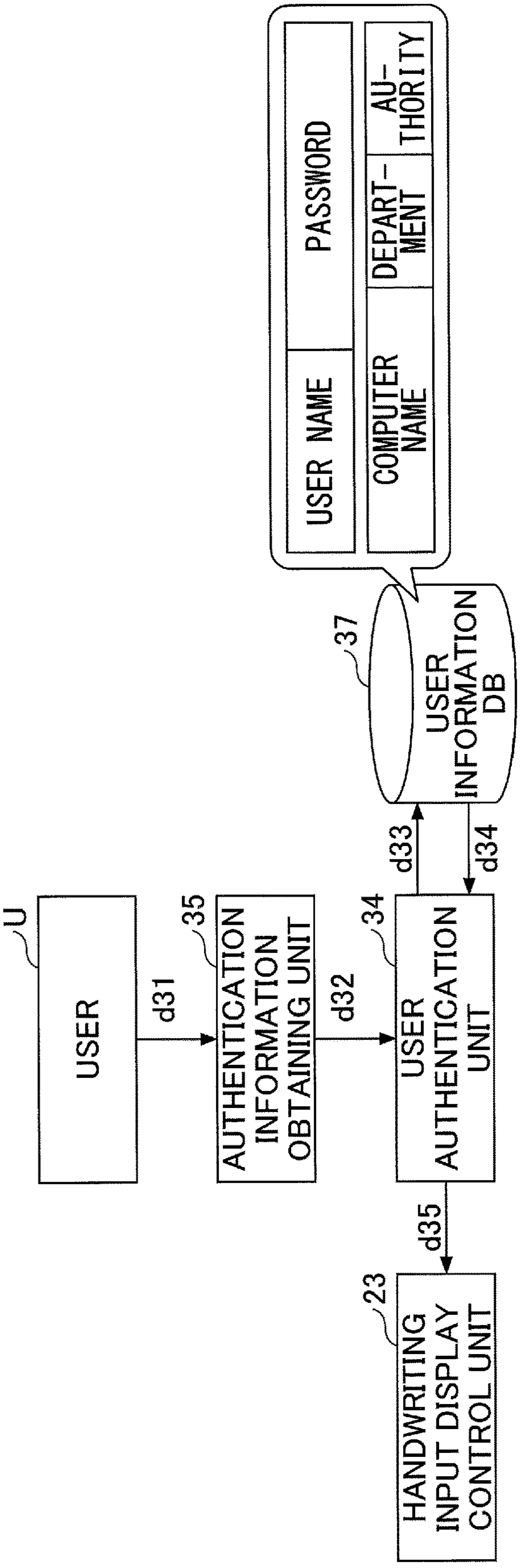
FIG. 8 depicts a functional block diagram for illustrating an example of functions related to user authentication provided by the handwriting input apparatus.

FIG. 8 depicts a block diagram for illustrating functions related to user authentication of the handwriting input apparatus 2. In FIG. 8, only the handwriting input display control unit 23 is depicted for the function relating to a user authentication unit 34. However, each function depicted in FIG. 7 may use the authentication result of the user.

An authentication information obtaining unit 35 obtains authentication information d31 from the user. The authentication information d31 may be the card number of an IC card, a user ID and a password, biometric information such as a fingerprint, or the like. The user authentication unit 34 obtains the authentication information d32 from the authentication information obtaining unit 35 and searches a user information DB 37 for the authentication information d33. In response to the corresponding user being found through the search, corresponding user information d34 is retrieved from the user information DB 37. The user information can be information representing a user attribute, for example, the user name, the user's password, computer name, department, authority, and so forth.

After the user authentication unit 34 transmits the user information d35 to the handwriting input display control unit 23, the handwriting input display control unit 23 can execute an operation command using the user information. An operation command using user information will be described with reference to FIGS. 13A and 13B.

Instead of the handwriting input apparatus 2 having the authentication function, an external authentication server may have the authentication function. In this case, the handwriting input apparatus 2 transmits the authentication information to the authentication server and obtains the authentication result and user information from the authentication server.

<Defined Control Data>

Next, defined control data used for various processes by the handwriting input apparatus 2 will be described with reference to FIG. 9. FIG. 9 depicts an example of defined control data. The example of FIG. 8 depicts the control data on a per control item basis.

A selectable candidate display timer 401 defines a time, selectable candidates being displayed after the elapse of the time (one example of a first time). This is because selectable candidates are not displayed during handwriting. FIG. 9 depicts that selectable candidates are displayed unless a pen touch occurs within a TimerValue of 500 ms from a pen removal. The selectable candidate display timer 401 is stored by the candidate display timer control unit 24. The selectable candidate display timer 401 is used at a start of the selectable candidate display timer 401 in step S18-2 of FIG. 28, which will be described later.

A selectable candidate display delete timer 402 defines a time, displayed selectable candidates being deleted after the elapse of the time (one example of a second time). This is because selectable candidates will be deleted in response to the user not selecting from the selectable candidates. FIG. 9 depicts that selectable candidate display is deleted unless any one of the selectable candidates displayed is selected within TimerValue=5000 [ms] from the display of the selectable candidates. The selectable candidate display delete timer 402 is stored by the candidate display timer control unit 24. The selectable candidate display delete timer 402 is used at a start of the selectable candidate display delete timer 402 in step S54 of FIG. 30.

A handwriting object approximate rectangular area 403 defines a rectangular area regarded as an area approximate to a handwriting object. According to the example of FIG. 9, the handwriting object approximate rectangular area 403 is a rectangular area larger than a handwriting object rectangular area horizontally by 50% of an estimated character size and vertically by 80% of the estimated character size. In the example depicted in FIG. 9, the percentages (%) of the estimated character size is used. However, in a case where the unit "mm" or the like is used, the corresponding lengths can be fixed lengths. The handwriting object approximate rectangular area 403 is stored by the handwriting input storage unit 25. Estimated character sizes 405 are used in step S10 of FIG. 27 to determine overlapping conditions between a handwriting object approximate rectangular area and a stroke rectangular area.

Estimated writing direction and character size determination conditions 404 define constants for determining a writing direction and a character size measurement direction. According to the example of FIG. 9, for a case where (i) the difference between the time when a stroke has been added at the beginning of a handwriting object rectangular area and the time when the last stroke has been added is MinTime=1000 [ms] or more, (ii) the difference between the horizontal distance (width) and the vertical distance (height) of the handwriting object rectangular area is MinDiff=10 [mm] or more, and (iii) the horizontal distance is longer than the vertical distance, the estimated writing direction is determined as being of "horizontal writing" and the estimated character size is determined as being a vertical distance. For a case where the horizontal distance is shorter than the vertical distance, the estimated writing direction is determined as being "vertical", and the estimated character size is determined as being a horizontal distance. For a case where these conditions are not satisfied, the estimated character direction is determined as being of "horizontal writing" (DefaultDir="Horizontal"), and the estimated character size is determined as being the longer distance from among the horizontal and vertical distances. The estimated writing direction and character size determination conditions 404 are stored by the handwriting input storage unit 25. The estimated writing direction and character size determination conditions 404 are used in obtaining of an estimated writing direction in step S50 of FIG. 30 and obtaining of a character string object font in step S72 of FIG. 32.

The estimated character sizes 405 define data for estimating the size of a character, for example. According to the example of FIG. 9, an estimated character size determined with the use of the estimated writing direction and character size determination conditions 404 will be compared to a smaller character 405*a* (hereinafter referred to as a minimum font size) of the estimated character sizes 405 and a larger character 405*c* (hereinafter referred to as a maximum font size) of the estimated character sizes 405. For a case where the estimated character size is smaller than the minimum font size, the estimated character size is determined to be the minimum font size. For a case where the estimated character size is larger than the maximum font size, the estimated character size is determined to be the maximum font size. Otherwise, the character size is determined to be a medium character size 405*b*. The estimated character sizes 405 are stored by the handwriting input storage unit 25. The estimated character sizes 405 are used in obtaining of a string object font in step S72 of FIG. 32.

Actually, the handwriting input storage unit 25 uses the font of the closest size from among the estimated character sizes 405 determined from comparing the estimated character size determined with the use of the estimated writing direction and character size determination conditions 404 to FontSizes of the estimated character sizes 405. For example, for a case where the estimated character size is 25 [mm] (the FontSize of smaller character) or less, the "smaller character" font is used. For a case where the estimated character size is 25 mm or more and 50 mm (the FontSize of middle character) or less, the "medium character" font is used. For a case where the estimated character size is greater than 100 mm (the FontSize of larger character), the "larger character" font is used. The "smaller character" font 405*a* uses the Ming body 25 mm font (FontStyle="Ming body", FontSize-"25 mm"); the "medium character" font 405*b* uses the Ming body 50 mm font (FontStyle="Ming body", FontSize="50 mm"); the "larger character" font 405*c* uses the Gothic body 100 mm font (FontStyle="Gothic body", FontSize="100 mm"). For a case where the number of the font sizes or style types is to be increased, the number of the estimated character sizes 405 may be increased accordingly.

A connecting line determination condition 406 defines data used to determine whether a plurality of objects have been selected by the user. According to the example of FIG. 8, for a case where (i) a handwriting object is a single stroke, (ii) the length of the long side of the handwriting object is 100 [mm] or more (MinLenLongSide="100 mm") and the length of the short side is 50 [mm] or less (MaxLenShortSide="50 mm"), and (iii) there are objects having overlap rates of 80% or more (MinOverLapRate="80%") (i.e., the overlaps are of a predetermined overlapping percentage or more) with respect to the long side and the short side of the handwriting object, it is determined that the plurality of objects have been selected (selected objects). The operation command recognition control unit 32 stores the connecting line determination condition 406. The connecting line determination condition 406 is used in determination of selected objects in step S41 of FIG. 29.

An enclosing line determination condition 407 defines data used to determine whether an object is an enclosing line. According to the example of FIG. 9, the operation command recognition control unit 32 determines a fixed object, having the overlap rates of 100% or more (MinOverLapRate="100%") (i.e., the overlap being of a predetermined overlapping percentage or more) with respect to the long side direction and the short side direction with a handwriting object, as a selected object. The enclosing line determination condition 407 is stored by the operation command recognition control unit 32. The enclosing line determination condition 407 is used in enclosing line determination in determination of a selected object in step S41 of FIG. 29.

Either condition from among the connecting line determination condition 406 and the enclosing line determination condition 407 may be used with priority for determination. For example, for a case where the connecting line determination condition 406 is set to be a mild condition (such that a handwriting object can be determined as a connecting line easily) and the enclosing line determination condition 407 is set to be a strict condition (such that a handwriting object can be determined only as an enclosing line), it may be better that the operation command recognition control unit 32 gives priority to the enclosing line determination condition 407 for the determination.

<Example of Dictionary Data>

The dictionary data will be described with reference to FIGS. 10-12. FIG. 10 depicts an example of the dictionary data of the handwriting recognition dictionary unit 27. FIG. 11 depicts an example of the dictionary data of the character string conversion dictionary unit 29. FIG. 12 depicts an example of the dictionary data of the predictive conversion dictionary unit 31. These sets of dictionary data are used in steps S24-S33 of FIG. 29.

In the present embodiment, a conversion result using the dictionary data of the handwriting recognition dictionary unit 27 of FIG. 10 will be referred to as a "language character string candidate", a conversion result using the dictionary data of the character string conversion dictionary unit 29 of FIG. 11 will be referred to as a "converted character string candidate", and a conversion result using the dictionary data of the predictive conversion dictionary unit 31 of FIG. 12 will be referred to as a "predicted character string candidate".

"Before conversion" for each type of dictionary data indicates a character string to be searched for from the dictionary data; "after conversion" indicates a character string after conversion corresponding to a character string to be searched for; "probability" indicates the probability of being selected by the user. The probability is calculated from the results of the user selecting the character strings in the past. Therefore, the probabilities may be calculated on a per user basis. Various algorithms have been devised to calculate such probabilities. Actually, the probabilities may be calculated in an appropriate way; the details will be omitted. According to the present embodiment, character string candidates based on estimated writing directions are displayed in a selection probability descending order.

In the dictionary data of the handwriting recognition dictionary unit 27 of FIG. 10, the handwriting "Hiragana" character H1 having a pronunciation "gi" has the probability of 0.55 to be a Chinese character C1 having the same pronunciation "gi", the probability of 0.45 to be a Chinese character C2 having the same pronunciation "gi"; the handwriting "Hiragana" characters H2 having a pronunciation "gishi" have the probability of 0.55 to be a Chinese characters C3 having the same pronunciation "gishi" and the probability of 0.45 to be the Chinese characters C4 having the same pronunciation "gishi". The same applies to the other character strings before conversion. In FIG. 10, the character strings of "before conversion" are handwriting Hiragana characters. Instead, character strings other than Hiragana characters may be registered as character strings of "before conversion".

In the dictionary data of the character string conversion dictionary unit 29 of FIG. 11, the character string C11 (a Chinese character) is converted to C12 (a Chinese character string) with the probability of 0.95; the character string C13 (a Chinese character) is converted to a Chinese character string C14 with the probability of 0.85. The same applies to the other strings "before conversion".

In the dictionary data of the predictive conversion dictionary unit 31 of FIG. 12, the character string C21 (a Chinese character string) is converted to a string of Chinese characters and a Hiragana character C22 with the probability of 0.65; and the character string C23 (a Chinese character string) is converted to a string of Chinese characters and a Hiragana character C24 with the probability of 0.75. In the example of FIG. 11, all of the character strings "before conversion" are Chinese characters. However, characters other than Chinese characters may be registered instead.

The dictionary data is language independent, and any character strings may be registered as character strings of "before conversion" and "after conversion".

<Operation Command Definition Data Stored by Operation Command Definition Unit>

Next, the operation command definition data used by the operation command recognition control unit 32 will be described with reference to FIGS. 13A-14. FIGS. 13A and 13B depict an example of the operation command definition data and an example of system definition data stored by the operation command definition unit 33.

FIG. 13A depicts an example of the operation command definition data. The operation command definition data depicted in FIG. 13A is an example of the operation command definition data to be used when there is no selected object selected with the use of a handwriting object. Such operation command definition data is prepared for all the operation commands for operating the handwriting input apparatus 2. The operation commands of FIG. 13A have operation command names (Name), character strings that are partially the same as character string candidates (String), and character strings of operation commands (Command) to be executed. "% . . . %" in an operation command string is a variable and is associated with system definition data as depicted in FIG. 13B. In other words, "% . . . %" is replaced by system definition data depicted in FIG. 13B.

The operation command definition data 701 indicates that the name of an operation command is indicated by characters C31 (or "read meeting minutes template"), a character string that is partially the same as a character string candidate is indicated by characters C32 (or "meeting minutes") or characters C33 (or "template"), and an operation command to be executed is "ReadFile https://%username%:%password%@server.com/templates/minutes.pdf". In this example, system definition data "% . . . %" is included in the operation command to be executed, and "%username%" and "%password%" are replaced by system definition data 704 and 705, respectively. Therefore, the final operation-command string is "ReadFile https://taro.tokkyo:x2PDHTyS@server.com/template/minutes.pdf", indicating that the file "https://taro.tokkyo:x2PDHTyS@server.com/minutes.pdf" is to be read (ReadFile).

The operation command definition data 702 indicates that the name of an operation command is characters C34 (or "save in a minutes folder"), a character string that is partially the same as a character string candidate is characters C32 (or "meeting minutes") or characters C35 (or "save"), and an operation command to be executed is "WriteFile https:/%username%:%password%@server.com/minutes/%machinename%_%yyyyy-mm-dd.pdf". Similar to the operation command definition data 701, "%username%", "%password%", and "%machinename%" in the operation command string are replaced by system definition data 704-706, respectively. Note that "%yyyy-mm-dd%" is to be replaced by the current date. For example, for a case where the current date is Sep. 26, 2018, "%yyyy-mm-dd%" is be replaced by "2018-09-26". The final operation command is "WriteFile https://taro.tokkyo:x2PDHTyS@server.com/minutes/%My-Machine_2018-09-26.pdf" and indicates that meeting minutes are to be saved in the file "https://taro.tokkyo:x2PDHTyS@server.com/%Minutes/%My-Machine_2018-09-26.pdf" (WriteFile).

The operation command definition data 703 indicates that the name of an operation command is characters C37 (or "to print"), a character string that is partially the same as a character string candidate is characters C38 (or "print") or characters C39 (or "print"), and an operation command to be executed is "PrintFile https:/%username%:%password%@server.com/print/%machiname%-%yyyy-mm-dd%.pdf". As replacement in the operation command string is performed as for the operation command definition data 702, the final operation command to be executed is "PrintFile https://taro.tokkyo:x2PDHTyS@server.com/print/%My-Machine_2018-09-26.pdf", indicating that the file "https://taro.tokkyo:x2PDHTyS@server.com/print/%My-Machine_2018-09-26.pdf" is to be printed (PrintFile). That is, the file is sent to a server. In other words, the user causes a printer to communicate with the server and the printer prints the contents of the file on a paper sheet when the file is indicated.

Thus, the operation command definition data 701-703 can be identified from character string candidates. Therefore, an operation command can be caused to be displayed as a result of the user handwriting an object. Further, after user authentication succeeds, "%username%", %password%", and so forth of operation command definition data will be replaced in the user information, and thus, input/output of the file can be performed in association with the user.

For a case where user authentication is not performed (or a case where user authentication fails, for a case where the user can use the handwriting input apparatus 2 even if user authentication fails), "%username%", %password%", and so forth previously set to the handwriting input apparatus 2 are used for the replacement instead. Thus, even without user authentication, input/output of the file can be performed in association with the handwriting input apparatus 2.

The operation command definition data 709, 710, and 711 are operation commands that change the pen state. The pen state may also be referred to as the pen type. The operation command definition data 709, 710, and 711 indicates that the names of operation commands are indicated by characters C40 (or "fine pen"), characters C43 (or "bold pen"), and characters C45 (or "marker"), respectively; character strings that are partially the same as character string candidates are indicated by characters C41 (or "fine") or characters C42 (or "pen"), respectively; characters C44 (or "bold") or characters C42 (or "pen"), and characters C45 (or "marker") or characters C42 (or "pen"), respectively; and operation commands to be executed are "ChangePen fine", "ChangePen bold", and "ChangePen marking", respectively. When these operation commands are executed, the pen state is stored in the pen ID control data storage section 36, so that the user can handwrite a stroke in the thus set pen state.

The operation command definition data 712 is an operation command for setting text data in a predetermined orientation. The operation command definition data 712 indicates that the name of the operation command is indicated by characters C46 (or "set the orientation of text data to be the same as each other"), a character string that is partially the same as character string candidates is indicated by characters C47 (or "text"), characters C48 (or "orientation"), or characters C49 (or "direction"), and an operation command to be executed is "AlignTextDirection". Text data written by users in directions other than the vertical direction of the handwriting input apparatus 2 have various orientations so that it is difficult to read such text data from one direction. When the users execute the operation command definition data 712, the handwriting input apparatus 2 sets the orientations of handwriting recognized character strings to be the same as each other in a predetermined direction (for example, the vertical direction of the handwriting input apparatus 2). In this case, "set the orientations to be the same as each other" means to rotate text data according to the angle information.

Next, the operation command definition data for a case where there is a handwriting object, that is, operation command definition data of an editing system and a modifying system will be described. FIG. 14 depicts an example of the operation command definition data for a case where there is a selected object selected with the use of a handwriting object. The operation command definition data depicted in FIG. 14 has operation command names (Name), group names (Group) of operation command candidates, and character strings of operation commands (Command) to be executed.

The operation command definition data 707 defines operation commands of an editing system (Group="Edit"), and is examples of definition data of operation commands "delete," "move," "rotate," and "select" of an editing system. That is, these operation commands are displayed for a selected object to allow the user to select a desired operation command.

The operation command definition data 708 defines operation commands of a modifying system (Group="Decorate"), and the operation commands of the modifying system are defined as examples of the operation commands "make thicker," "make thinner," "make larger," "make smaller," and "draw underline". These operation commands are displayed for a selected object to allow the user to select a desired operation command. Furthermore, operation commands concerning color may also be displayed.

Thus, as a result of the user selecting a selected object with the use of a handwriting object, operation command definition data 707 or 708 is identified. Thus, the user can cause an operation command to be displayed as a result of performing handwriting.

<Handwriting Input Storage Data Stored by Handwriting Input Storage>

Next, handwriting input storage data will be described with reference to FIG. 15. FIG. 15 depicts an example of handwriting input storage data stored by the handwriting input storage unit 25. One field in FIG. 15 represents a stroke. One set of handwriting input storage data has the following items: DataId, Type, PenId, Color, Width, Pattern, Angle, StartPoint, StartTime, EndPoint, EndTime, Point, and Pressure, as depicted in FIG. 15.

DataId is an identification of a stroke. Type is a stroke type. The stroke type include Stroke, Group, and Text. The types of handwriting input storage data sets 801 and 802 are Stroke; and the type of handwriting input storage data set 803 is Group, as depicted in FIG. 15. Group means to create a group including other strokes; handwriting input storage data having the type "Group" specifies strokes to be included in a group with DataId. PenId, Color, Width, Pattern, and Angle correspond to PenId, Color, Width, Pattern, and Angle of pen ID control data that will be described below. StartPoint is the start point coordinates of the stroke and StartTime is the start point time of the stroke. EndPoint is the end point coordinates of the stroke and EndTime is the end point time of the stroke. Point is the coordinate string from the start point coordinates to the end point coordinates, and Pressure is the writing pressures from the start point coordinates to the end point coordinates. As depicted in Angle, the handwriting input storage data sets 804 and 805 indicates that the strokes are rotated clockwise by 180 degrees and 270 degrees, respectively, before undergoing handwriting recognition.

<Pen ID Control Data Stored in Pen ID Control Data Storage Unit>

Figure 16B:
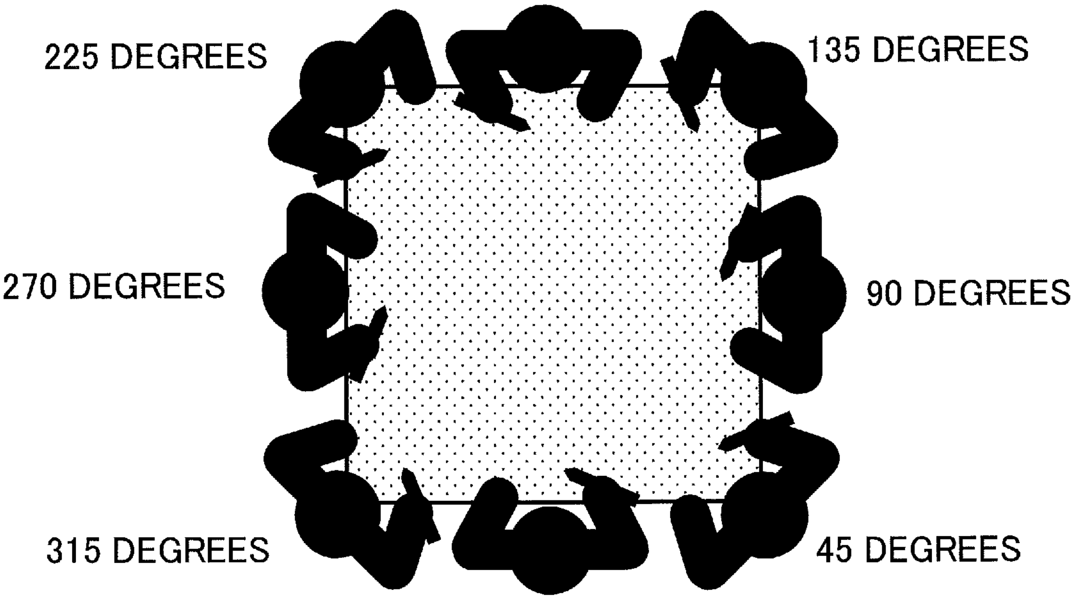

Next, the pen ID control data will be described with reference to FIGS. 16A and 16B. FIGS. 16A and 16B depict diagrams for illustrating the pen ID control data stored in the pen ID control data storage unit 36. One field of FIG. 16A depicts the pen ID control data with respect to one pen. FIG. 16B depicts a diagram for illustrating the angle information when users perform handwriting to the handwriting input apparatus 2. The angle information denotes the angle of the direction in which a user is, the angle of the direction in which the pen is used, or the angle with respect to rotation of a character written by the user. Assuming that the predetermined direction of the handwriting input apparatus 2 (e.g., the vertical direction) is 0 degrees (a reference angle), the angle information of the respective users depicted in FIG. 16B are 45 degrees, 90 degrees, 135 degrees, 180 degrees, 225 degrees, 270 degrees, and 315 degrees counterclockwise, as depicted in FIG. 16B.

The user's angle information indicates the location of the user relative to the handwriting input apparatus 2 when the handwriting input apparatus 2 is in flat installation. That is, the user's angle information is location information. Viewed from the handwriting input apparatus 2, it is possible to identify which direction the user is in. Instead of such angle information, the direction viewed from the handwriting input apparatus 2 may be indicated by a clock hand, and thus, may be expressed as follows: 0 degrees: 6 o'clock direction; 45 degrees: a direction between 4 o'clock direction and 5 o'clock direction; 90 degrees: 3 o'clock direction; 135 degrees: a direction between 1 o'clock direction and 2 o'clock direction; 180 degrees: 12 o'clock direction; 225 degrees: a direction between 10 o'clock and 11 o'clock direction; 270 degrees: 9 o'clock direction; and 315 degrees: a direction between 7 o'clock direction and 8 o'clock direction.

The angle information is not automatically determined by the user's position, and each user inputs (specifies) the angle information. The resolution of the angle information that can be specified (45 degrees in FIGS. 16A and 16B) is only one example and may be smaller, such as 5 degrees through 30 degrees. In this regard, if a character is rotated by 45 degrees or so, it seems possible for the user to read the character.

The pen ID control data includes PenId, Color, Width, Pattern, and Angle. PenId is an identifier stored inside the pen. Color is the stroke color that is set to this pen (which can be changed by the user). Width is the width of a stroke that is set to this pen (which can be changed by the user). Pattern is the line type of a stroke that is set to this pen (which the user can change freely). Angle is the angle of a stroke that is set to this pen (which the user can change freely). In the example of FIG. 16A, the angle information for the respective pens are 0 degrees, 90 degrees, 180 degrees, and 270 degrees counterclockwise.

The pen ID control data 901 is control data having a pen ID of 1. The color is black (Black), the thickness is 1 pixel (1 px), the pattern is solid (Solid), and angle information is 0 degrees. Similarly, the pen ID control data 902 has a pen ID of 2, a color of black, a thickness of 1 pixel, a pattern of solid, and angle information of 90 degrees. The pen ID control data 903 has a pen ID of 3, a color of black, a thickness of 10 pixels, a pattern of solid, and angle information of 180 degrees. The pen ID control data 904 has a pen ID of 4, a color of black, a thickness of 10 pixels, a pattern of halftone dots, and angle information of 270 degrees.

Figure 26:
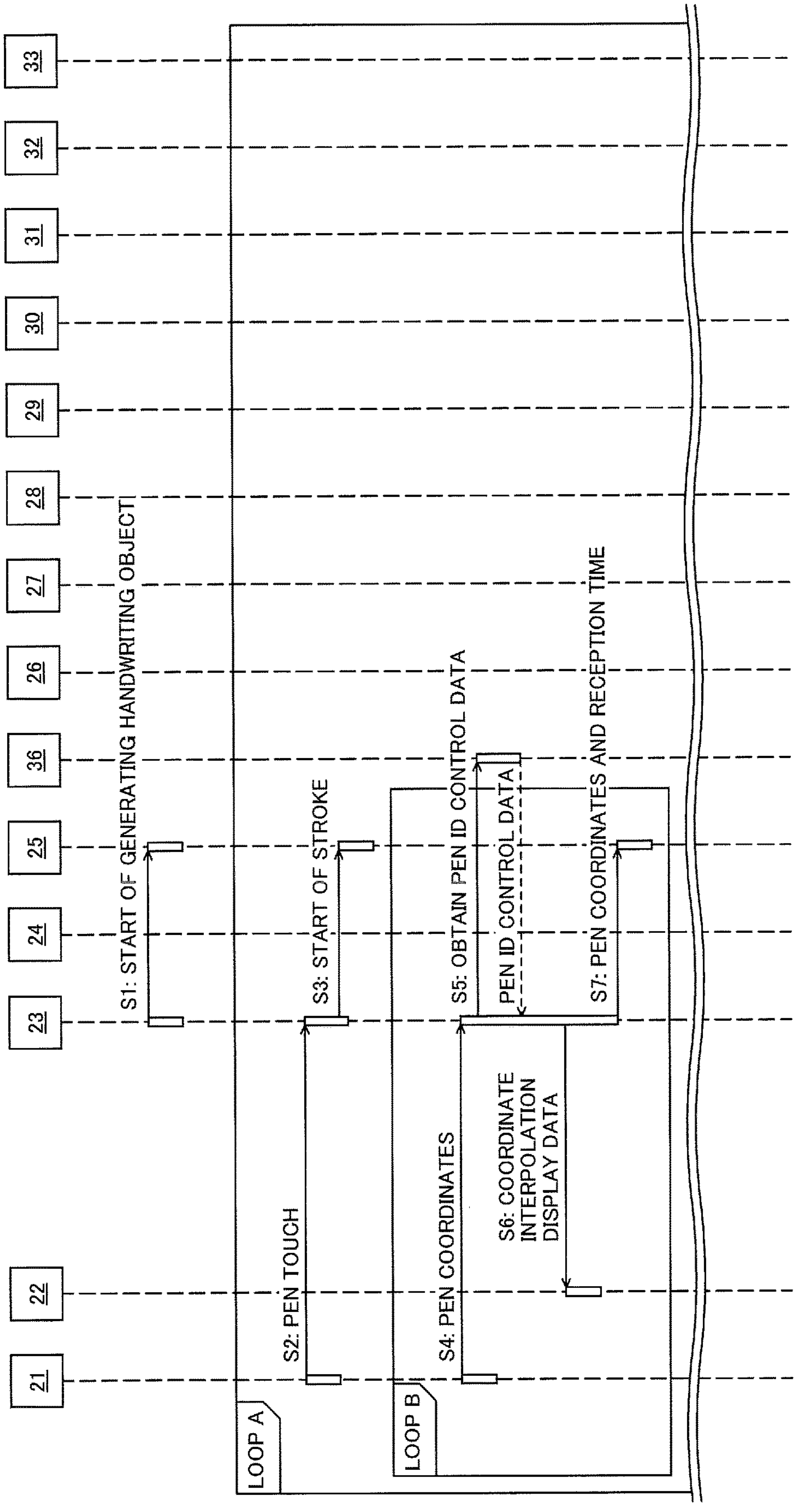
FIGS. 26-32 depict sequence diagrams for illustrating processes where the handwriting input apparatus displays character string candidates and operation command candidates.
Figure 27:
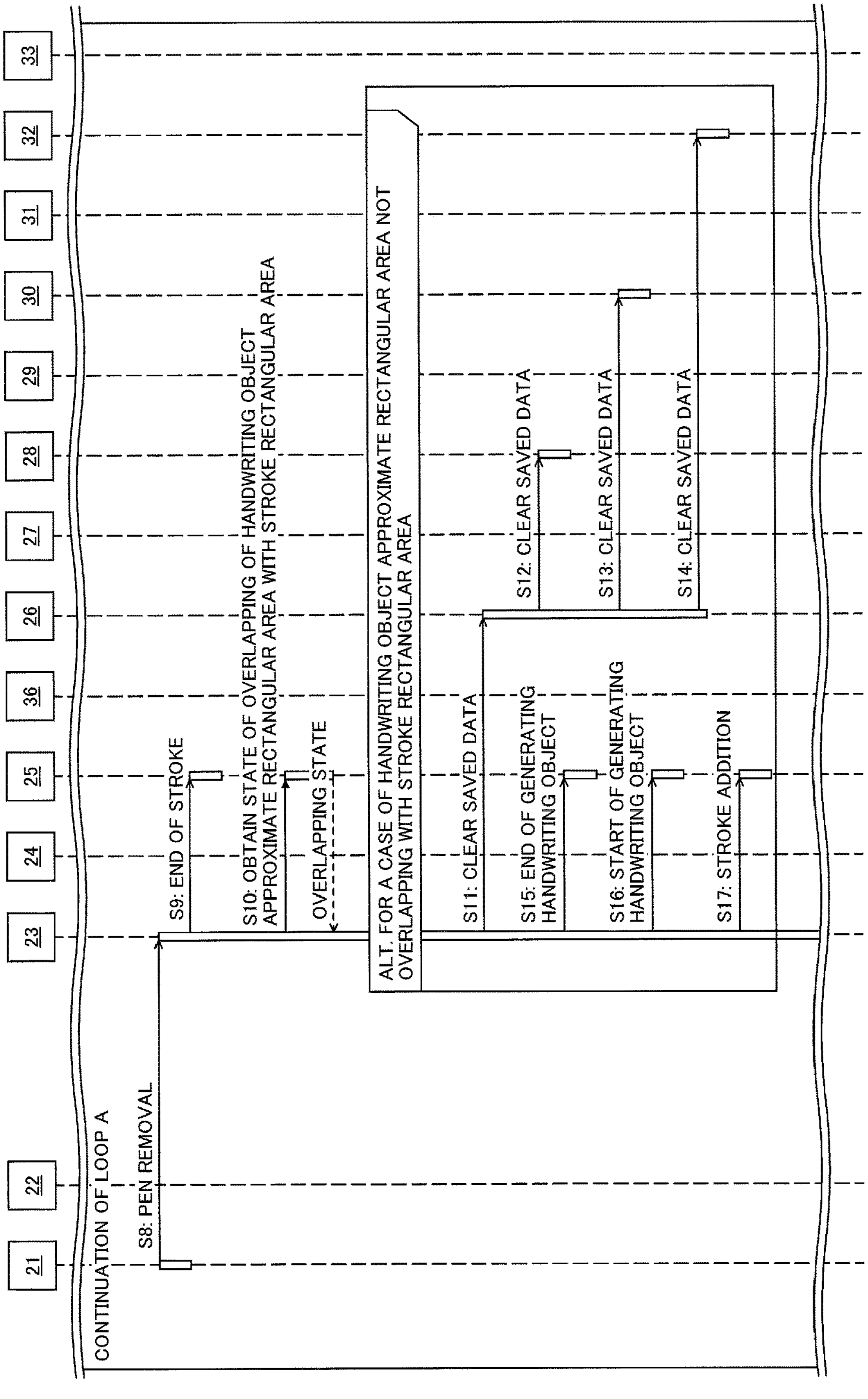
Figure 28:
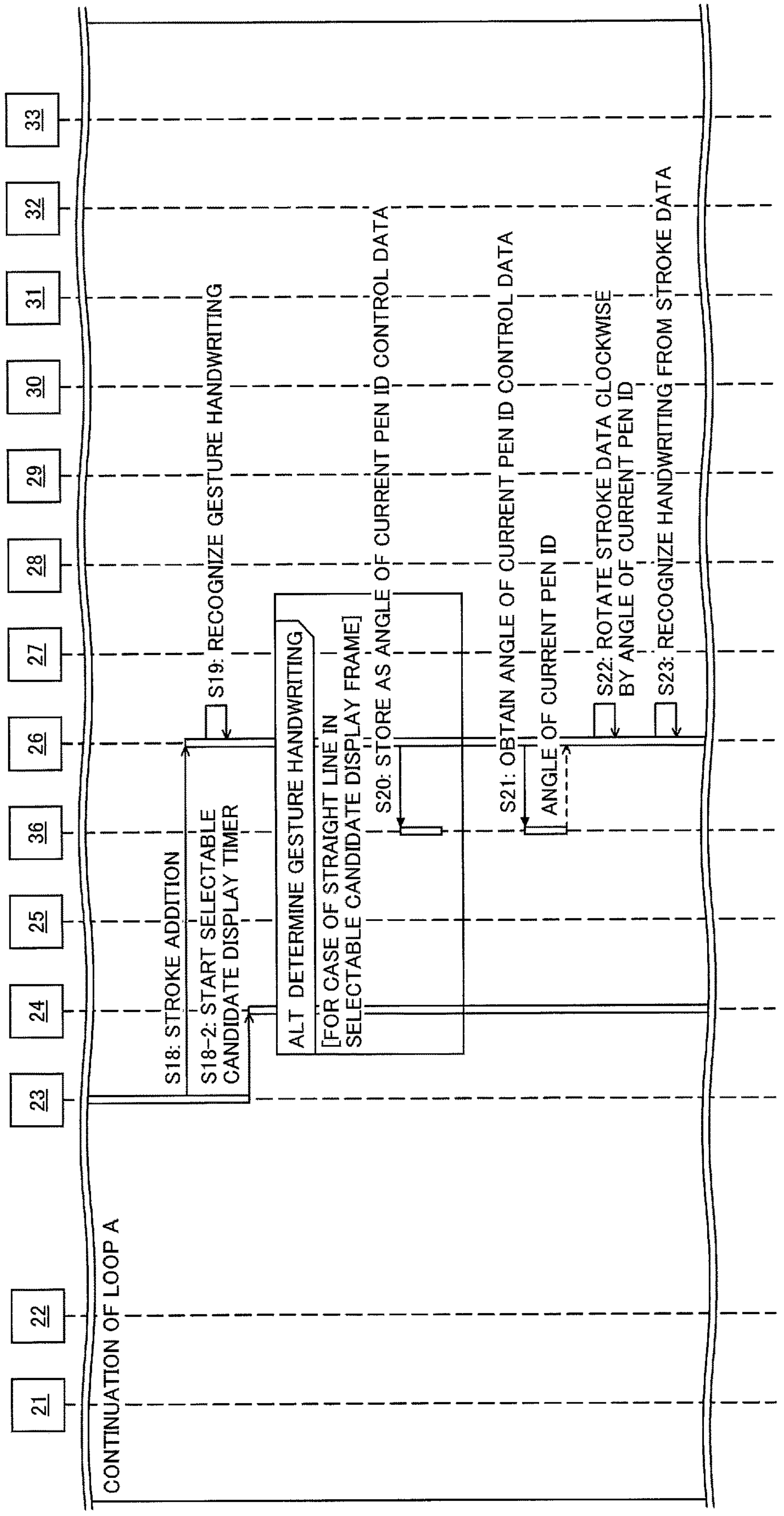
Figure 29:
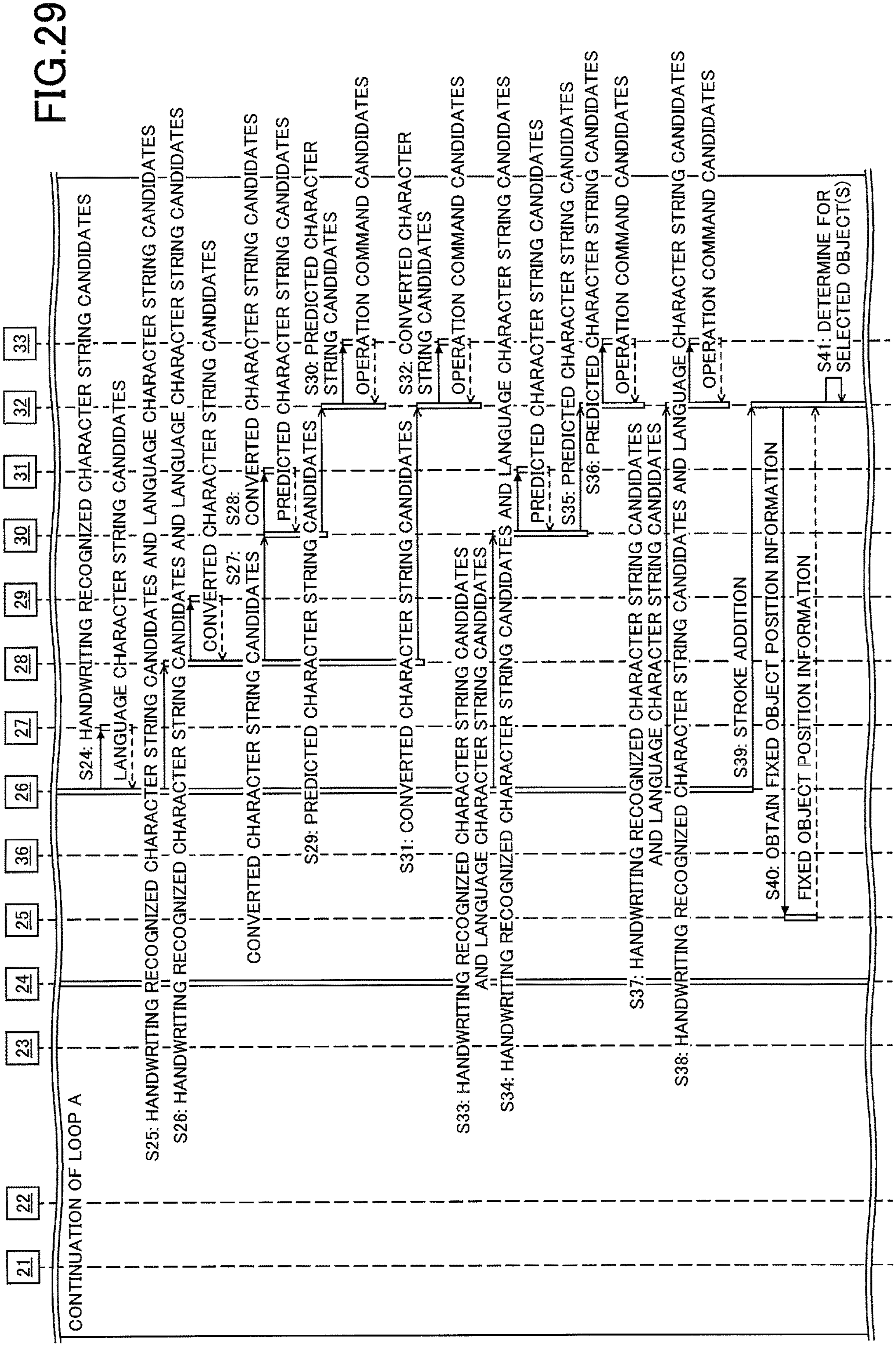
Figure 30:
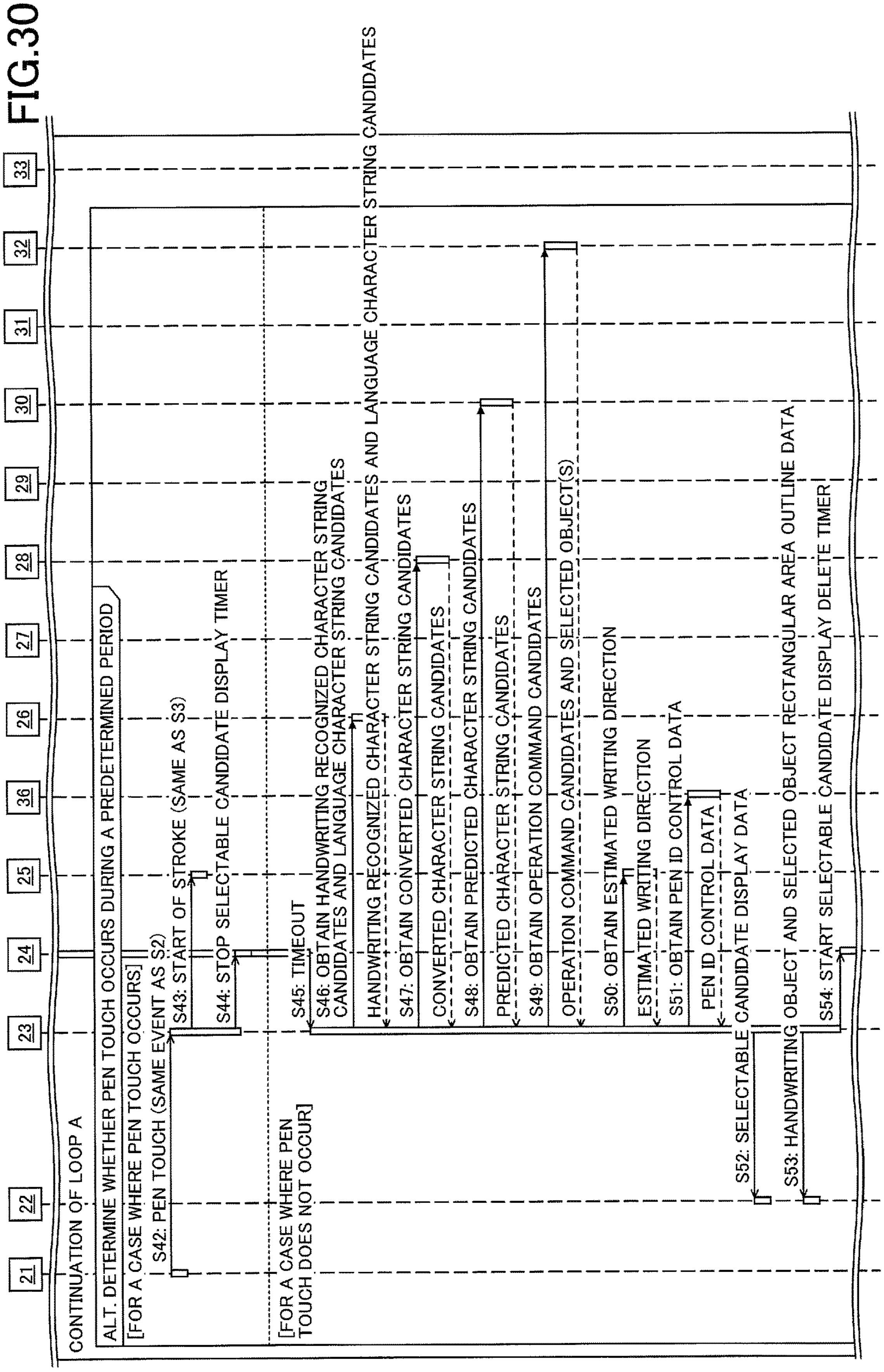
Figure 31:
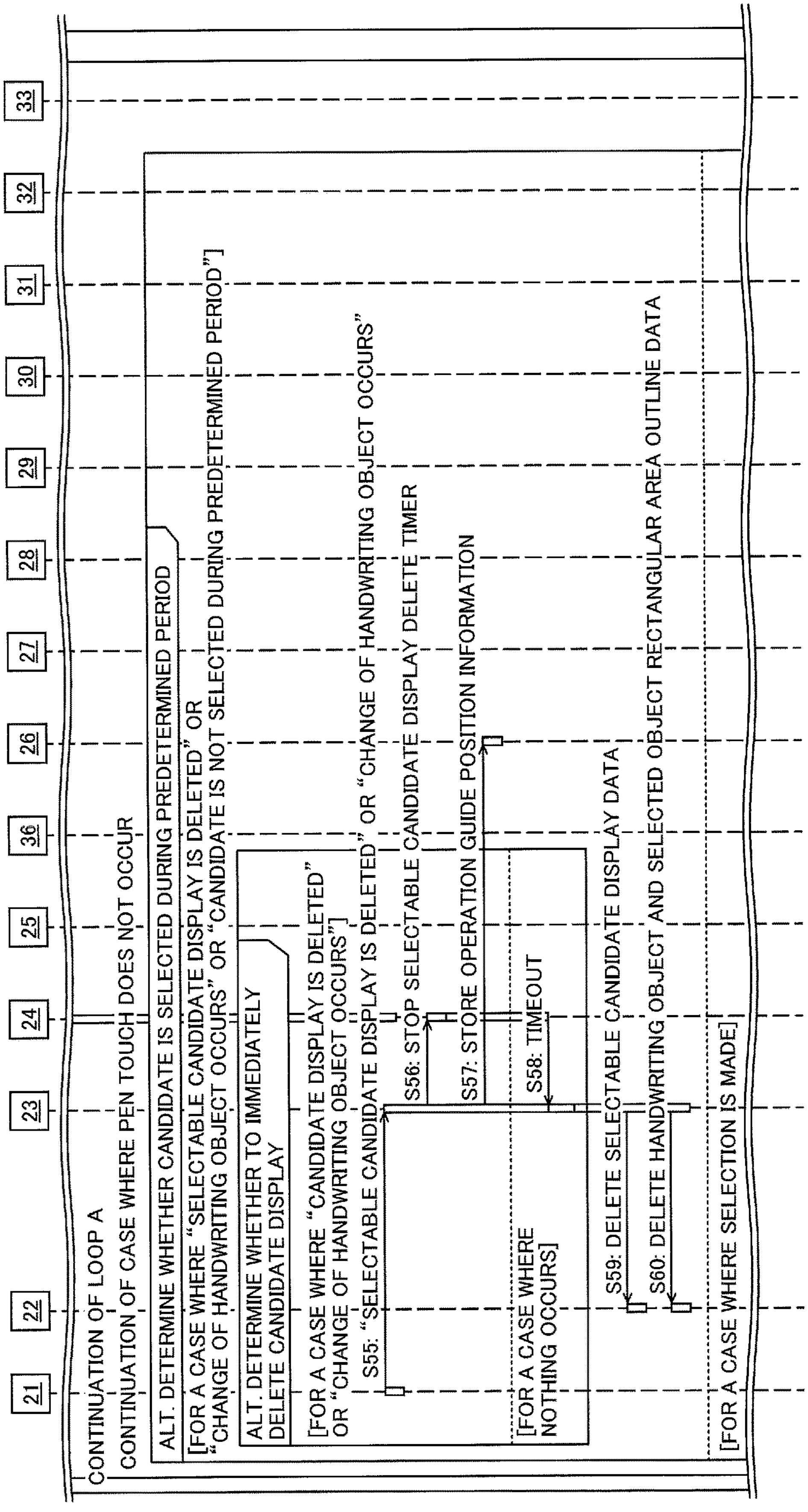
Figure 32:
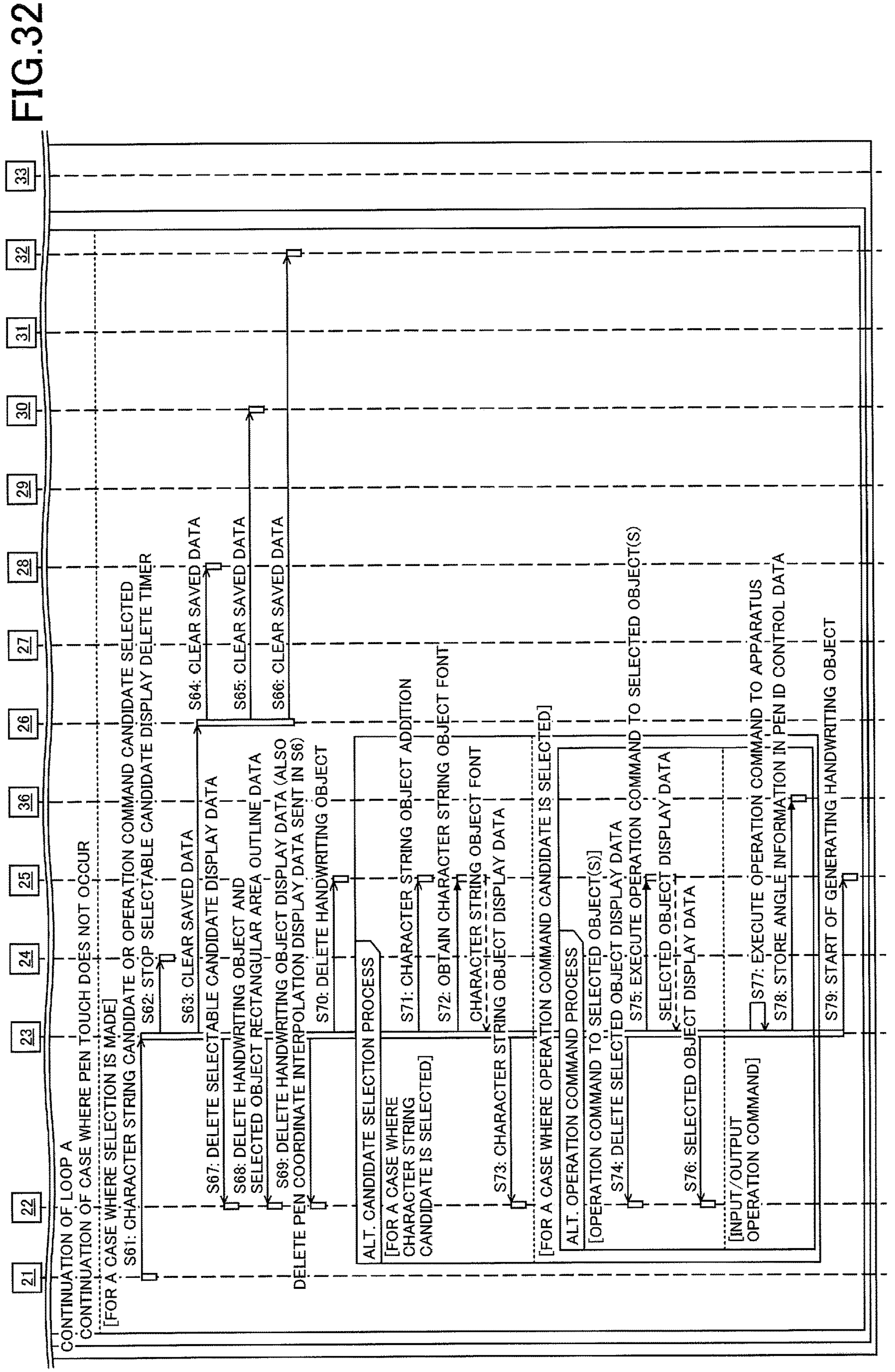

The pen ID control data is used in step S5 (obtaining of pen ID control data) of FIG. 26, step S20 (storing of angle information of pen ID control data) of FIG. 28, step S21 (obtaining of angle information of pen ID control data), step S51 (obtaining of pen ID control data) of FIG. 30, and step S78 (storing of angle information of pen ID control data) of FIG. 32.

<Examples of Displaying Selectable Candidates>

Figure 17:
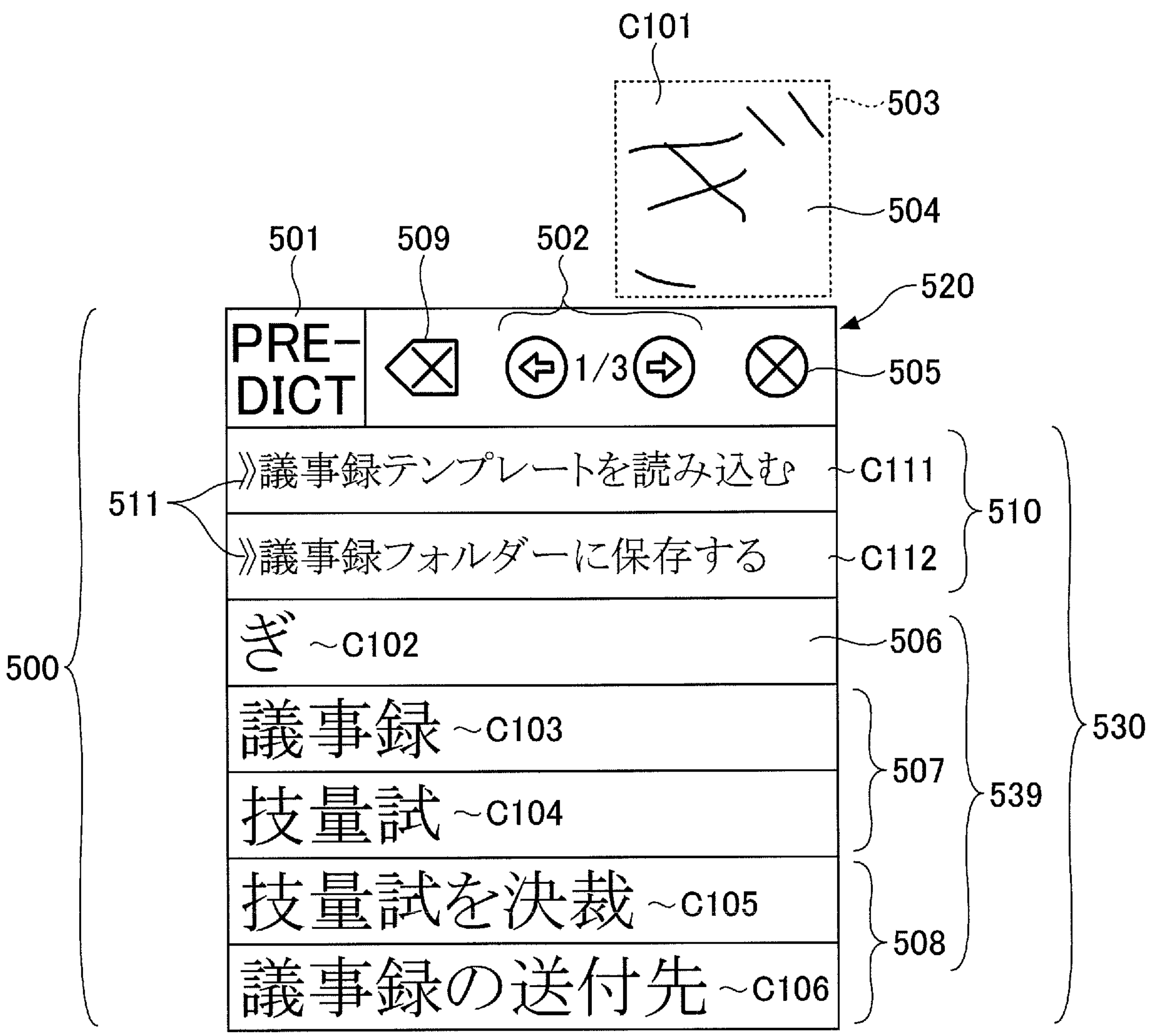
FIG. 17 depicts an example of an operation guide and selectable candidates displayed at the operation guide.

FIG. 17 depicts an example of an operation guide 500 and selectable candidates 530 displayed in the operation guide 500. As a result of the user handwriting a handwriting object 504 (and after a timeout of the selectable candidate display timer), the operation guide 500 is displayed. The operation guide 500 includes an operation header 520, operation command candidates 510, a handwriting recognized character string candidate 506, converted character string candidates 507, character-string/predictive-conversion candidates 508, and a handwriting object rectangular area outline 503. The selectable candidates 530 include the operation command candidates 510, the handwriting recognized character string candidate 506, the converted character string candidates 507, and the character-string/predictive-conversion candidates 508. Although language character string candidates are not displayed in this example, language character string candidates may be displayed. The selectable candidates 530, excluding the operation command candidates 510, will be referred to as "character string candidates" 539.

The operation header 520 has buttons 501, 509, 502, and 505. The button 501 is for receiving the user's operation of switching between predictive conversion and "Kana" conversion. In the example of FIG. 17, as a result of the user pressing the button 501 indicating "predict", the handwriting input unit 21 receives the pressing operation and sends the corresponding information to the handwriting input display control unit 23, and the display unit 22 changes the indication of the button 501 to "Kana". After the change of the indication, character string candidates 539 are displayed in the order of the probability with respect to "Kana conversion".

The button 502 is used for the user to operate candidate display pages. In the example of FIG. 17, the candidate display pages are 3 pages, and currently the first page is displayed. The button 505 is for receiving the user's operation to delete the operation guide 500. In response to the user pressing the button 505, the handwriting input unit 21 receives the pressing operation and sends the corresponding information to the handwriting input display control unit 23. As a result, the display unit 22 deletes the display other than the handwriting object 504 (C101). The button 509 is for receiving the user's operation for collective display deletion. In response to the user pressing the button 509, the handwriting input unit 21 receives the pressing operation and sends the corresponding information to the handwriting input display control unit 23. As a result, the display unit 22 deletes all the displayed contents depicted in FIG. 17, including the handwriting object 504. The user is thus allowed to newly perform handwriting.

The handwriting object 504 is the user-handwriting character C101 (a Hiragana character). The handwriting object rectangular area outline 503 surrounding the handwriting object 504 is displayed. The corresponding display procedure will be described later with reference to the sequence diagrams of FIGS. 26-32. In the example of FIG. 17, the handwriting object rectangular area outline 503 is displayed in a form of a broken-line frame.

The handwriting recognized character string candidate 506 is arranged in the probability order, the converted character string candidates 507 are arranged in the probability order, and the character-string/predictive-conversion candidates 508 are arranged in the probability order. The handwriting recognized character string candidate 506 (a character C102) is a candidate of a recognition result with respect to the handwriting object 504. In this example, the character C101 (a Hiragana character) is correctly identified from the handwriting object 504.

The converted character string candidates 507 are character string candidates obtained through conversion from language character string candidates. In this example, the term (i.e., characters C104) is an abbreviation of a Chinese character string that means "technical mass production trial". The character-string/predictive-conversion candidates 508 are predicted character string candidates converted from language character string candidates or converted character string candidates. In this example, characters C105 and characters C106 are displayed as the character-string/predictive-conversion candidates 508.

The operation command candidates 510 are selected on the basis of the operation command definition data 701-703 and 709-712 of FIG. 13A. In the example depicted in FIG. 17, the symbols ">>" 511 at the beginning indicate that the following character strings are operation command candidates. In FIG. 17, there is no selected data that has been selected with the use of the handwriting object 504 (the character C101); characters C103 which are a character string candidate obtained from the handwriting object (the character C101) is partially the same as the operation command definition data 701 and 702 depicted in FIG. 13A. Therefore, characters S111 and characters S112 are displayed as the operation command candidates 510.

In response to the user selecting the operation command candidate characters C111 (or "read a meeting minutes template"), the corresponding operation command defined by the operation command definition data 701 is executed. In response to the user selecting the operation command candidate characters C112 (or "save in a meeting minutes folder"), the corresponding operation command defined by the operation command definition data 702 is executed. Thus, operation command candidates are displayed for a case where operation command definition data including a converted character string is found. Therefore, operation command candidates are not always displayed.

As depicted in FIG. 17, the character string candidates and the operation command candidates are displayed at the same time (together). Therefore, the user can select either a character string candidate or an operation command candidate that the user intends to input.

<Positional Relationships Between Operation Guide and Handwriting Object Rectangular Area Outline>

The display unit 22 displays the operation guide 500 including text data at a position corresponding to the position of stroke data. Actually, the display unit 22 displays the operation guide 500 including text data at a position in the display screen based on the position of the stroke data. Thus, the position of the operation guide 500 depends on the position of the stroke data.

Figure 18A:
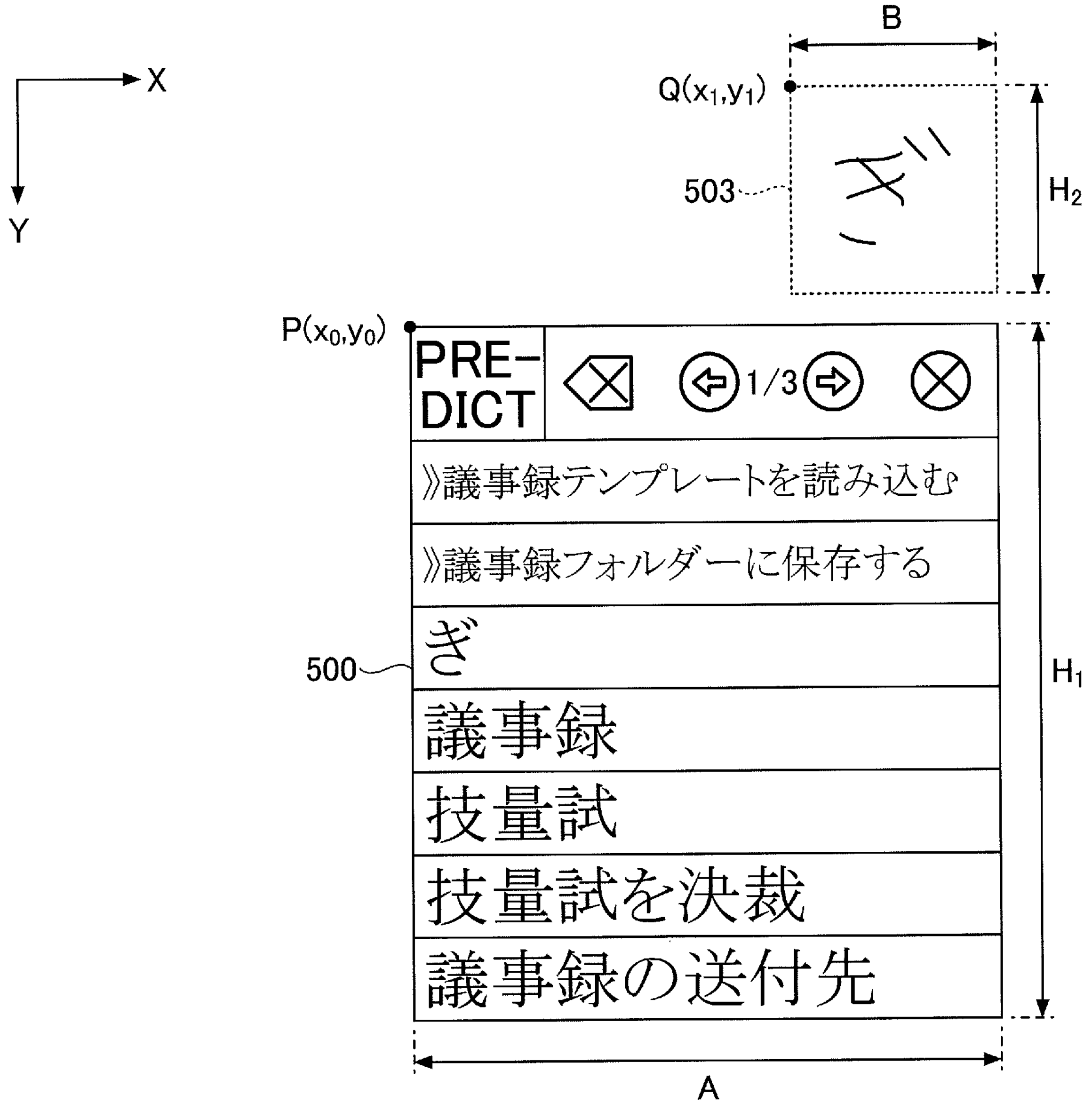
FIGS. 18A and 18B depict positional relationships between an operation guide and a handwriting object rectangular area outline.
Figure 18B:
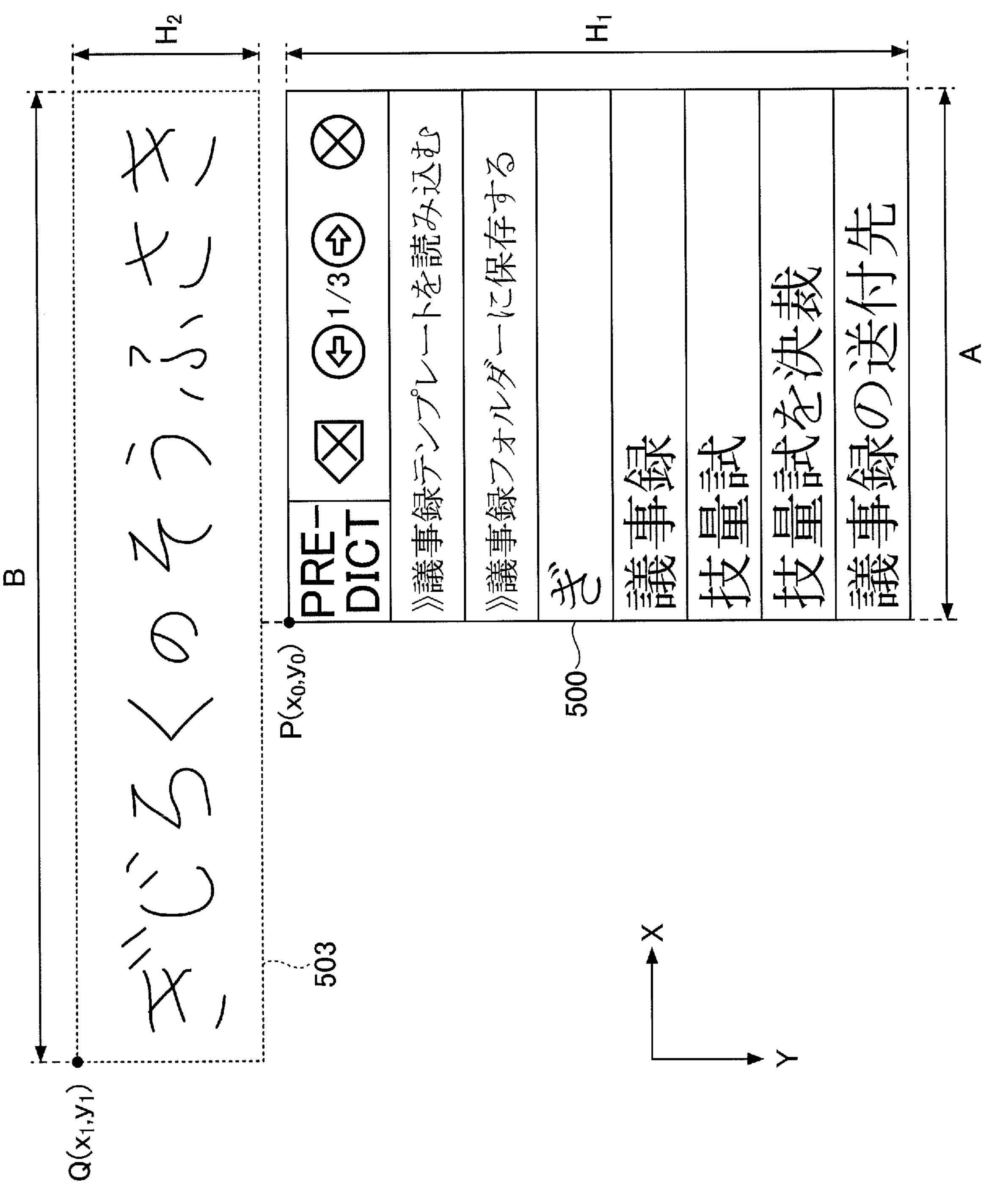

FIGS. 18A and 18B depict diagrams for illustrating relationships between the position of the operation guide and the position of the handwriting object rectangular area outline. First, the width A and height $H_1$ of the operation guide 500 are fixed. The right end of the handwriting object rectangular area outline 503 is the same x coordinate as the right end of the operation guide 500.

The width B of the handwriting object rectangular area outline 503 depends on the length of the handwriting object 504 written by the user. In FIG. 18A, because the horizontal width B of the handwriting object rectangular area outline 503 corresponds to one character and A>B, the coordinates $(x_0, y_0)$ of the upper left corner P of the operation guide 500 are calculated by the following equations. In this regard, the coordinates of the upper left corner Q of the handwriting object rectangular area outline 503 are $(x_1, y_1)$. The height of the handwriting object rectangular area outline 503 is assumed to be $H_2$.

$$x_0=x_1-(A-B)$$

$$y_0=y_1+H_2$$

As depicted in FIG. 18B, when the width B of the handwriting object rectangular area outline is larger than the width A, the coordinates $(x_0, y_0)$ of the upper left corner P of the operation guide 500 are calculated by the following equations.

$$x_0=x_1+(B-A)$$

$$y_0=y_1+H_2$$

Although, in FIGS. 18A and 18B, the operation guide 500 is below the handwriting object rectangular area outline 503, the operation guide 500 may be displayed above the handwriting object rectangular area outline 503.

Figure 19:
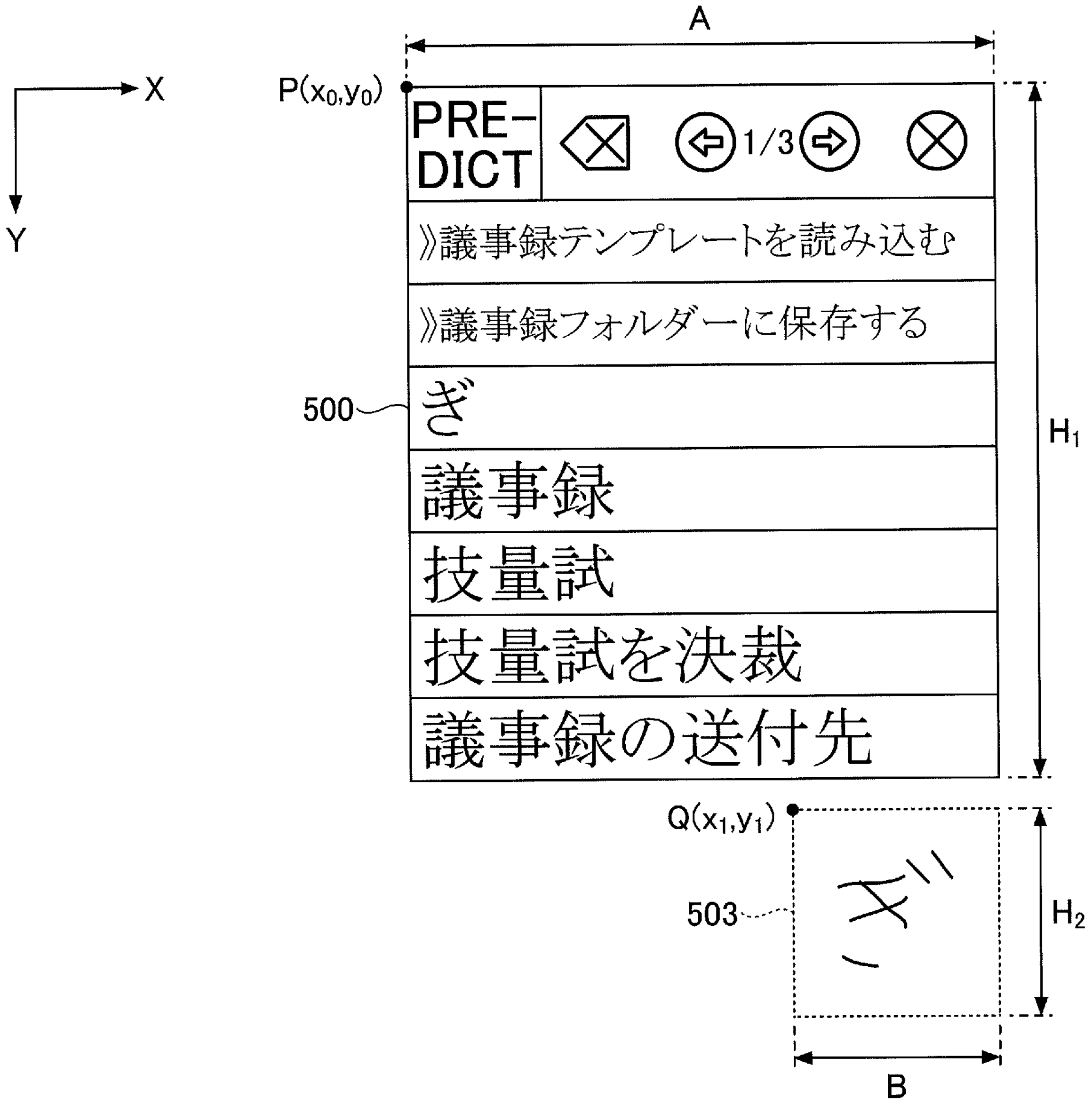
FIG. 19 depicts an operation guide displayed above a handwriting object rectangular area outline.

FIG. 19 depicts the operation guide 500 displayed above the handwriting object rectangular area outline 503. The calculation method of $x_1$ in this case is the same as the case of FIGS. 18A and 18B, but the calculation method of $y_0$ is different as follows.

$$y_0=y_1-H_1$$

Alternatively, the operation guide 500 may be displayed on the right side or the left side of the handwriting object rectangular area outline 503. For a case where the user handwrites, for example, a character at an end of the display screen so that there is no display space for the operation guide 500 at a predetermined side, the operation guide 500 is displayed on any side of the handwriting character where there is a display space.

<Example of Determining Selected Object>

According to the handwriting input apparatus 2 of the present embodiment, the user can determine a selected object by selecting a fixed object through handwriting. The selected object is an object to be edited or modified.

FIGS. 20A-20D depict examples of determining a selected object. In FIGS. 20A-20D, a solid line represents a handwriting object 11, halftone dots represent a handwriting object rectangular area 12, solid lines represent a fixed object 13, and broken lines represent a selected object rectangular area 14. Lowercase English characters are appended to reference numerals to distinguish between them. In addition, as a determination condition (for determining whether or not a predetermined relationship exists) for determining whether a fixed object is a selected object, the connecting line determination condition 406 or the enclosing line determination condition 407 of the defined control data depicted in FIG. 9 is used.

Figure 20A:
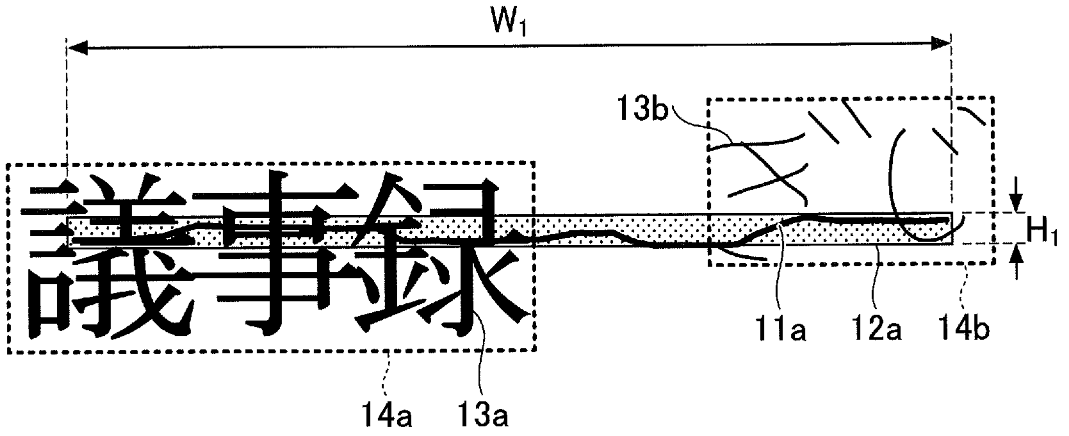
FIGS. 20A-20D depict examples of determining a selected object.

FIG. 20A depicts an example where two fixed objects 13*a* and 13*b* in horizontal writing are selected by the user with the use of a connecting line (a handwriting object 11*a*). In this example, because the length $H_1$ of the short side and the length $W_1$ of the long side of the handwriting object rectangular area 12*a* satisfy the connecting line determination condition 406 and the overlap rate with the fixed objects 13*a* (three Chinese characters) and 13*b* (two Hiragana characters) satisfies the connecting line determination condition 406, both the fixed objects 13*a* and 13*b* are determined as selected objects.

Figure 20B:
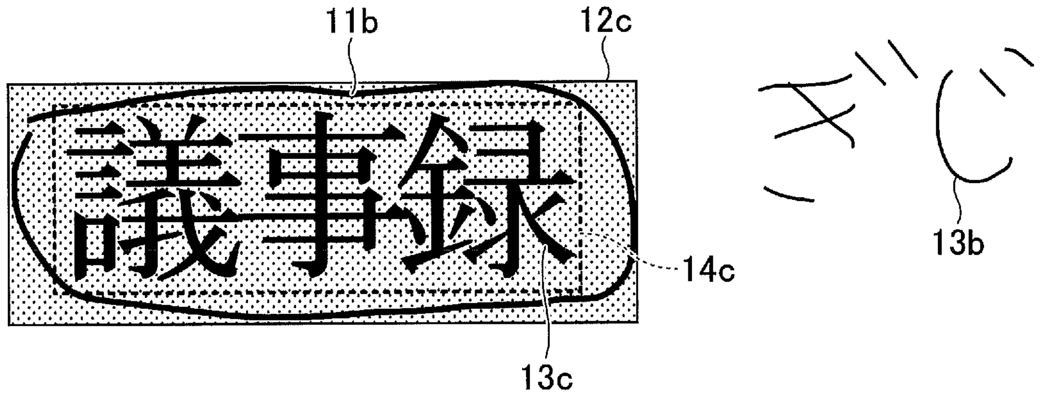

FIG. 20B is an example where the fixed object 13*c* in horizontal writing is selected by an enclosing line (a handwriting object 11*b*). In this example, only the fixed object 13*c* (three Chinese characters), where the overlap ratio between the fixed object 13*c* and the handwriting object rectangular area 12*c* satisfies the enclosing line determination condition 407, is determined as a selected object.

Figure 20C:
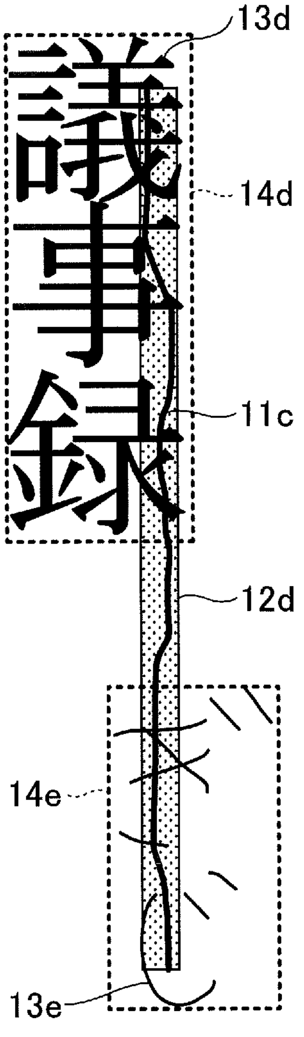

FIG. 20C is an example where a connecting line (a handwriting object 11*c*) is used to select the plurality of fixed objects 13*d* and 13*e* written vertically. In this example, as in FIG. 20A, the length $H_1$ of the short side and the length $W_1$ of the long side of the handwriting object rectangular area 12*d* satisfy the connecting line determination condition 406 and the overlap rate with the two fixed objects 13*d* and 13*e* satisfies the connecting line determination condition 406. Therefore, both the fixed objects 13*d* (three Chinese characters) and 13*e* (two Hiragana characters) are determined as selected objects.

Figure 20D:
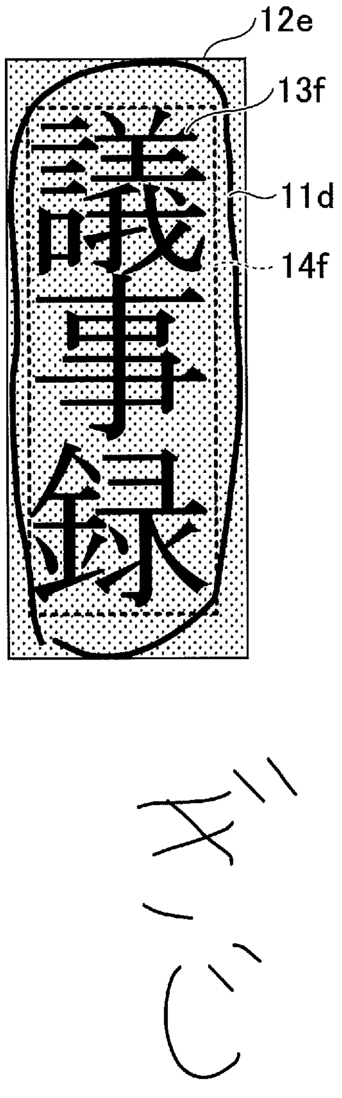

FIG. 20D is an example where the vertically written fixed object 13*f* is selected by an enclosing line (a handwriting object 11*d*). In this example, as in FIG. 20B, only the fixed object 13*f* (three Chinese characters) is determined as a selected object.

<Example of Displaying Operation Command Candidates>

Figure 21A:
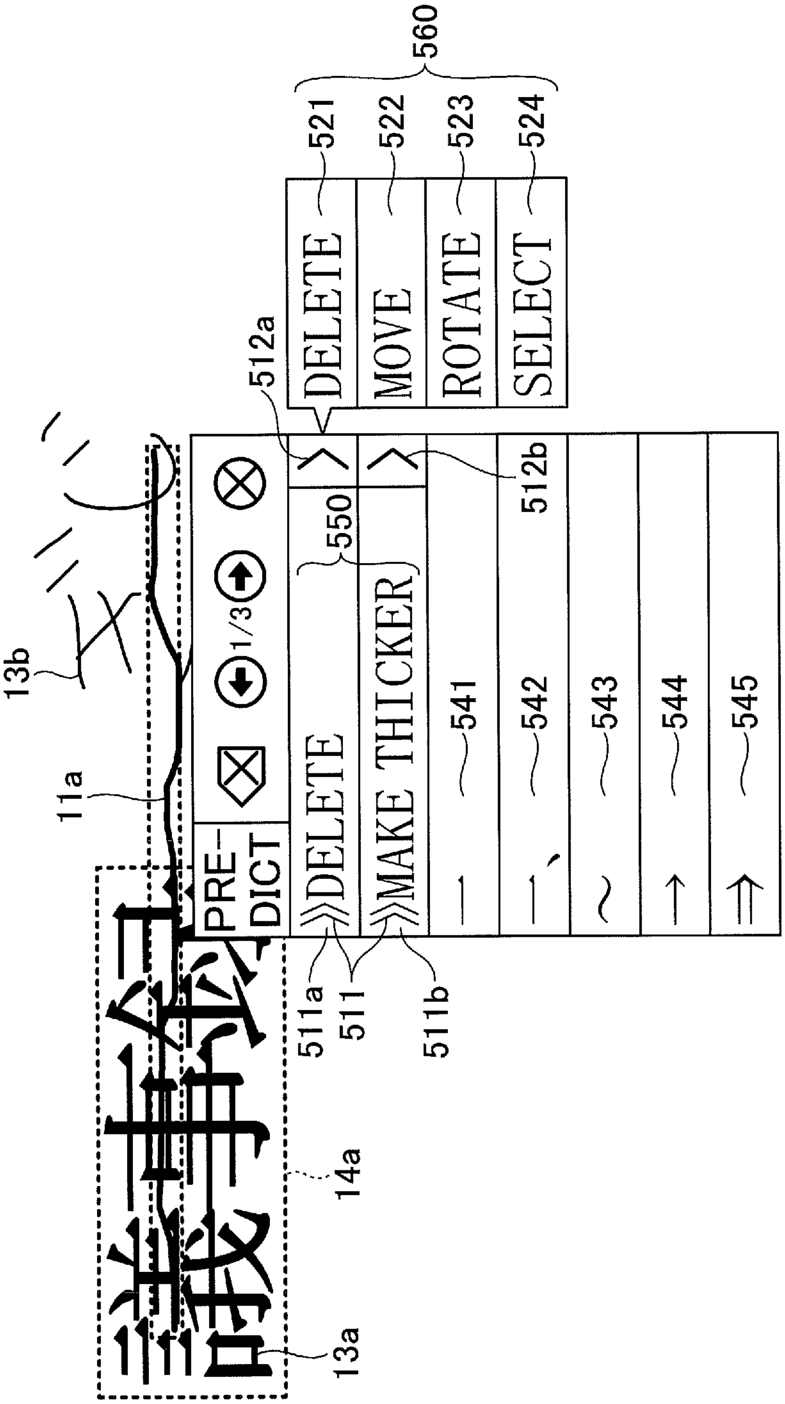
FIGS. 21A and 21B depict examples of displaying operation command candidates on the basis of the operation command definition data for a case where there is a handwriting object.
Figure 21B:
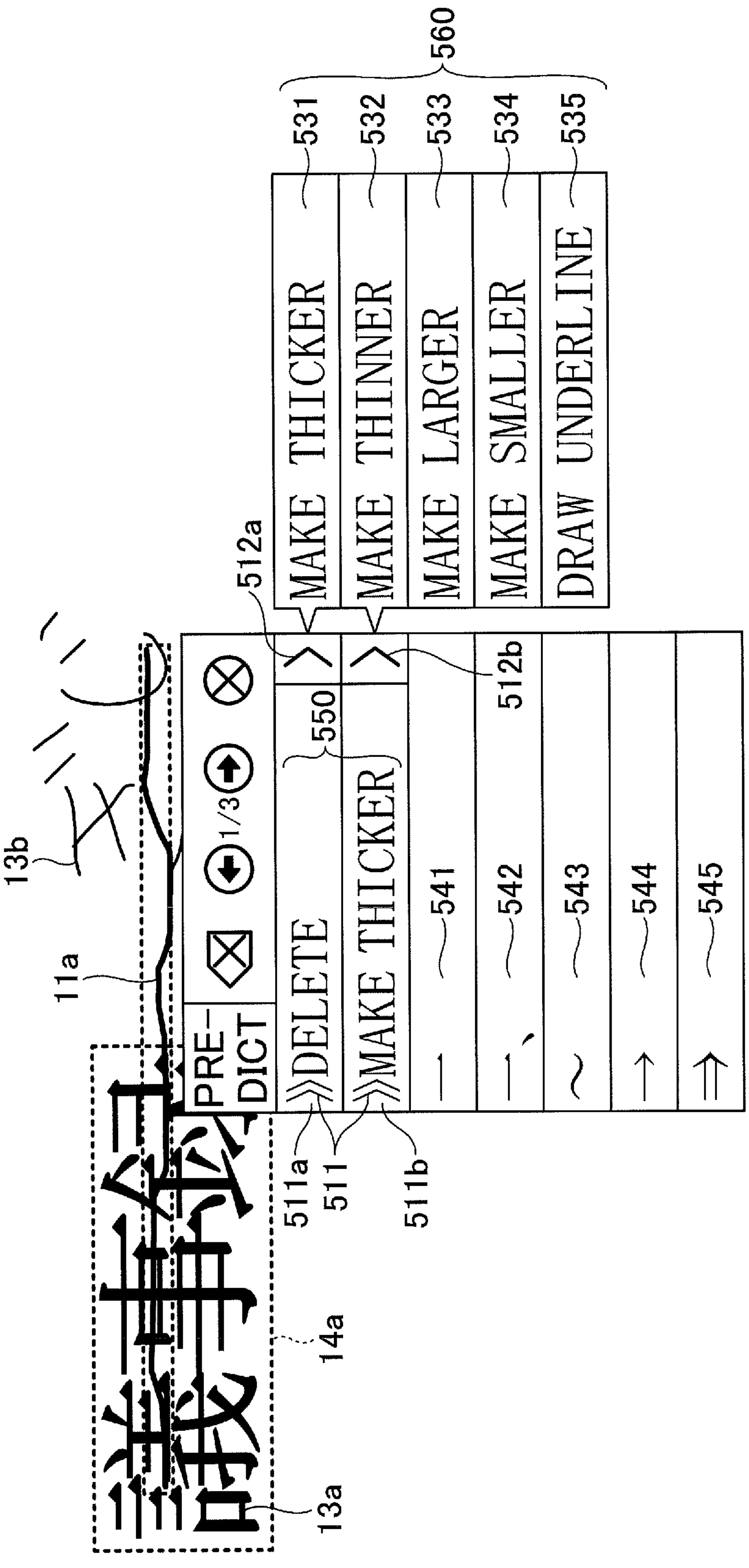

FIGS. 21A and 21B depict display examples of operation command candidates on the basis of the operation command definition data for a case where there is a handwriting object depicted in FIG. 14. FIG. 21A depicts operation command candidates of an editing system; FIG. 21B depicts operation command candidates of a modifying system. FIG. 21A depicts an example where the selected objects are determined with the use of the handwriting object 11*a* as in FIG. 20A.

As depicted in FIGS. 21A and 21B, a main menu 550 includes operation command candidates displayed after the line-head symbols 511 ">>". The main menu 550 displays the last executed operation command names or the first operation command names in the operation command definition data. The first line of the operation command candidate "DELETE" (511*a*) is of an editing operation command; the second line of the operation command "MAKE THICKER" (511*b*) is of a modifying operation command.

The symbols ">" 512*a* and 512*b* (an example of submenu buttons) at the ends of the lines indicate that there are submenus. The first-line symbol ">" 512*a* is to display a submenu (selected lastly) for operation commands of an editing system; the second line of the symbol ">" 512*b* is to display the remaining submenu for operation commands of a modifying system. In response to the user pressing the symbol ">" 512*a*, the submenu 560 is displayed to the right. The submenu 560 displays all the operation commands defined in the operation command definition data. The submenu 560 is displayed from the time the main menu 550 is displayed or the submenu 560 is displayed in response to the user pressing the first-line symbol ">" 512*a* as mentioned above.

In response to the user pressing any one of the displayed operation command names with the pen, the handwriting input display control unit 23 executes the "Command" (see FIG. 14) of the operation command definition data associated with the pressed operation command name on the selected objects. That is, the selected objects can be "deleted" in response to the name "DELETE" 521 being pressed; the selected objects can be "moved" in response to the name "MOVE" 522 being pressed; the selected objects can be "rotated" in response to the name "ROTATE" 523 being pressed; another operation can be "selected" for the selected objects in response to the name "SELECT" 524 being pressed.

For example, in response to the user pressing "DELETE" 521 with the pen, the selected objects 13*a* (three Chinese characters) and 13*b* (two Hiragana characters) can be deleted. In response to any one of "MOVE" 522, "ROTATE" 523, and "SELECT" 524 being pressed, bounding boxes (the circumscribed rectangles of the selected objects) can be displayed. Then, through a dragging operation with the pen, the user can move or rotate the selected objects in case of "MOVE" 522 or "ROTATE" 523 being pressed. In case of "SELECT" 524 being pressed, the user can perform another operation on the bounding boxes.

The other character string candidates than the operation command candidates, i.e., character strings 541 (a Chinese character), 542 (a Chinese character and a Hiragana character), "~" 543, "→" 544, and "⇒" 545, are the recognition results with respect to the connecting line (the handwriting object 11*a*). In a case where the user intends to input such a character string instead of an operation command, the user is allowed to select the corresponding character string candidate.

Concerning FIG. 21B, the submenu 560 is displayed in response to the user pressing the second-line symbol ">" 512*b*. The main menu 550 and the submenu 560 are displayed in the display example depicted in FIG. 21B as in the case of FIG. 21A. On the basis of the operation command definition data of FIG. 14, the handwriting input display control unit 23 can be caused to thicken the lines, with which the selected objects are drawn, in response to "MAKE THICKER" 531 being pressed; the handwriting input display control unit 23 can be caused to thin the lines, with which the selected objects are drawn, in response to "MAKE THINNER" 532 being pressed; the handwriting input display control unit 23 can be caused to enlarge the selected objects in response to "MAKE LARGER" 533 being pressed; the handwriting input display control unit 23 can be caused to reduce the selected objects in size in response to "MAKE SMALLER" 534 being pressed; the handwriting input display control unit 23 can be caused to draw an underline to the selected objects in response to "DRAW UNDERLINE" 535 being pressed.

Further, the following values have been defined separately: how much the lines, with which the selected objects are drawn, are to be thickened for a case where "MAKE THICKER" 531 is pressed; how much the lines, with which the selected objects are drawn, are to be thinned for a case where "MAKE THINNER" 532 is pressed; how much the selected objects are to be enlarged for a case where "MAKE LARGER" 533 is pressed; how much the selected objects are to be reduced in size for a case where "MAKE SMALLER" 534 is pressed; which line type of underline is to be selected for a case where "DRAW UNDERLINE" 535 is pressed. More desirably, in response to any element of the submenu 560 of FIG. 21B being selected, a corresponding selection menu may be further displayed to allow the user to make a corresponding adjustment.

In more detail, in response to the user pressing "MAKE THICKER" 531 with the pen, the handwriting input display control unit 23 can be made to thicken the lines, with which the fixed objects 13*a* (three Chinese characters) and 13*b* (two Hiragana characters) are drawn. In response to the user pressing "MAKE THINNER" 532 with the pen, the handwriting input display control unit 23 can be made to thin the lines, with which the fixed objects 13*a* (three Chinese characters) and 13*b* (two Hiragana characters) are drawn. In response to the user pressing "MAKE LARGER" 533 with the pen, the handwriting input display control unit 23 can be made to enlarge the fixed objects 13*a* (three Chinese characters) and 13*b* (two Hiragana characters). In response to the user pressing "MAKE SMALLER" 534 with the pen, the handwriting input display control unit 23 can be made to reduce the fixed objects 13*a* (three Chinese characters) and 13*b* (two Hiragana characters) in size. In response to the user pressing "DRAW UNDERLINE" 535 with the pen, the handwriting input display control unit 23 can be made to draw underlines to the fixed objects 13*a* (three Chinese characters) and 13*b* (two Hiragana characters).

Figure 22A:
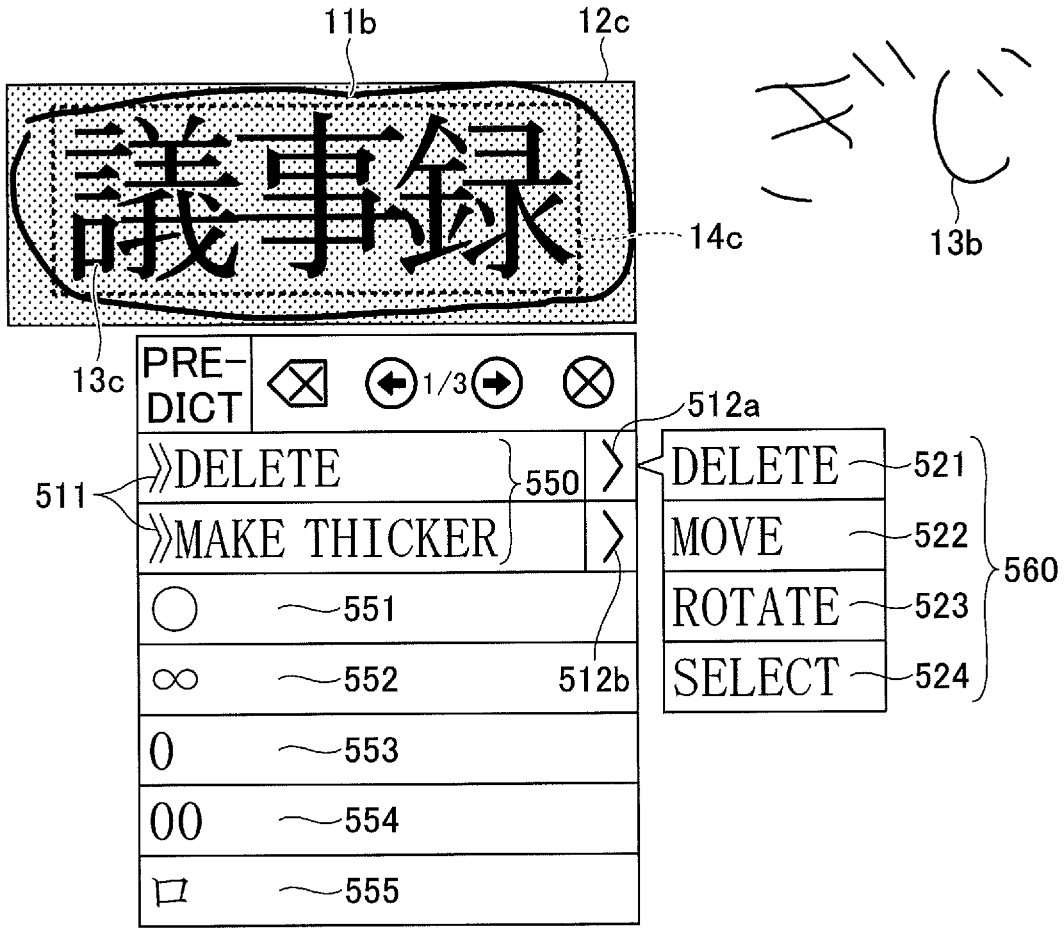
FIGS. 22A and 22B depict examples of displaying operation command candidates on the basis of the operation command definition data for a case where there is a handwriting object.
Figure 22B:
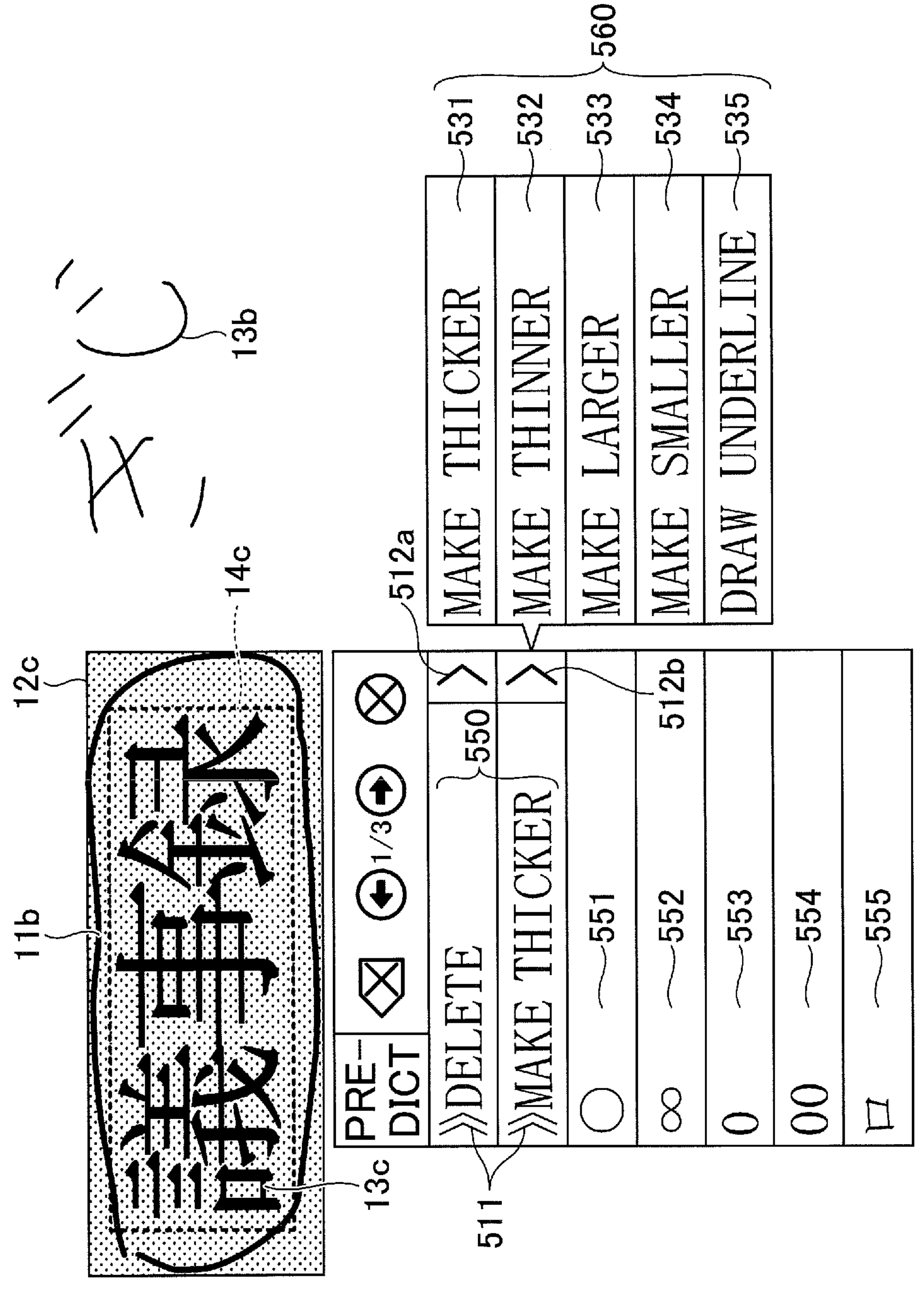

FIGS. 22A and 22B depict display examples of operation command candidates on the basis of the operation command definition data for a case where there is a handwriting object depicted in FIG. 14. The difference from FIGS. 21A and 21B is that FIGS. 22A and 22B depict an example where the selected object is determined with the use of the handwriting object 11*b* (the enclosing line) of FIG. 20B. As can be seen from comparison between FIGS. 21A and 21B and FIGS. 22A and 22B, there is no difference in the operation command candidates displayed regardless of whether the handwriting object to be used to determine a selected object(s) is a connecting line or an enclosing line. This is because, in either case, the handwriting input display control unit 23 displays operation command candidates on the display unit 22 in response to a selected object(s) being determined. In this regard, it is also possible to change the contents of operation command candidates to be displayed according to a recognition result of a handwriting object 11*a* or 11*b*. In this case, operation command definition data such as the operation command definition data depicted in FIG. 14 are associated with identified handwriting objects (such as the Chinese numeral corresponding to the numeral "1", the symbol "○", and so forth).

In FIGS. 22A and 22B, the symbols "○" 551 and "○○" 552, the numerals "0" 553 and "00" 554, and the Katakana character 555, which are character string candidates other than the operation command candidates, are the recognition results obtained with respect to the enclosing line (the handwriting object 11*b*), and any one of these character string candidates can be selected by the user in a case where the user intends to input the character string instead of operation commands.

<Example of Input of Angle Information>

Figure 23A:
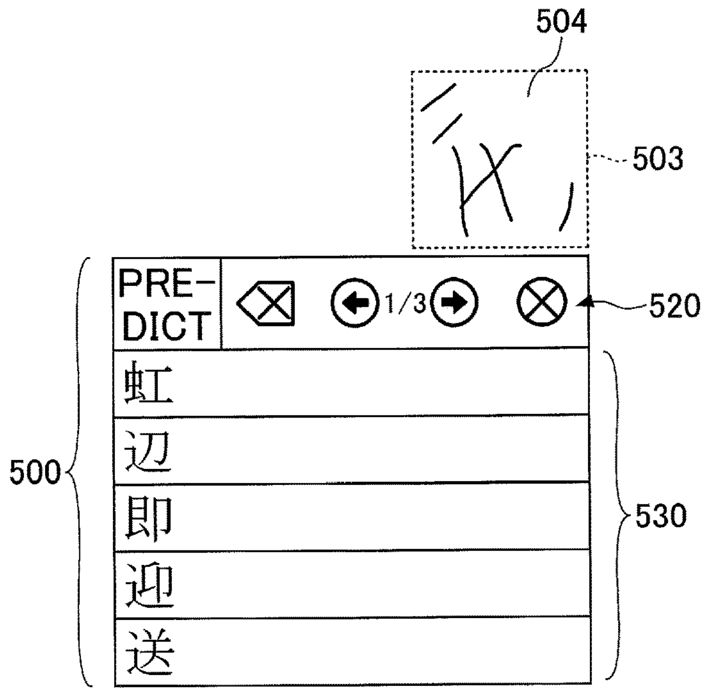
FIGS. 23A-23C depict diagrams for illustrating a method for inputting angle information of 90 degrees.
Figure 23B:
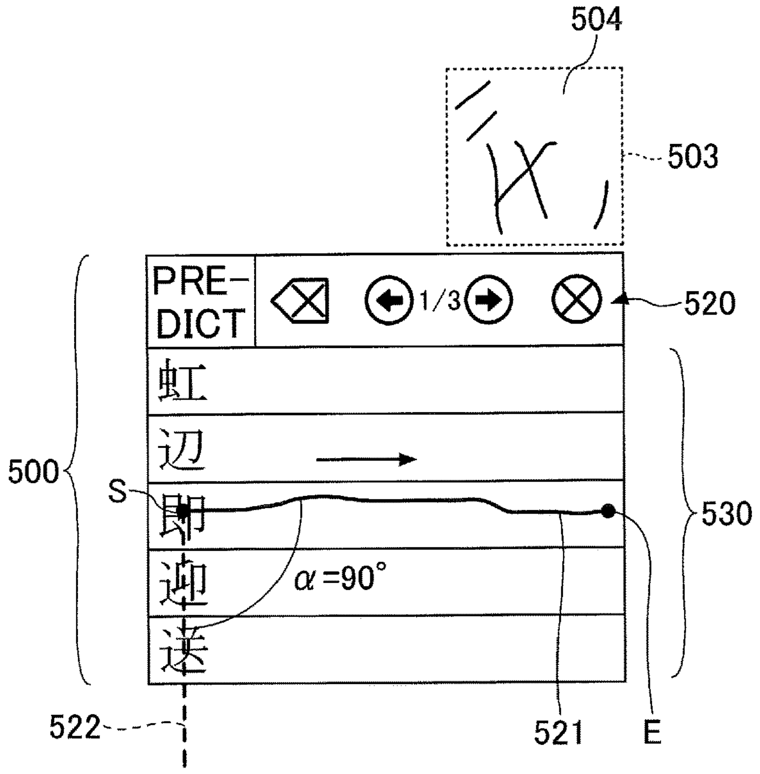
Figure 23C:
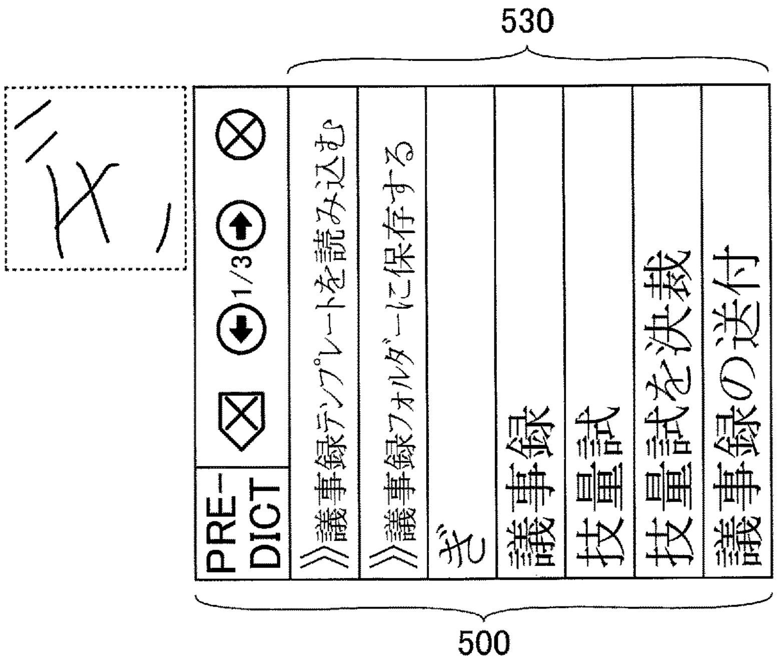

Next, a method for inputting the angle information will be described with reference to FIGS. 23A-23C. FIGS. 23A-23C depict an example for illustrating an input method for the angle information. FIGS. 23A-23C depict a case in which the user is in the 3 o'clock direction of the handwriting input apparatus 2 inputs the angle information. Because a handwriting character written from the 3 o'clock direction is correctly identified when the character is rotated 90 degrees clockwise, 90-degree angle information is to be input.

FIG. 23A depicts a state in which the operation guide 500 is displayed in response to the user in the 3 o'clock direction of (i.e., on the right side in FIG. 23A of) the handwriting input apparatus 2 handwriting the Hiragana character (handwriting object 504) (having the pronunciation "gi") in a state in which the angle information of the pen ID control data is 0 degrees (the initial value). Because the handwriting input apparatus 2 tries to identify the handwriting Hiragana character (handwriting object 504) (having the pronunciation "gi") written from the 3 o'clock direction while the angle information is 0 degrees, the thus obtained selectable candidates 530 different from the expected result (i.e., the correct identification result) are displayed.

In order to input the angle information, the user handwrites a straight line from top to bottom viewed from the user, inside the operation guide 500 (one example of a predetermined area), as depicted in FIG. 23B. FIG. 23B depicts an example of the thus handwritten straight line 521. The angle α between the 6 o'clock direction corresponding to 0-degree angle information and the line 521 is the angle information. That is, the counterclockwise angle α from the straight line 522 extending in the 6 o'clock direction (i.e., downward in FIG. 23B) from the start point S to the straight line 521 handwritten by the user is the angle information. Briefly, the end point direction of the line 521 is the angle information. Therefore, the angle information input by the user in FIG. 23B is 90 degrees.

An actual method for detecting such a straight line 521, for example, is a method in which the coordinates from the start point S to the end point E are converted into a straight line according to the least-square method, and the obtained correlation coefficient is compared with a threshold to determine whether a straight line is actually detected.

Immediately after the user starts handwriting the straight line 521 (immediately after the pen 2500 touches the start point S for the straight line 521), the handwriting input apparatus 2 deletes the operation guide 500. Immediately after ending handwriting the straight line 521 (immediately after the user removes the pen 2500 from the end point E of the straight line 521), the handwriting input apparatus 2 searches for and determines the closest value of the above-described angle α from among 45 degrees, 90 degrees, 135 degrees, 180 degrees, 215 degrees, 270 degrees, 315 degrees, and 360 degrees. Alternatively, the angle α itself may be used as the angle information. As the item "Angle" of the pen ID control data, the thus obtained angle information is set. The pen event transmitting unit 41 of the pen 2500 transmits the pen ID to the handwriting input apparatus 2 when the tip of the pen is pressed for, for example, a handwriting operation. Therefore, the handwriting input apparatus 2 can associate the angle information with the pen ID control data.

In this regard, only the operation guide 500 can be used for the user to handwrite the straight line and input the angle information. Therefore, when the user handwrites the straight line outside the operation guide 500, the thus handwritten straight line is identified as the Arabic numeral "1", the corresponding Chinese numeral, or the like, whereas, when the straight line is handwritten inside the operation guide 500, as depicted in FIG. 23B, the angle information can be input. That is, the handwriting recognition control unit 26 detects a straight line from a predetermined area, whereas, the handwriting recognition control unit 26 converts handwriting stroke data outside the predetermined area into text data.

FIG. 23C depicts the operation guide 500 displayed immediately after the operation described above with reference to FIG. 23B is performed. Because the 90-degree angle information (Angle) is thus set in the pen ID control data, the handwriting object (stroke data) is internally rotated in the clockwise direction by 90 degrees, handwriting object recognition is then performed, and the operation guide 500 is rotated in the counterclockwise direction by 90 degrees and is displayed, as depicted in FIG. 23C.

Figure 24A:
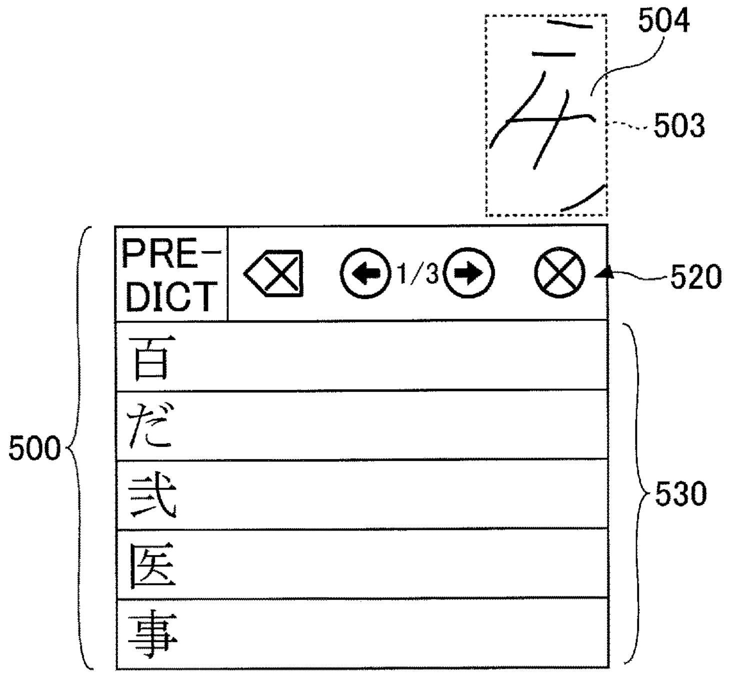
FIGS. 24A-24C depict diagrams for illustrating a method for inputting angle information of 45 degrees.
Figure 24B:
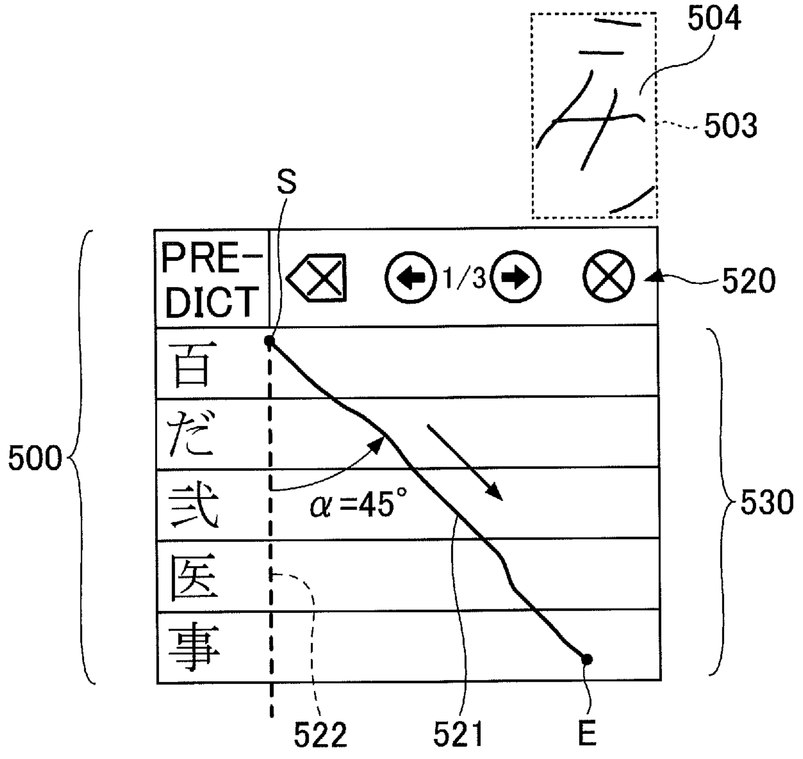
Figure 24C:
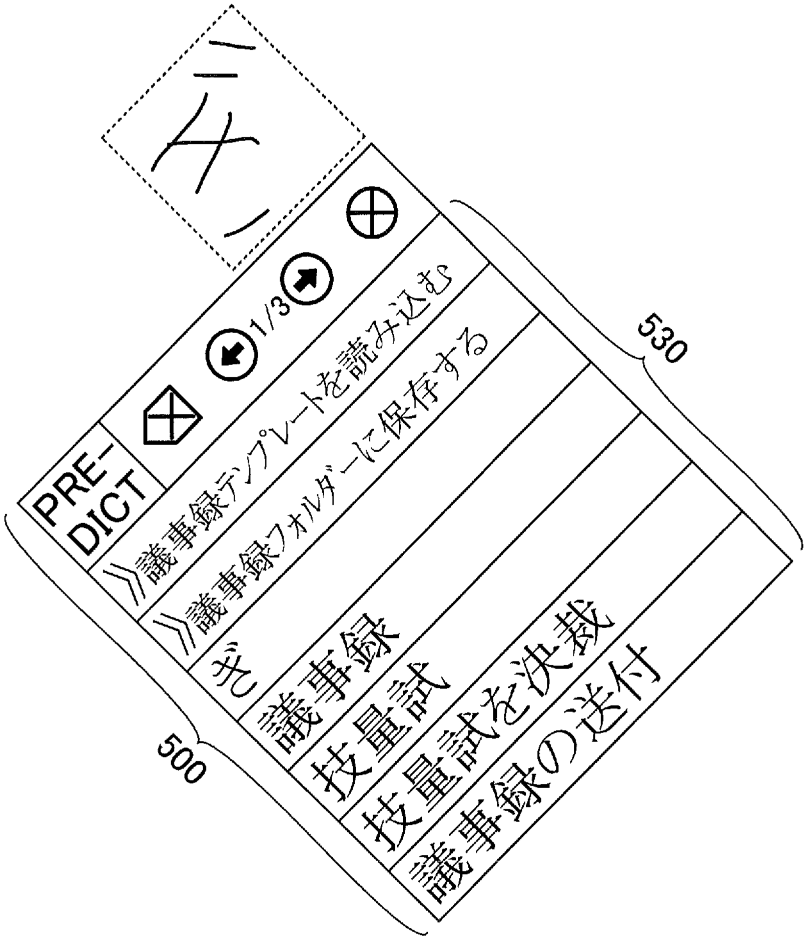

FIGS. 24A-24C depicts an example for illustrating an input method for the angle information of 45 degrees. FIGS. 24A-24C depict a case in which the user in the direction intermediate between the 4 o'clock direction and the 5 o'clock direction of the handwriting input apparatus 2 inputs the angle information. The handwriting character handwritten from the direction intermediate between the 4 o'clock direction and the 5 o'clock direction is correctly identified when the handwriting character is rotated 45 degrees clockwise. Therefore, 45-degree angle information is to be input in this case.

FIG. 24A depicts a state in which the operation guide 500 and the selectable candidates are displayed in response to the user in the direction intermediate between the 4 o'clock direction and the 5 o'clock direction of the handwriting input apparatus 2 handwriting the character (handwriting object 504) with the angle information being 0 degrees (the initial value). Because the handwriting input apparatus 2 performs a handwriting object recognizing operation on the handwriting character handwritten from the direction intermediate between the 4 o'clock direction and the 5 o'clock direction with the angle information being 0 degrees, the selectable candidates that are different from the expected recognition result (i.e., the correct recognition result) are displayed as depicted in FIG. 24A.

In order to input the angle information, the user handwrites a straight line from the top to the bottom viewed from the user inside the operation guide 500. FIG. 24B depicts an example of the thus handwritten straight line 521. The angle α from the 6 o'clock direction of the 0-degree angle information to the straight line 521 is the angle information. Therefore, the angle information input by the user in FIG. 24B is 45 degrees. This angle information (45 degrees) is set as Angle of the pen ID control data.

FIG. 24C depicts the operation guide 500 immediately after the operation of FIG. 24B. Because the pen ID control data is set to have the 45-degree angle information (Angle), the handwriting object 504 is internally rotated by 45 degrees clockwise for a handwriting object recognition operation, and the operation guide 500 is rotated by 45 degrees counterclockwise and displayed.

Figure 25:
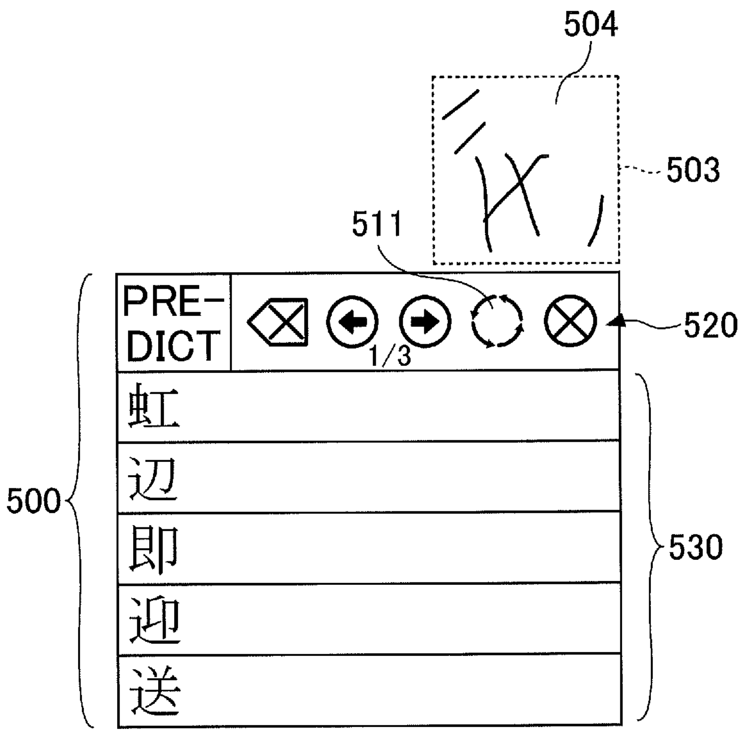
FIG. 25 depict a diagram for illustrating another method for inputting angle information.

FIG. 25 depicts an example for illustrating another input method for the angle information. In FIG. 25, the user is in the 3 o'clock direction of the handwriting input apparatus 2. In FIG. 25, the user in the 3 o'clock direction of the handwriting input apparatus 2 handwrites the Hiragana character (the handwriting object 504) (having the pronunciation "gi") with the angle information being 0 degrees (the initial value), and thus, the operation guide 500 is displayed. The operation guide 500 of FIG. 25 includes a rotating operation button 511 in the operation header 520. The icon of the rotating operation button 511 is circular so that the user is allowed to easily identify the rotating operation button 511 from any direction.

The rotating operation button 511 is a button for the user to add 90 degrees to the angle information of the pen ID control data each time of pressing with the pen 2500 and changes the angle information to be the value obtained as the remainder obtained from dividing the angle information (the adding result) by 360 degrees. The remainder is the angle information. In this regard, the angle to be added each time of pressing the rotating operation button 511 may be 45 degrees instead of 95 degrees. More desirably, it is also possible that the current angle information is displayed (for example, by popping up of the angle information) every time the rotating operation button 511 being pressed.

<Operation Procedure>

Operations of the handwriting input apparatus 2 will be described with reference to FIGS. 26-32 as well as with reference to the configurations described above. FIGS. 26-32 depict sequence diagrams for illustrating examples of processes where the handwriting input apparatus 2 displays character string candidates and operation command candidates. The process of FIG. 26 starts when the handwriting input apparatus 2 starts (when the corresponding application starts). In FIGS. 26-32, the functions of FIG. 7 are represented by the corresponding reference numerals in consideration of space limitation.

S1: The handwriting input display control unit 23 first transmits an event of start of generating a handwriting object to the handwriting input storage unit 25. The handwriting input storage unit 25 allocates a handwriting object area (a memory area for storing a handwriting object). The user may have to touch the handwriting input unit 21 with the pen in order to allocate the handwriting object area.

S2: The user then touches the handwriting input unit 21 with the pen. The handwriting input unit 21 detects the pen touch and transmits the pen touch event to the handwriting input display control unit 23.

S3: The handwriting input display control unit 23 transmits a stroke start event to the handwriting input storage unit 25, and the handwriting input storage unit 25 allocates a stroke area (a memory area).

S4: In response to the user moving the pen in contact with the handwriting input unit 21, the handwriting input unit 21 transmits the corresponding pen coordinates to the handwriting input display control unit 23.

S5: The handwriting input display control unit 23 indicates the pen ID received from the pen 2500 at the same time of inputting of the coordinates, to obtain the current pen ID control data stored in the pen ID control data storage unit 36. Because the pen ID is thus transmitted at the time of inputting of the coordinates, the stroke and the pen ID are associated with each other. The pen ID control data storage unit 36 transmits the pen ID control data (color, thickness, pattern, and angle information) to the handwriting input display control unit 23. The angle information is still zero as the initial value.

S6: The handwriting input display control unit 23 transmits the pen coordinate interpolation display data (data for interpolating the discrete pen coordinates) to the display unit 22. The display unit 22 displays a line by interpolating the pen coordinates using the pen coordinate interpolation display data.

S7: The handwriting input display control unit 23 transmits the pen coordinates and the pen-coordinates reception time to the handwriting input storage unit 25. The handwriting input storage unit 25 attaches the pen coordinates to the corresponding stroke data. While the user is moving the pen, the handwriting input unit 21 repeatedly transmits the corresponding pen coordinates to the handwriting input display control unit 23 at regular intervals, so that steps S4-S7 are repeated until a pen removal from the handwriting input unit 21 occurs.

S8: In response to the user removing the pen from the handwriting input unit 21, the handwriting input unit 21 transmits the pen removal event to the handwriting input display control unit 23.

S9: The handwriting input display control unit 23 transmits an event of end of the stroke to the handwriting input storage unit 25 and the handwriting input storage unit 25 fixes the pen coordinates for the stroke. As a result, no more pen coordinates can be attached to the stroke data.

S10: The handwriting input display control unit 23 transmits a request to obtain an overlapping state between a handwriting object approximate rectangular area and a stroke rectangular area on the basis of the handwriting object approximate rectangular area 403 to the handwriting input storage unit 25. The handwriting input storage unit 25 calculates the overlapping state and transmits the overlapping state to the handwriting input display control unit 23.

Steps S11-S17 are then executed for a case where the handwriting object approximate rectangular area and the stroke rectangular area do not overlap each other.

S11: For a case where the handwriting object approximate rectangular area and the stroke rectangular area do not overlap each other, one handwriting object is fixed. Therefore, the handwriting input display control unit 23 transmits a request to clear stored data to the handwriting recognition control unit 26.

S12-S14: The handwriting recognition control unit 26 transmits a request to clear stored data to the character string conversion control unit 28, the predictive conversion control unit 30, and the operation command recognition control unit 32. The handwriting recognition control unit 26, the character string conversion control unit 28, the predictive conversion control unit 30, and the operation command recognition control unit 32 clear the data concerning the character string candidates and the operation command candidates that has been stored. The last handwritten stroke at the time of clearing of the data is not added to the handwriting object.

S15: The handwriting input display control unit 23 transmits an event of end of generating the handwriting object to the handwriting input storage unit 25. The handwriting input storage unit 25 fixes the handwriting object. The event of end of generating the handwriting object means that the handwriting object has been completed (as a result, no more strokes are added to the handwriting object).

S16: The handwriting input display control unit 23 transmits an event of start of generating a handwriting object to the handwriting input storage unit 25. In preparation for a start of handwriting (a pen touch) of a next handwriting object, the handwriting input storage unit 25 allocates a new handwriting object area.

S17: The handwriting input display control unit 23 transmits a stroke adding event with respect to the stroke ended in step S9 to the handwriting input storage unit 25. For a case where steps S11-S17 have been executed, the stroke to be added is the first stroke of the handwriting object, and the handwriting input storage unit 25 adds the stroke data to the handwriting object, generating of the handwriting object having been started. For a case where steps S11-S17 have not been executed, the additional stroke is added to the handwriting object, generating of the handwriting object having been already in progress.

S18: The handwriting input display control unit 23 transmits the stroke adding event to the handwriting recognition control unit 26. The handwriting recognition control unit 26 adds the stroke data to the stroke data storing area where a character string candidate is temporarily stored.

S19: The handwriting recognition control unit 26 performs gesture handwriting recognition on the stroke data storing area. Gesture handwriting recognition is to identify the angle information from a straight line. Because gesture handwriting recognition is performed with the use of the inside the operation guide 500, the handwriting recognition control unit 26 detects a straight line inside the operation guide 500. The position information of the operation guide 500 is transmitted to the handwriting recognition control unit 26 in step S57, which will be described later.

S20: When a straight line handwritten inside the operation guide 500 is detected, the counterclockwise angle α of the straight line 521 handwritten by the user from the straight line 522 extending from the start point of the straight line 521 in the 6 o'clock direction is identified in 45-degree units. The handwriting recognition control unit 26 stores the identified angle information in the pen ID control data storage unit 36 in association with the pen ID with respect to the stroke data of the straight line 521. Step S20 is performed when the straight line is detected inside the operation guide 500.

S21: Then, the handwriting recognition control unit 26 indicates the pen ID received from the handwriting input unit 21 to obtain the angle information of the pen ID control data from the pen ID control data storage unit 36.

S22: The handwriting recognition control unit 26 rotates clockwise the stroke data at the stroke data storing area with the obtained angle information.

S23: Because the stroke data is thus rotated to have the direction of 0 degrees from the vertical direction of the handwriting input apparatus 2, the handwriting recognition control unit 26 performs a handwriting recognizing operation on the stroke data.

S24: The handwriting recognition control unit 26 transmits handwriting recognized character string candidates which are the result of the handwriting recognition to the handwriting recognition dictionary unit 27. The handwriting recognition dictionary unit 27 transmits linguistically probable language character string candidates to the handwriting recognition control unit 26.

S25: The handwriting recognition control unit 26 transmits the handwriting recognized character string candidates and the received language character string candidates to the character string conversion control unit 28.

S26: The character string conversion control unit 28 transmits the handwriting recognized character string candidates and the language string candidates to the character string conversion dictionary unit 29. The character string conversion dictionary unit 29 transmits converted character string candidates to the character string conversion control unit 28.

S27: The character string conversion control unit 28 transmits the received converted character string candidates to the predictive conversion control unit 30.

S28: The predictive conversion control unit 30 transmits the received converted character string candidates to the predictive conversion dictionary unit 31. The predictive conversion dictionary unit 31 transmits predicted character string candidates to the predictive conversion control unit 30.

S29: The predictive conversion control unit 30 transmits the received predicted character string candidates to the operation command recognition control unit 32.

S30: The operation command recognition control unit 32 transmits the received predicted character string candidates to the operation command definition unit 33. The operation command definition unit 33 transmits operation command candidates to the operation command recognition control unit 32. Thus, the operation command recognition control unit 32 can obtain the operation command candidates corresponding to operation command definition data including character strings ("String" in FIG. 13A) that are the same as the predicted character string candidates.

Steps S31-S38 up to transmitting operation command candidates are then executed in the same manner as follows.

S31: The character string conversion control unit 28 transmits the received converted character string candidates to the operation command recognition control unit 32.

S32: The operation command recognition control unit 32 transmits the received converted string candidates to the operation command definition unit 33. The operation command definition unit 33 transmits operation command candidates to the operation command recognition control unit 32. Thus, the operation command recognition control unit 32 obtains the operation command candidates corresponding to operation command definition data including character strings ("String") that are the same as the converted character string candidates.

S33: The handwriting recognition control unit 26 transmits the handwriting recognized character string candidates and the language character string candidates to the predictive conversion control unit 30.

S34: The predictive conversion control unit 30 transmits the received handwriting recognized character string candidates and language character string candidates to the predictive conversion dictionary unit 31. The predictive conversion dictionary unit 31 transmits predicted character string candidates to the predictive conversion control unit 30.

S35: The predictive conversion control unit 30 transmits the received predicted character string candidates to the operation command recognition control unit 32.

S36: The operation command recognition control unit 32 transmits the received predicted character string candidates to the operation command definition unit 33. The operation command definition unit 33 transmits operation command candidates to the operation command recognition control unit 32. Thus, the operation command recognition control unit 32 can obtain the operation command candidates corresponding to operation command definition data including the character strings ("String") that are the same as the predicted character string candidates.

S37: The handwriting recognition control unit 26 transmits the handwriting recognized character string candidates and the received language character string candidates to the operation command recognition control unit 32.

S38: The operation command recognition control unit 32 transmits the received handwriting recognized character string candidates and language character string candidates to the operation command definition unit 33. The operation command definition unit 33 transmits operation command candidates to the operation command recognition control unit 32. Thus, the operation command recognition control unit 32 can obtain the operation command candidates corresponding to operation command definition data including the character strings ("String") that are the same as the language string candidates.

S39: The handwriting recognition control unit 26 transmits the stroke adding event to the operation command recognition control unit 32.

S40: The operation command recognition control unit 32 transmits a request to obtain position information of a fixed object to the handwriting input storage unit 25. The handwriting input storage unit 25 transmits the position information of the fixed object to the operation command recognition control unit 32.

S41: For determining a selected object(s), the operation command recognition control unit 32 determines whether the position information of the stroke received from the handwriting recognition control unit 26 in step S39 concerning the stroke adding event and the position information of the fixed object received from the handwriting input storage unit 25 have a predetermined relationship on the basis of the connecting line determination condition 406 and the enclosing line determination condition 407; and stores the fixed object, if any, that can be determined as being selected, as a selected object(s). In this case, because the selected object(s) is thus determined, operation command candidates of an input/output system are obtained from the operation command definition unit 33.

The handwriting recognition control unit 26, the character string conversion control unit 28, the predictive conversion control unit 30, and the operation command recognition control unit 32 store the data of the handwriting recognized character string candidates, the language character string candidates, the converted character string candidates, the predicted character string candidates, the operation command candidates, and the selected object(s) so that the data can be obtained in steps S46-S49 of a later stage.

S18-2: Immediately after the handwriting input display control unit 23 transmits the stroke adding event to the handwriting recognition control unit 26 in step S18, the handwriting input display control unit 23 transmits an instruction to start the selectable candidate display timer 401 to the candidate display timer control unit 24. The candidate display timer control unit 24 starts the selectable candidate display timer 401.

Steps S42-S44 are then executed in response to an occurrence of a pen touch before a certain time elapses (before the selectable candidate display timer 401 expires).

S42: In response to the user touching the handwriting input unit 21 with the pen before the selectable candidate display timer 401 expires, the handwriting input unit 21 transmits the pen touch event (the same as the event of step S2) to the handwriting input display control unit 23.

S43: The handwriting input display control unit 23 transmits a stroke start event (the same as the event of step S3) to the handwriting input storage unit 25. The sequence to be then executed is the same as the sequence executed after step S3.

S44: The handwriting input display control unit 23 transmits a selectable candidate display timer stop instruction to the candidate display timer control unit 24. The candidate display timer control unit 24 stops the selectable candidate display timer 401. This is because the pen touch has been detected, and thus, the selectable candidate display timer 401 has become unnecessary.

Steps S45-S79 are executed in response to no occurrence of a pen touch before the elapse of a certain period (before the selectable candidate display timer 401 expires). Therefore, an operation guide 500 depicted in FIG. 17 will be displayed.

S45: In response to the user not touching the handwriting input unit 21 with the pen during the operation of the selectable candidate display timer 401, the candidate display timer control unit 24 transmits a timeout event to the handwriting input display control unit 23.

S46: The handwriting input display control unit 23 transmits a request to obtain handwriting recognized character string candidates and language character string candidates to the handwriting recognition control unit 26. The handwriting recognition control unit 26 transmits the currently stored handwriting recognized character string candidates and language character string candidates to the handwriting input display control unit 23.

S47: The handwriting input display control unit 23 transmits a request to obtain converted character string candidates to the character string conversion control unit 28. The character string conversion control unit 28 transmits the currently stored converted character string candidates to the handwriting input display control unit 23.

S48: The handwriting input display control unit 23 transmits a request to obtain predicted character string candidates to the predictive conversion control unit 30. The predictive conversion control unit 30 transmits the currently stored predicted character string candidates to the handwriting input display control unit 23.

S49: The handwriting input display control unit 23 transmits a request to obtain operation command candidates to the operation command recognition control unit 32. The operation command recognition control unit 32 transmits the currently stored operation command candidates and selected object(s) to the handwriting input display control unit 23.

S50: The handwriting input display control unit 23 transmits a request to obtain an estimated writing direction to the handwriting input storage unit 25. The handwriting input storage unit 25 determines the estimated writing direction from the stroke added time as well as the horizontal distance (width) and the vertical distance (height) of the handwriting object rectangular area and transmits the determined estimated writing direction to the handwriting input display control unit 23.

S51: Next, the handwriting input display control unit 23 indicates the pen ID received from the handwriting input unit 21 to obtain the angle information of the current pen ID control data from the pen ID control data storage unit 36, in order to rotate the selectable candidates and the operation guide 500.

S52: The handwriting input display control unit 23 generates selectable candidate display data such as the selectable candidate display data depicted in FIG. 17 using the handwriting recognized character string candidates (in the example of FIG. 17, the character C102), language character string candidates (in the example of FIG. 17, not depicted but, for example, the character C1 in FIG. 10), converted character string candidates (in the example of FIG. 17, the characters S103 and the characters S104), predicted character string candidates (in the example of FIG. 17, the characters C105 and the characters C106), operation command candidates (in the example of FIG. 17, the characters C111 and the characters C112), the corresponding selection probabilities, and the estimated writing direction. The handwriting input display control unit 23 rotates the selectable candidate display data (the operation guide 500) counterclockwise with the angle information obtained in step S51, transmits the rotated selectable candidate display data (the operation guide 500) to the display unit 22, and displays the selectable candidate display data (the operation guide 500) by the display unit 22.

S53: The handwriting input display control unit 23 rotates rectangular area outline data (a rectangular frame) (such as the handwriting object rectangular area outline 503 in FIG. 17) of the handwriting object and the selected object(s) counterclockwise with the angle information obtained in step S51, and transmits the rotated rectangular area outline data (the rectangular frame) to the display unit 22, and displays the rectangular area outline data by the display unit 22.

S54: The handwriting input display control unit 23 transmits an instruction to start the selectable candidate display delete timer 402 to the candidate display timer control unit 24 in order to delete the data after an elapse of a certain time from the display of the selectable candidate display data. The candidate display timer control unit 24 starts the selectable candidate display delete timer 402.

Steps S55-S60 are executed in response to, during the operation of the selectable candidate display delete timer 402, (i) the user deleting the selectable candidates displayed on the display unit 22, (ii) a change occurring in the handwriting object (that is, the user adding, deleting, moving, changing in shape, or dividing a stroke of the handwriting object), or (iii) no candidate being selected before the timeout of the selectable candidate display delete timer 402.

Steps S55-S57 are executed in response to (i) the candidate display being deleted or (ii) a change occurring in the handwriting object.

S55: The handwriting input unit 21 transmits an event of the selectable candidates displayed being deleted or a change in the handwriting object occurring to the handwriting input display control unit 23.

S56: The handwriting input display control unit 23 transmits an instruction to stop the selectable candidate display delete timer 402. The candidate display timer control unit 24 stops the selectable candidate display delete timer 402. This is because the selectable candidate display delete timer 402 has become unnecessary as a result of, for example, the user processing the handwriting object within the certain period.

S57: The handwriting input display control unit 23 stores the position information of the operation guide 500 in the handwriting recognition control unit 26 for use in gesture determination in the gesture handwriting recognition of step S19. The position information may be, for example, the coordinates of the upper left corner and the lower right corner or equivalent coordinates. Thus, the handwriting recognition control unit 26 can determine whether the straight line used for inputting the angle information is handwritten inside the operation guide 500.

S59: The handwriting input display control unit 23 transmits an instruction to delete the selectable candidate display data to the display unit 22 to delete the display of the selectable candidates.

S60: The handwriting input display control unit 23 transmits an instruction to delete the rectangular area outline data of the handwriting object and the selected object(s) to the display unit 22 to delete the display of the data. Therefore, for a case where the display of the operation command candidates is deleted due to a condition other than any operation command candidate being selected, the display of the handwriting object is maintained.

S58: In response to neither the display of the selectable candidates being deleted nor a change occurring in the handwriting object (i.e., in response to the user not performing any pen operation) during the operation of the selectable candidate display delete timer 402, the candidate display timer control unit 24 transmits a timeout event to the handwriting input display control unit 23.

The handwriting input display control unit 23 executes steps S59 and S60 also after the timeout of the selectable candidate display delete timer 402. This is because the selectable candidate display data and the rectangular area outline data of the handwriting object and the selected object(s) may be deleted after the elapse of the certain period.

In response to the user selecting a selectable candidate during the operation of the selectable candidate display delete timer 402, steps S61-S79 are executed.

S61: In response to the user selecting a selectable candidate during the operation of the selectable candidate display delete timer 402, the handwriting input unit 21 transmits an event of selection of a character string candidate or an operation command candidate to the handwriting input display control unit 23.

S62: The handwriting input display control unit 23 transmits an instruction to stop the selectable candidate display delete timer 402 to the candidate display timer control unit 24. The candidate display timer control unit 24 stops the selectable candidate display delete timer 402.

S63: The handwriting input display control unit 23 transmits an instruction to clear the stored data to the handwriting recognition control unit 26.

S64: The handwriting recognition control unit 26 transmits an instruction to clear the stored data to the character string conversion control unit 28.

S65: The handwriting recognition control unit 26 transmits an instruction to clear the stored data the predictive conversion control unit 30.

S66: The handwriting recognition control unit 26 transmits an instruction to clear the stored data to the operation command recognition control unit 32.

The handwriting recognition control unit 26, the character string conversion control unit 28, the predictive conversion control unit 30, and the operation command recognition control unit 32 clear the data concerning the character string candidates and the operation command candidates that have been stored.

S67: The handwriting input display control unit 23 transmits an instruction to delete the selectable candidate display data to the display unit 22 to delete the display of the selectable candidate display data.

S68: The handwriting input display control unit 23 transmits an instruction to delete the rectangular area outline data of the handwriting object and the selected object(s) to the display unit 22 to delete the display of the data.

S69: The handwriting input display control unit 23 transmits an instruction to delete the handwriting object display data and an instruction to delete the pen coordinate interpolation display data transmitted in step S6 to the display unit 22 to delete the corresponding display. This is because a character string candidate or an operation command candidate has been selected and thus, the display of the handwriting object and so forth has become unnecessary.

S70: The handwriting input display control unit 23 transmits a handwriting object deletion event to the handwriting input storage unit 25.

In response to a character string candidate being selected, steps S71-S73 are executed.

S71: In response to a character string candidate being selected, the handwriting input display control unit 23 transmits an event of an addition of a character string object to the handwriting input storage unit 25.

S72: The handwriting input display control unit 23 also transmits a request to obtain a character string object font to the handwriting input storage unit 25. The handwriting input storage unit 25 selects a defined font on the basis of the estimated character size of the handwriting object and transmits the selected font to the handwriting input display control unit 23.

S73: The handwriting input display control unit 23 displays a character string object at the same position as the handwriting object by sending character string object display data to the display unit 22 using the defined font received from the handwriting input storage unit 25.

In response to an operation command candidate being selected, steps S74-S78 are executed. Steps S74-S76 are executed for a case where there is a selected object(s).

S74: In response to an operation command candidate for the selected object being selected, the handwriting input display control unit 23 transmits an instruction to delete the selected object display data to the display unit 22 to delete the display of the selected object display data. This is because the display of the original selected object(s) is to be deleted at this time.

S75: The handwriting input display control unit 23 transmits an instruction to execute the corresponding operation command on the selected object(s) to the handwriting input storage unit 25. The handwriting input storage unit 25 transmits display data of a new selected object(s) (i.e., display data obtained from being edited or modified according to the operation command) to the handwriting input display control unit 23.

S76: The handwriting input display control unit 23 transmits the selected object display data to the display unit 22 so that the selected object(s) obtained from being processed according to the operation command is newly displayed.

For a case where there is no selected object (i.e., for a case where an input/output operation command has been selected), steps S77 and S78 are executed.

S77: In response to an operation command of an input/output system being selected, the handwriting input display control unit 23 executes the operation command according to the operation command string ("Command") of the operation command definition data corresponding to the operation command selected by the user. For a case where the user authentication unit 34 has succeeded in authentication of the user, the handwriting input display control unit 23 sets the information of the corresponding user to the segment(s) "% . . . %" of the operation command (see FIG. 13A) and executes the operation command.

S78: When the user presses the rotating operation button 511 of the operation header 520 depicted in FIG. 25, the handwriting input display control unit 23 receives the angle information according to the number of times of pressing of the rotating operation button 511. The handwriting input display control unit 23 associates the received angle information with the pen ID received from the pen 2500 when the rotating operation button 511 is pressed and stores the received angle information in the pen ID control data storage unit 36.

S79: The handwriting input display control unit 23 transmits an event of start of generating a handwriting object to the handwriting input storage unit 25 for a next handwriting object. The handwriting input storage unit 25 allocates a handwriting object area. Then, the process of steps S2-S79 is repeated.

<Displaying Plural Sets of Text Data in Same Orientations>

When the user selects a language character string candidate, a converted character string candidate, or a character-string/predictive-conversion candidate from selectable candidate display data such as the selectable candidate display data depicted in FIG. 17, the display unit 22 displays the selected language character string candidate, converted character string candidate, or character-string/predictive-conversion candidate as text data.

Figure 33A:
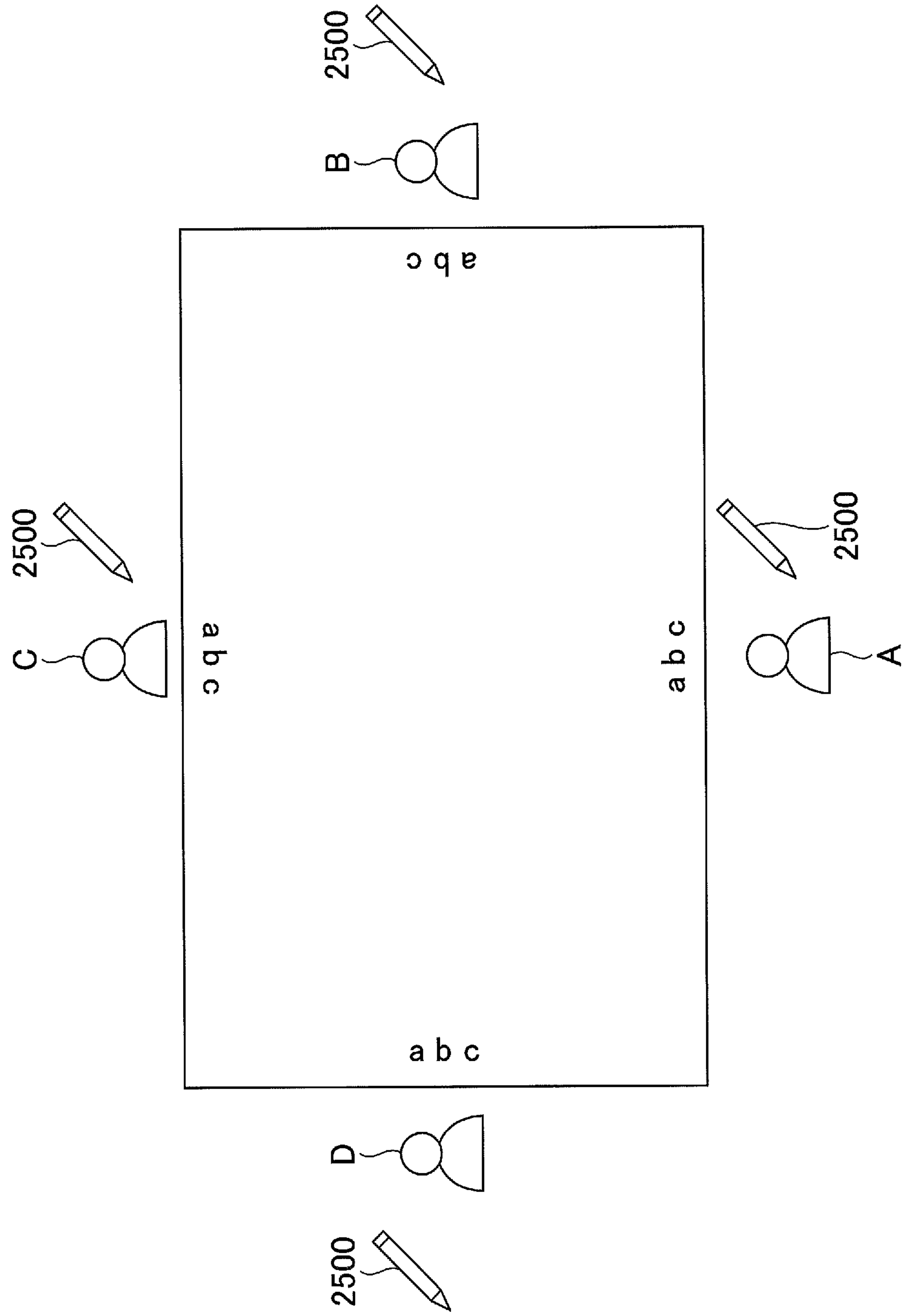
FIGS. 33A and 33B depicts diagrams for illustrating examples of displaying a plurality sets of text data in the same orientation.

FIG. 33A depicts an example of sets of text data obtained from converting of stroke data handwritten by users in the 6 o'clock direction, the 3 o'clock direction, the 12 o'clock direction, and the 9 o'clock direction. In FIG. 33A, the text data "abc" is displayed for the user at each location (in each direction). For one of the users to read the displayed sets of text data, it is convenient when the orientations of the sets of text data are together set to be the same as each other. Therefore, according to the present embodiment, the operation command definition data 712 with which the text orientations are set to be the same as each other is provided in the operation command definition unit 33. When the corresponding operation command is executed, the handwriting input display control unit 23 rotates each stroke clockwise using the angle (Angle) with respect to the handwriting input storage data corresponding to the character string object stored in the handwriting input storage unit 25.

Figure 33B:
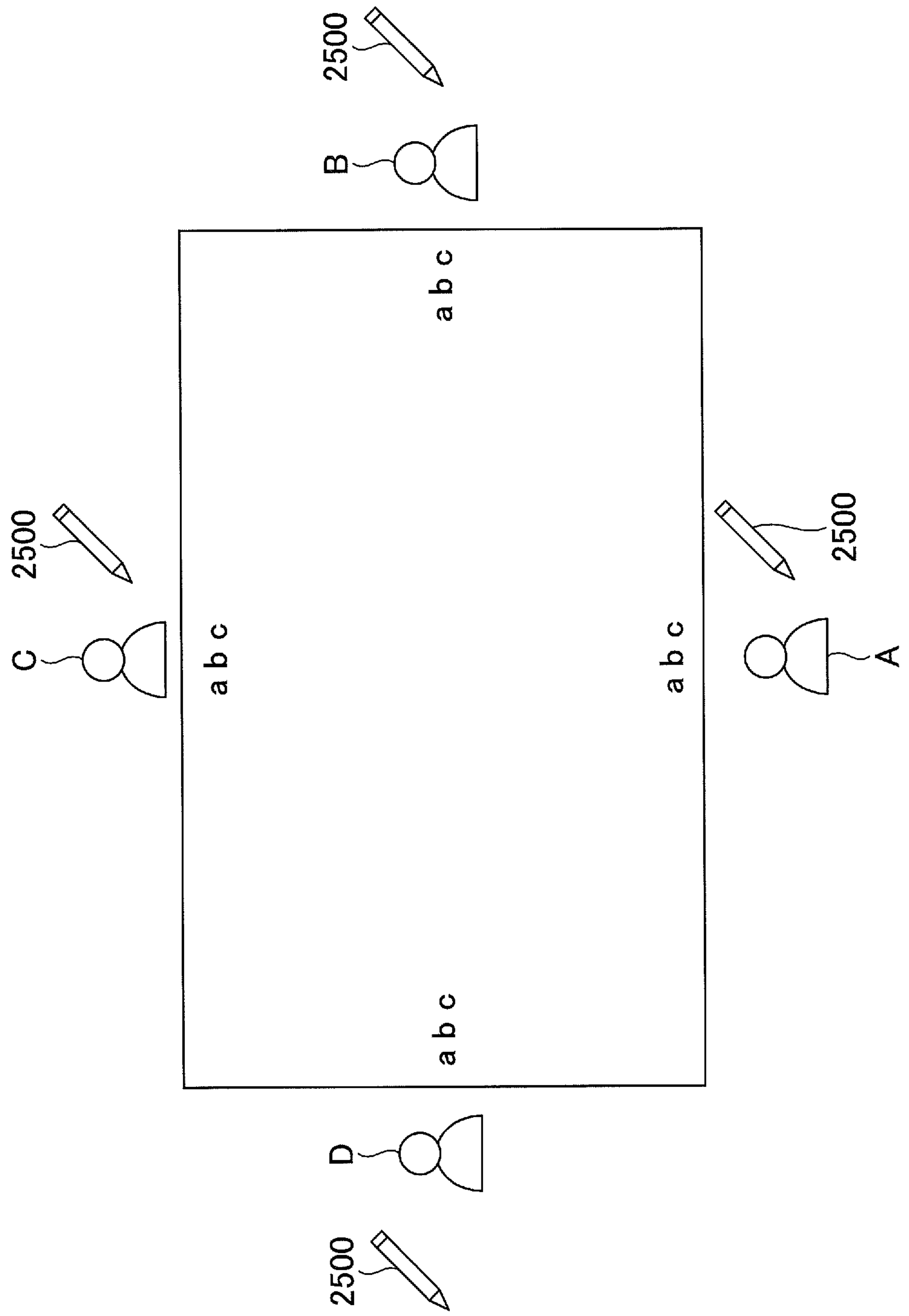

FIG. 33B depicts each set of text data thus rotated clockwise. The angle of each set of text data has become zero relative to the vertical direction of the handwriting input apparatus 2. Therefore, the user A can read each set of text data without moving the location of the user A.

[Summary]

As described above, the handwriting input apparatus 2 according to the present embodiment is capable of allowing each user to perform handwriting with a different setting. As a result, when the users around the handwriting input apparatus 2 in flat installation handwrite, for example, characters, the characters can be correctly identified by the handwriting input apparatus 2. That is, even though a plurality of users perform inputting and operating with the pens 2500 at the same time, these operations are independently reflected in the pen ID operating conditions so that the users can concentrate on their own pen operations without being influenced by the other users' pen operations. Each user's position (the angle information) can be set independently. Therefore, even when each user performs handwriting from a different angle (direction) at the same time, the thus handwritten, for example, characters can be correctly identified and the corresponding operation guides 500 can be properly displayed. In addition, the setting of the angle information can be implemented intuitively through handwriting of a straight line inside the operation guide 500.

Further, the handwriting input apparatus 2 according to the present embodiment does not require selection of an operation menu and selection of an operation from, for example, a list of buttons, and the user can input an operation command in the same manner as a case of handwriting, for example, characters. Because operation command candidates 510 and selectable candidates 530 are simultaneously displayed in the operation guide 500, the user can use the handwriting input apparatus 2 without using different operating ways to input, for example, characters and select an operation command. The use can cause the handwriting input apparatus 2 according to the present embodiment to display suitable operation command candidates as a result of handwriting an object or enclosing a fixed object with a line, for example. Accordingly, any function (such as an editing function, an input/output function, or a pen function) can be invoked from the handwriting state immediately. In other words, it is possible to omit step-by-step operations of pressing menu buttons to invoke a desired function, and reduce the operation procedures required from the handwriting state up to the invocation of a desired function.

Other Example 1 of Handwriting Input Apparatus Configuration

The handwriting input apparatus according to the present embodiment is described as having a large touch panel, but the handwriting input apparatus is not limited to using a touch panel.

Figure 34:
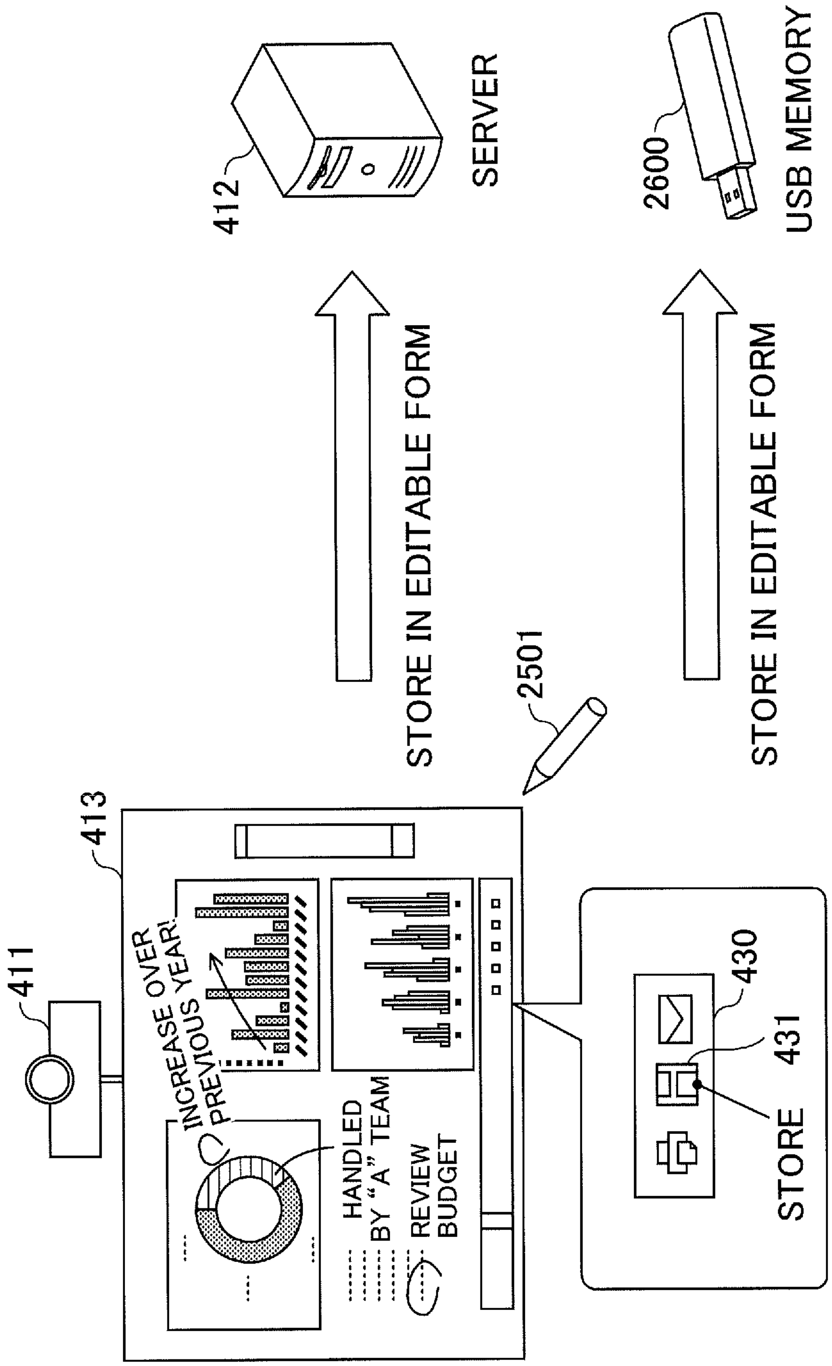
FIGS. 34-37 depict diagrams for illustrating other configuration examples of the handwriting input apparatus.

FIG. 34 is a diagram for illustrating another configuration example of the handwriting input apparatus. In FIG. 34, a projector 411 is located at the top side of a common whiteboard 413. The projector 411 corresponds to the handwriting input apparatus. The common whiteboard 413 is not a flat panel display integrated with a touch panel, but rather a whiteboard, on which the user performs handwriting directly with a marker. Instead of the whiteboard, a blackboard may be used, and, alternatively, a simple flat surface large enough to project an image may be used.

The projector 411 has an optical system of an ultrashort focus so that the projector 411 can project an image onto the whiteboard 413 from the distance on the order of 10 cm with a little distortion. The image may be transmitted from a PC that is connected with the projector 411 wirelessly or by wire, or may be stored by the projector 411.

The user performs handwriting on the whiteboard 413 using a dedicated electronic pen 2501. The electronic pen 2501 has a light emitting unit at the tip, for example, where the light emitting unit is turned on and emits light when the user presses the electronic pen 2501 onto the whiteboard 413 for handwriting. The light wavelength is near-infrared or infrared, so the light is invisible to the user. The projector 411 includes a camera that captures an image of the light emitting unit and analyzes the image to identify the orientation of the electronic pen 2501. The electronic pen 2501 emits a sound wave while emitting light, and the projector 411 calculates the distance according to the time of arrival of the sound wave. The orientation and the distance enable calculation of the location of the electronic pen 2501. A stroke is drawn (by being projected by the projector 411) according the thus calculated positions of the electronic pen 2501 on the whiteboard 413.

The projector 411 projects a menu 430, so when the user presses a button in the menu 430 with the electronic pen 2501, the projector 411 identifies the button from the position of the electronic pen 2501 and the turn-on signal. For example, when a save button 431 is pressed, the stroke (the set of coordinates) handwritten by the user is stored in the projector 411. The projector 411 thus stores the handwriting information in a predetermined server 412 or a USB memory 2600, for example. The handwriting information is stored on a page basis. The coordinates are saved as they are instead of image data, allowing the user to edit. In this example, however, the menu 430 need not be displayed because an operation command can be invoked by a handwriting operation.

Other Example 2 of Handwriting Input Apparatus Configuration

Figure 35:
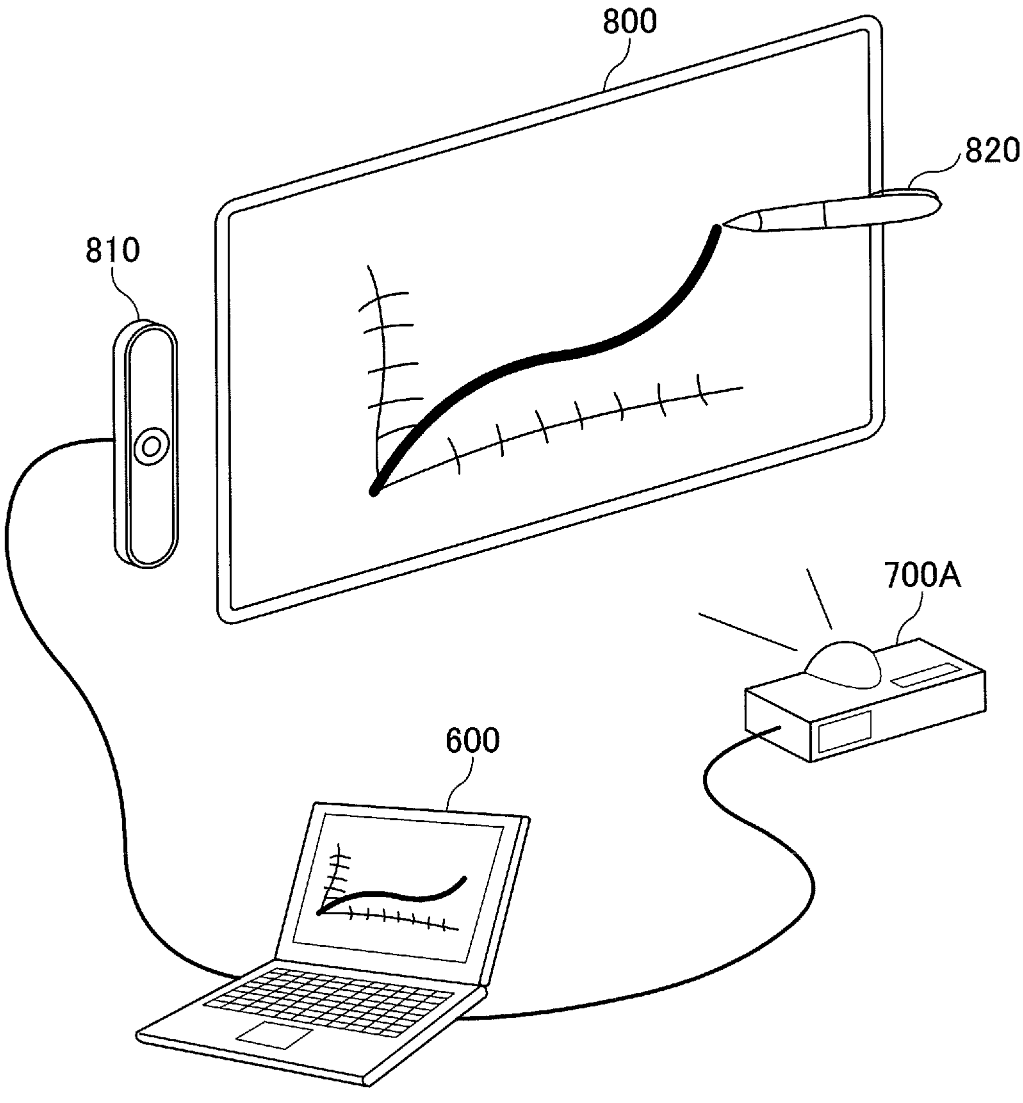

FIG. 35 depicts a diagram for illustrating a further other configuration example of the handwriting input apparatus. In the example of FIG. 35, the handwriting input apparatus includes a terminal apparatus 600, an image projector apparatus 700A, and a pen motion detector 810.

The terminal apparatus 600 is connected to the image projector apparatus 700A and the pen motion detector 810 by wire. The image projector apparatus 700A projects image data that is input from the terminal apparatus 600 onto a screen 800.

The pen motion detector 810 is in communication with an electronic pen 820 and detects operation of the electronic pen 820 near the screen 800. In more detail, the electronic pen 820 detects coordinate information representing the point indicated by the electronic pen 820 on the screen 800 and transmits the coordinate information to the terminal apparatus 600.

The terminal apparatus 600 generates image data of a stroke image input by the electronic pen 820 based on the coordinate information received from the pen motion detector 810. The image projector apparatus 700A draws the stroke image onto the screen 800.

The terminal apparatus 600 generates superimposition image data of a superimposition image obtained from combining a background image projected by the image projector apparatus 700A and the stroke image input by the electronic pen 820.

Other Example 3 of Handwriting Input Apparatus Configuration

Figure 36:
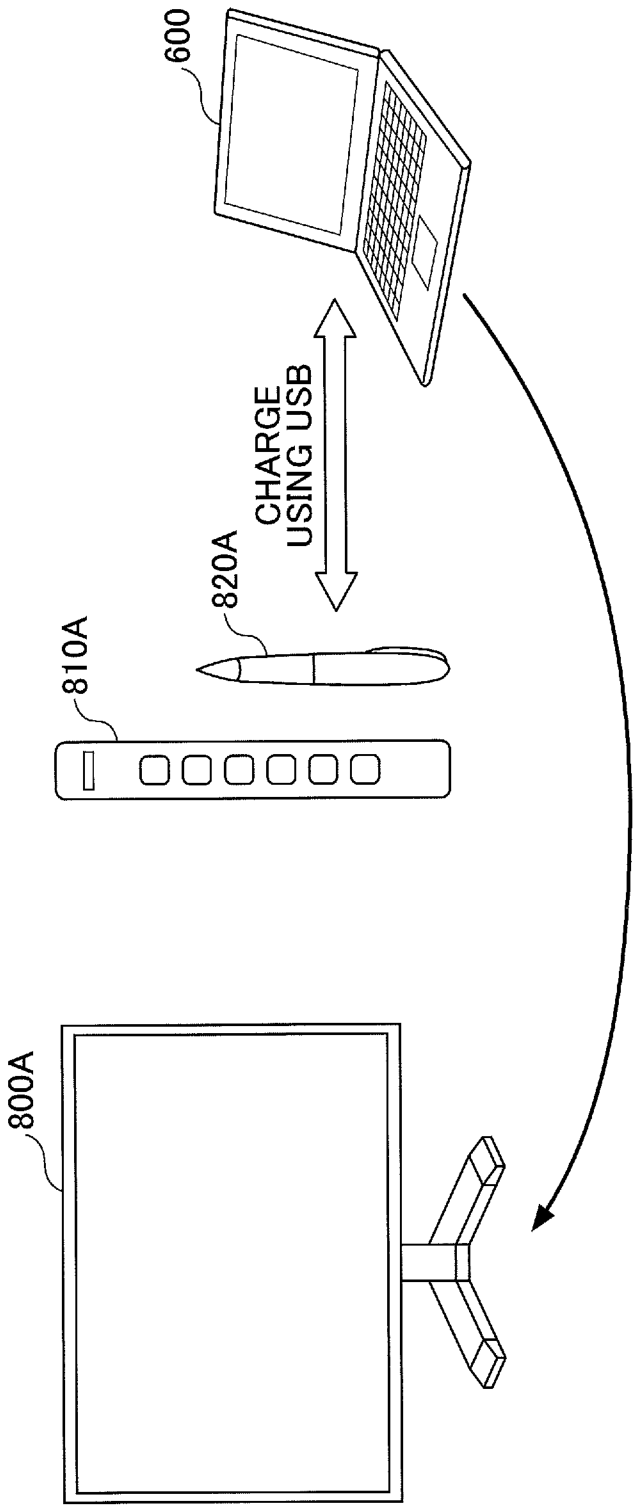

FIG. 36 depicts a diagram for illustrating a yet other example of a configuration of the handwriting input apparatus. In the example of FIG. 36, the handwriting input apparatus includes a terminal apparatus 600, a display 800A, and a pen motion detector 810.

The pen motion detector 810 is positioned near the display 800A. The pen motion detector 810 detects coordinate information representing the point indicated by the electronic pen 820A on the display 800A and transmits the coordinate information to the terminal apparatus 600. In the example of FIG. 36, the electronic pen 820A may be charged from the terminal apparatus 600 via a USB connector.

The terminal apparatus 600 generates image data of a stroke image input by the electronic pen 820A based on the coordinate information received from the pen motion detector 810. The terminal apparatus 600 displays the stroke image on the display 800A.

Other Example 4 of Handwriting Input Apparatus Configuration

Figure 37:
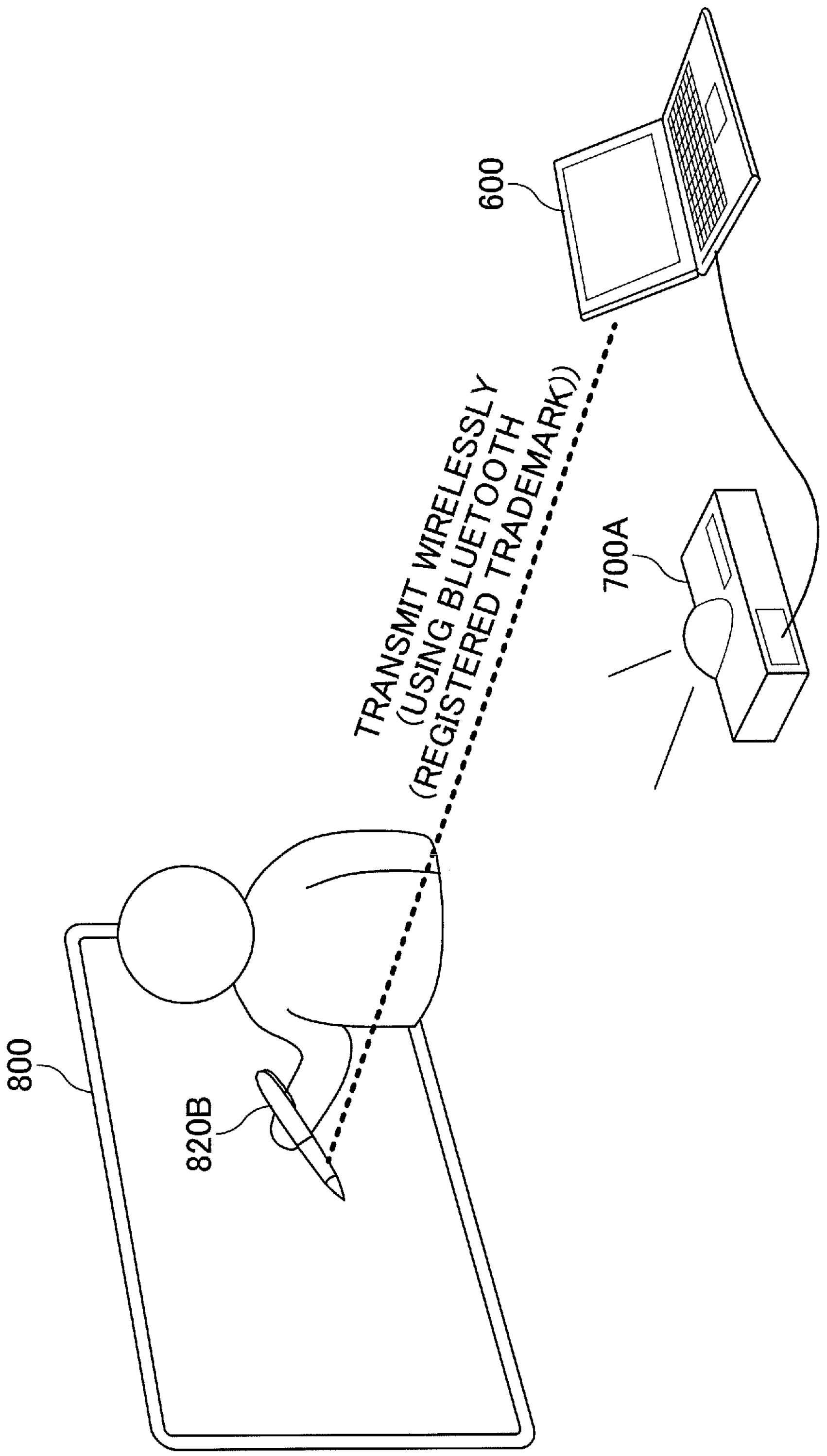

FIG. 37 depicts a diagram for illustrating a further other example of a configuration of the handwriting input apparatus. In the example of FIG. 37, the handwriting input apparatus includes a terminal apparatus 600 and an image projector apparatus 700A.

The terminal apparatus 600 performs wireless communication (using technology such as Bluetooth) with an electronic pen 820B and receives coordinate information representing the point indicated by the electronic pen 820B on a screen 800. The terminal apparatus 600 generates image data of a stroke image input by the electronic pen 820B based on the received coordinate information. The terminal apparatus 600 causes the image projector apparatus 700A to project the stroke image.

The terminal apparatus 600 generates superimposition image data of a superimposition image obtained from combining a background image projected by the image projector apparatus 700A and the stroke image input by the electronic pen 820.

As described above, each of the above-described embodiments can be applied to various system configurations.

Second Embodiment

In a second embodiment of the present invention, a handwriting input system where an information processing system in a network performs processing such as handwriting recognition and returns a result of the processing to a handwriting input apparatus 2 will be described.

In the description of the present embodiment, because the components or the contents of the drawings having the same reference numerals as the first embodiment perform the same functions, the description of the components described once may be omitted or only the differences may be described.

Figure 38:
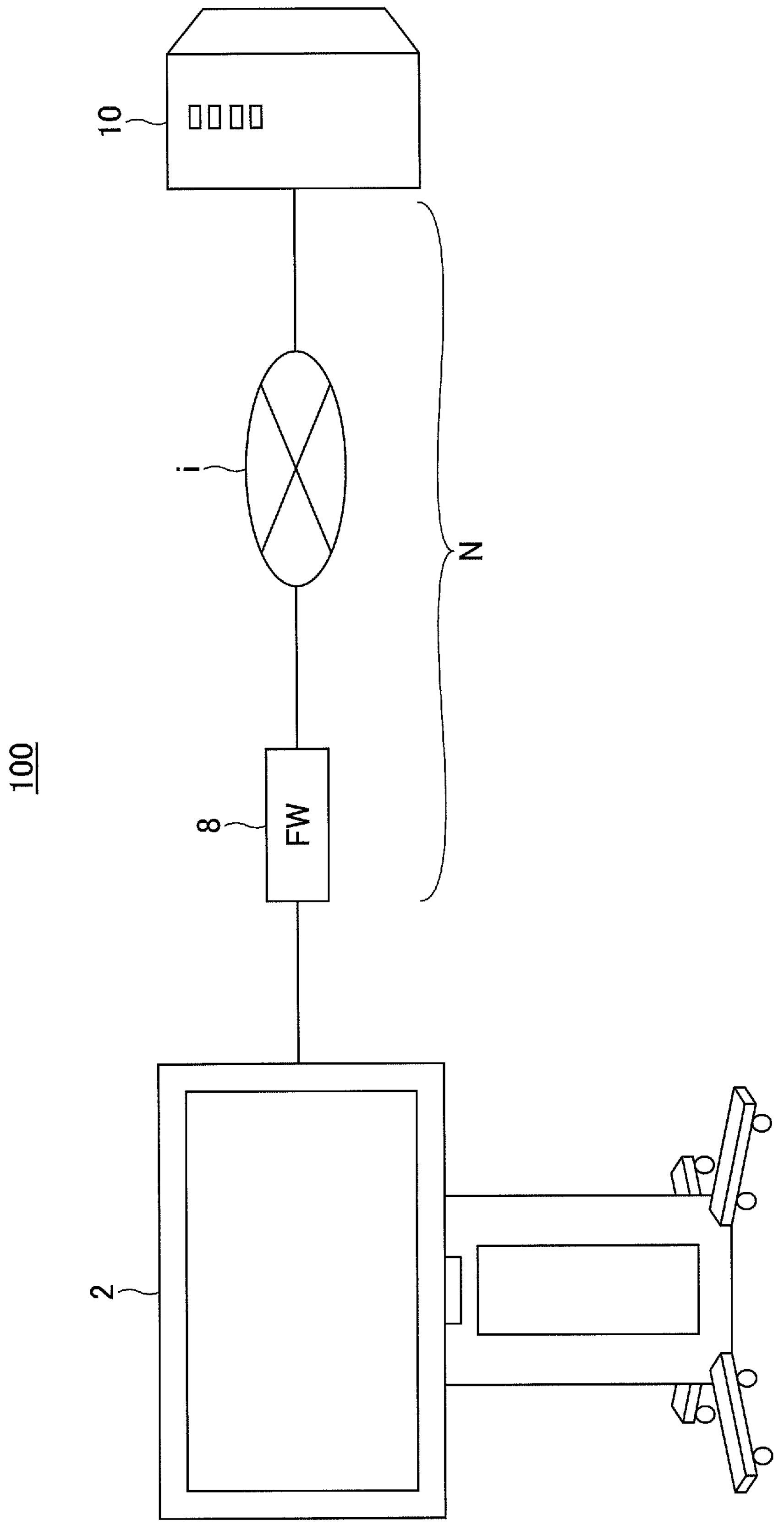
FIG. 38 depicts a system configuration example of a handwriting input apparatus (a second embodiment)

FIG. 38 depicts an example of a system configuration diagram of a handwriting input system 100 according to the present embodiment. The handwriting input system 100 includes a handwriting input apparatus 2 and an information processing system 10 capable of communicating together through a network N.

The handwriting input apparatus 2 is located in a facility, such as an office, and is connected to a LAN or Wi-Fi provided in the facility. The information processing system 10 is provided at, for example, a data center. The handwriting input apparatus 2 is connected to the Internet i via a firewall 8, and the information processing system 10 is also connected to the Internet i via a high-speed LAN in the data center.

The handwriting input apparatus 2 may be connected to the Internet i using wireless communication such as a telephone line network. In this case, the wireless communication is of 3G (3rd Generation), 4G (4th Generation), 5G (5th Generation), LTE (Long Term Evolution), WiMAX (Worldwide Interoperability for Microwave Access), or the like.

The information processing system 10 includes one or more information processing apparatuses. The one or more information processing apparatuses provide services to the handwriting input apparatus 2 as servers. A "server" is a computer or software that functions to provide information and processing results in response to a client's request. As will be described later, the information processing system 10 receives pen coordinates from the handwriting input apparatus 2 and transmits information for displaying an operation guide 500 depicted in FIG. 17 to the handwriting input apparatus 2.

A server-side system is sometimes referred to as a cloud system. A cloud system is a system that uses cloud computing. Cloud computing has a form of use where resources in a network are used without identification of specific hardware resources. A cloud system is not necessarily provided in the Internet. In FIG. 38, the information processing system 10 is provided in the Internet, but may be provided in a local network (such a form being referred to as on-premises).

The information processing system 10 may include a plurality of computing apparatuses such as server clusters. The plurality of computing apparatuses are configured to communicate with each other via any type of a communication link, including a network, a shared memory, and the like, and perform the processes disclosed herein.

The configuration of the handwriting input apparatus 2 may be the same as in the first embodiment. In the present embodiment, at least a touch panel, a display, and a communication function are provided in the handwriting input apparatus 2. The handwriting input apparatus 2 may include a plurality of computing apparatuses configured to communicate with each other.

In the present embodiment, as the handwriting input apparatus 2, a typical information processing apparatus, such as a PC or a tablet, can execute a web browser or a dedicated application. A web browser or a dedicated application communicates with the information processing system 10. In a case where a web browser operates, the user inputs or selects a URL of the information processing system 10 to connect the handwriting input apparatus 2 to the information processing system 10. The handwriting input apparatus 2 executes a web application provided by the information processing system 10 in the web browser. The web application is software or a mechanism running in the web browser through coordinating of a program using a programming language (e.g., JavaScript) running in the web browser with a program running in a web server.

In a case where a dedicated application operates, the handwriting input apparatus 2 is connected to a URL of the information processing system 10 which is registered in advance. Because the dedicated application has a program and a user interface, the program transmits information to and receives information from the information processing system 10 and displays information at the information processing system 10 using the user interface.

The communication method may be a method of using a general-purpose communication protocol such as HTTP, HTTPs, or WebSocket, or using a dedicated communication protocol.

<Example of Hardware Configuration>

The hardware configuration of the handwriting input apparatus 2 may be the same as the hardware configuration of FIG. 5. Concerning the present embodiment, a hardware configuration example of the information processing system 10 will now be described.

Figure 39:
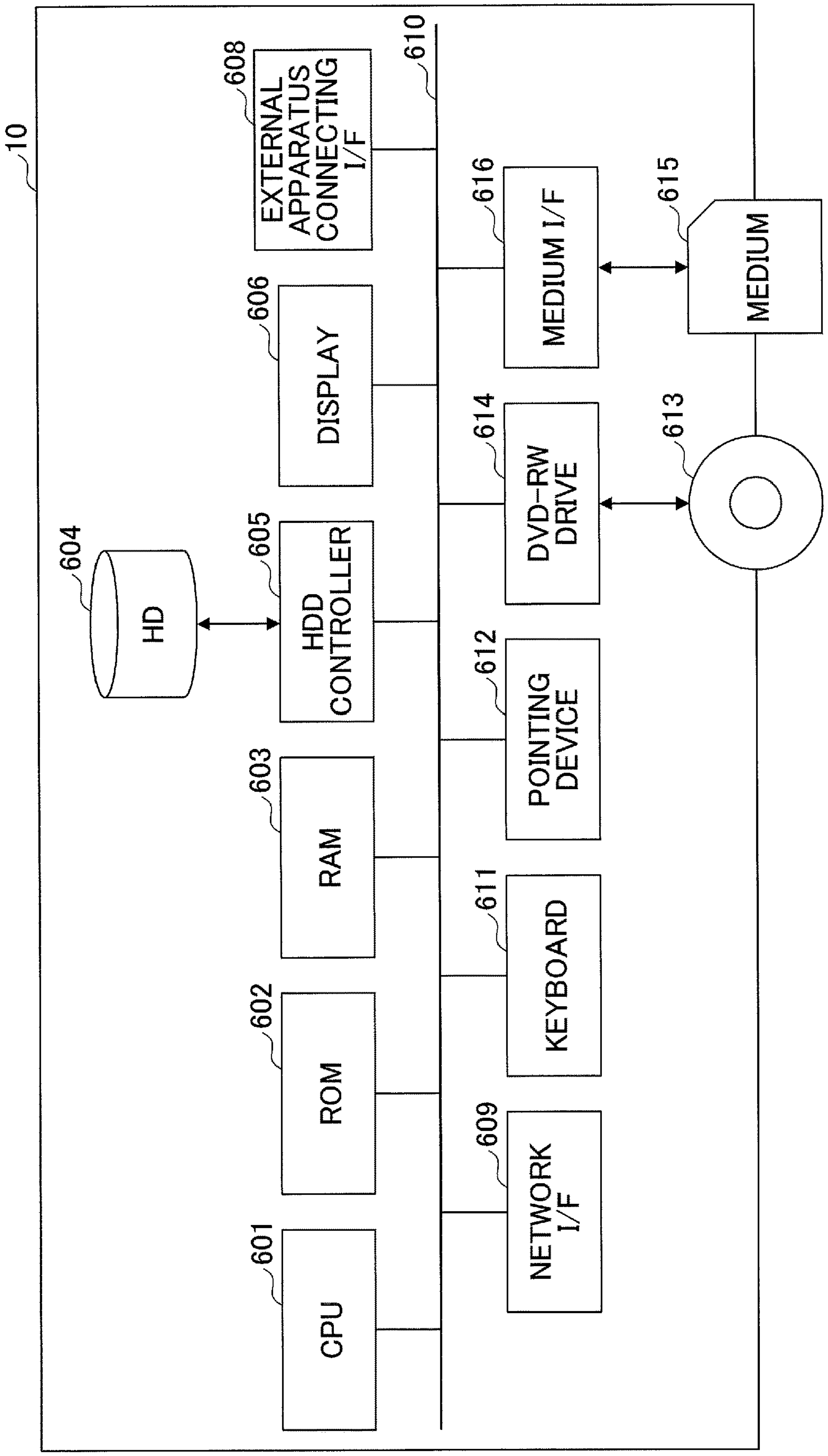
FIG. 39 depicts an example of a hardware configuration of an information processing system.

FIG. 39 depicts the hardware configuration of the information processing system 10. As depicted in FIG. 39, the information processing system 10 is made of a computer and includes a CPU 601, a ROM 602, a RAM 603, a HD 604, a HDD (hard disk drive) controller 605, a display 606, an external apparatus connecting I/F (interface) 608, a network I/F 609, a bus line 610, a keyboard 611, a pointing device 612, a DVD-RW (Digital Versatile Disk Rewritable) drive 514, and a medium I/F 616.

The CPU 601 controls operations of the whole information processing system 10. The ROM 602 stores a program used to drive the CPU 601, such as an IPL. The RAM 603 is used as a work area of the CPU 601. The HD 604 stores various data such as a program. The HDD controller 605 controls reading of various data from or writing of various data to the HD 604 under the control of the CPU 601. The display 606 displays various information such as a cursor, a menu, a window, characters, and images. The external apparatus connecting I/F 608 is an interface for connecting to various external apparatuses. An external apparatus in this case may be, for example, a USB (Universal Serial Bus) memory or a printer. The network I/F 609 is an interface for performing data communication using a communication network. The bus line 610 includes an address bus, a data bus, and so forth for electrically connecting components such as the CPU 601 depicted in FIG. 39.

The keyboard 611 has a plurality of keys for inputting characters, numerals, various instructions, and so forth. The pointing device 612 is another type of an input device for selecting and executing various instructions, selecting a processing target, moving a cursor, and so forth. The DVD-RW drive 614 controls reading of various data from and writing of various data to the DVD-RW 613 as an example of a removable recording medium. Instead of the DVD-RW, a DVD-R, or the like may be used. The medium I/F 616 controls reading of data from and writing (storing) of data to a recording medium 615, such as a flash memory.

<Functions of System>

Figure 40:
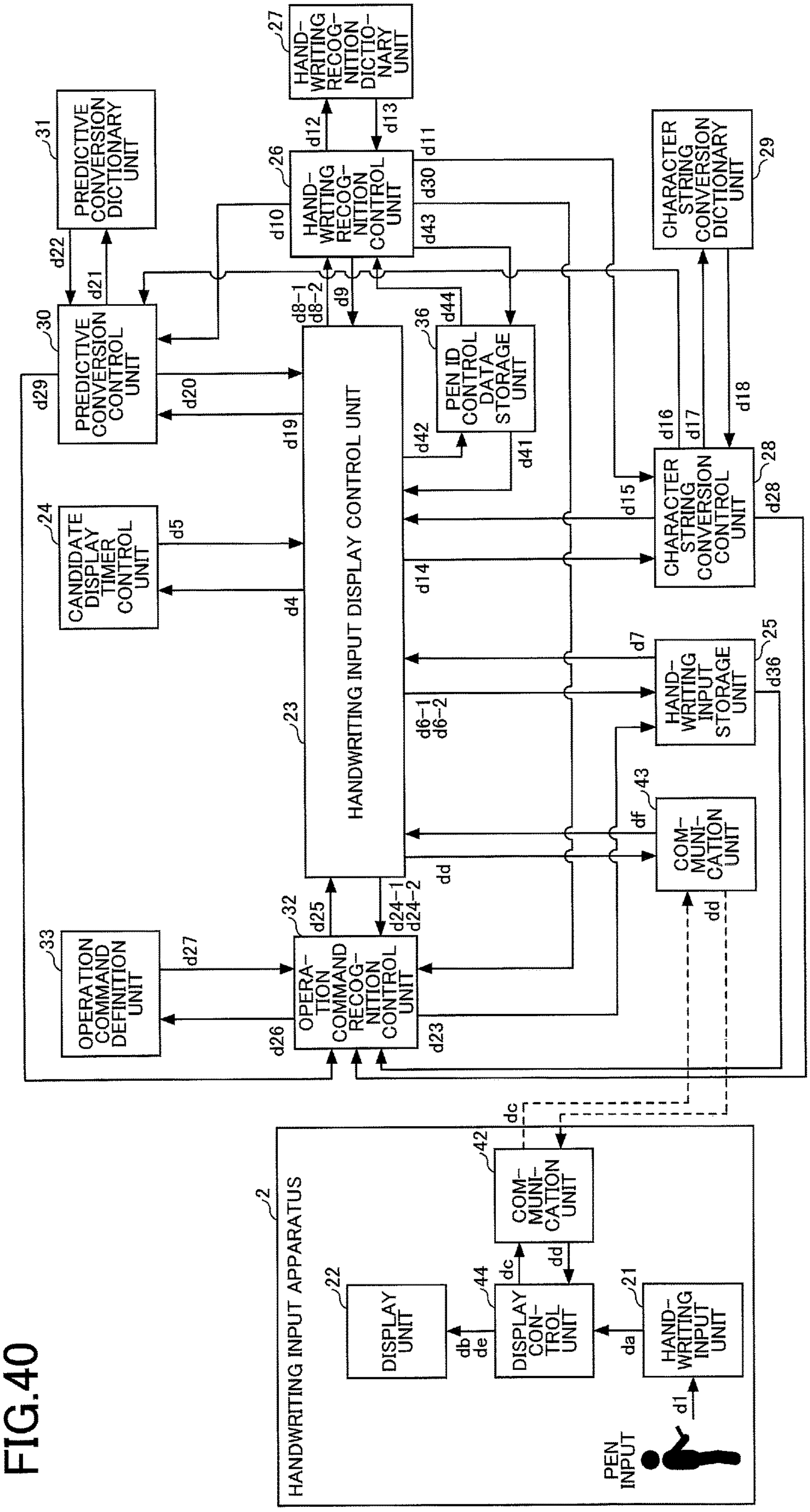
FIG. 40 depicts an example of a functional block diagram for illustrating functions of a handwriting input system.
Figure 41:
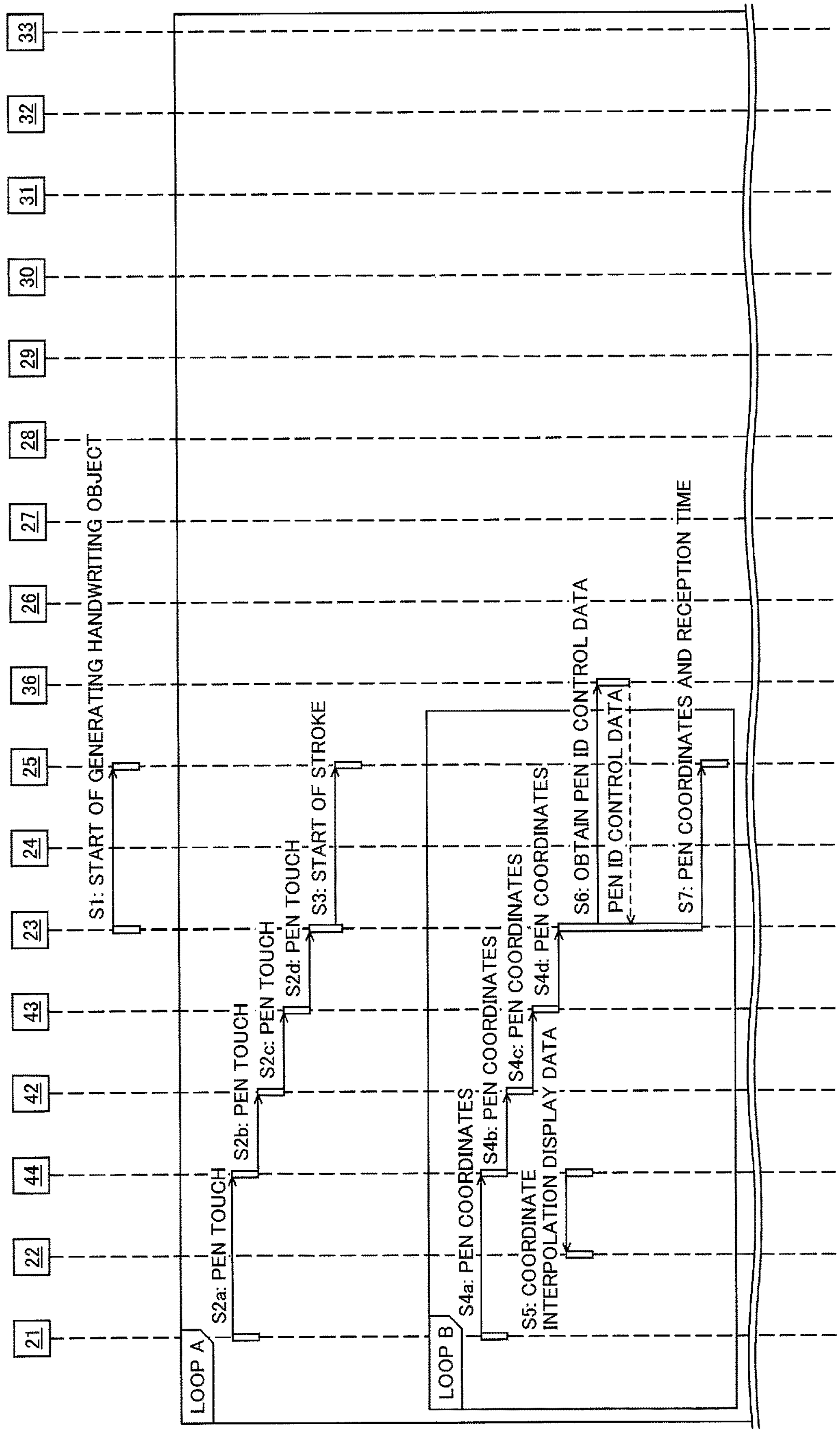
FIGS. 41-48 depict sequence diagrams for illustrating processes where a handwriting input apparatus displays character string candidates and operation command candidates.
Figure 42:
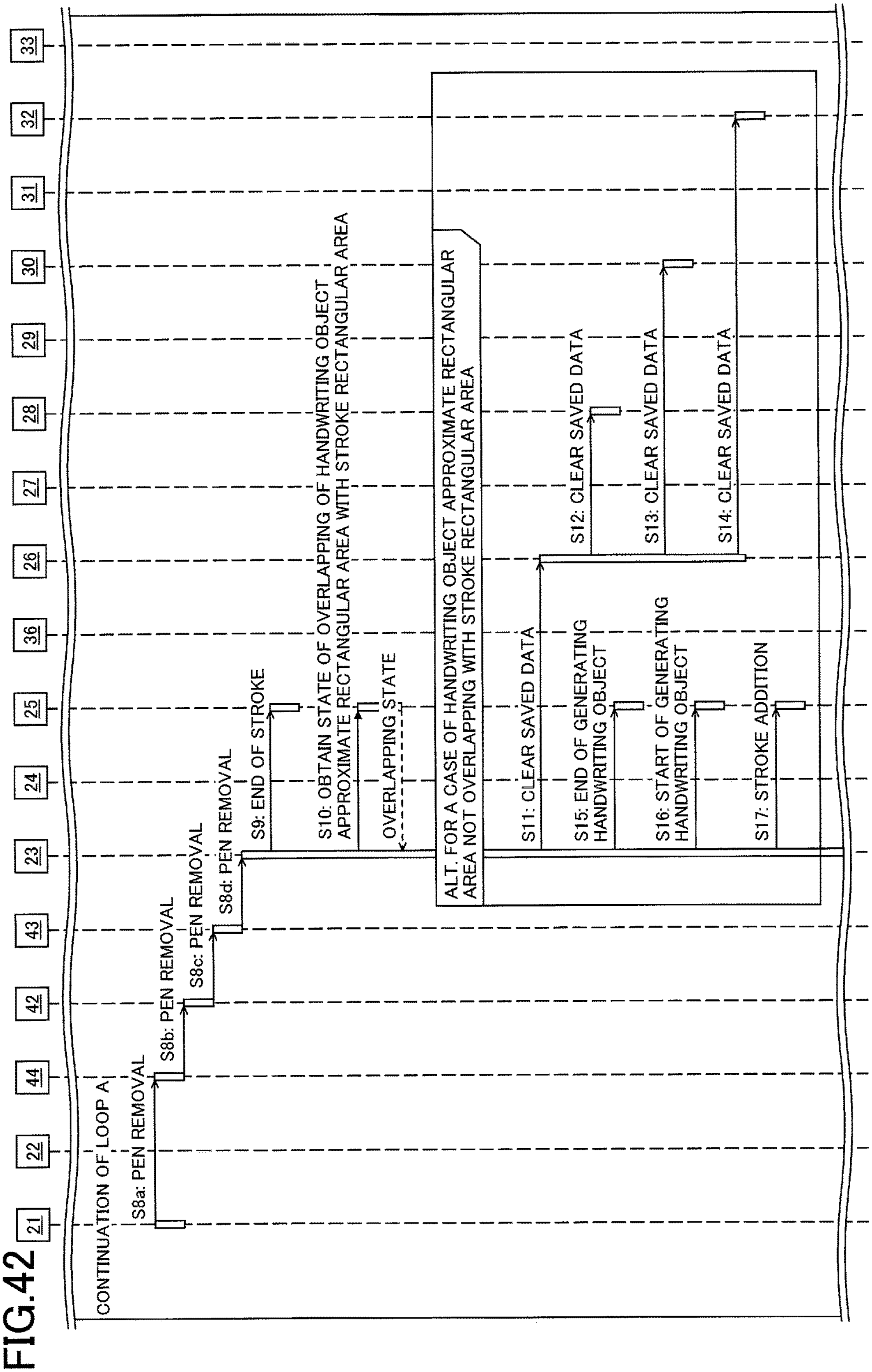
Figure 43:
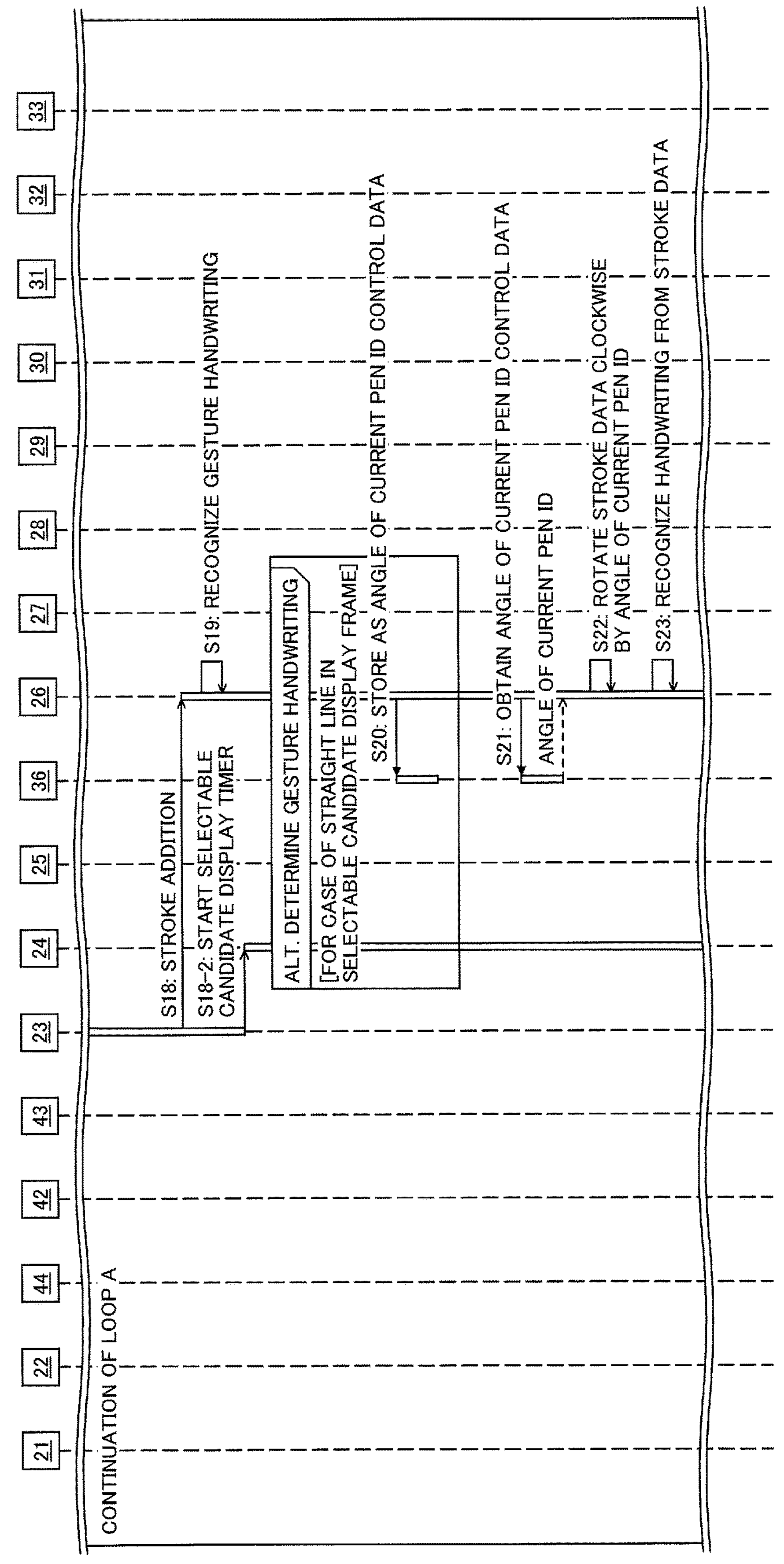
Figure 44:
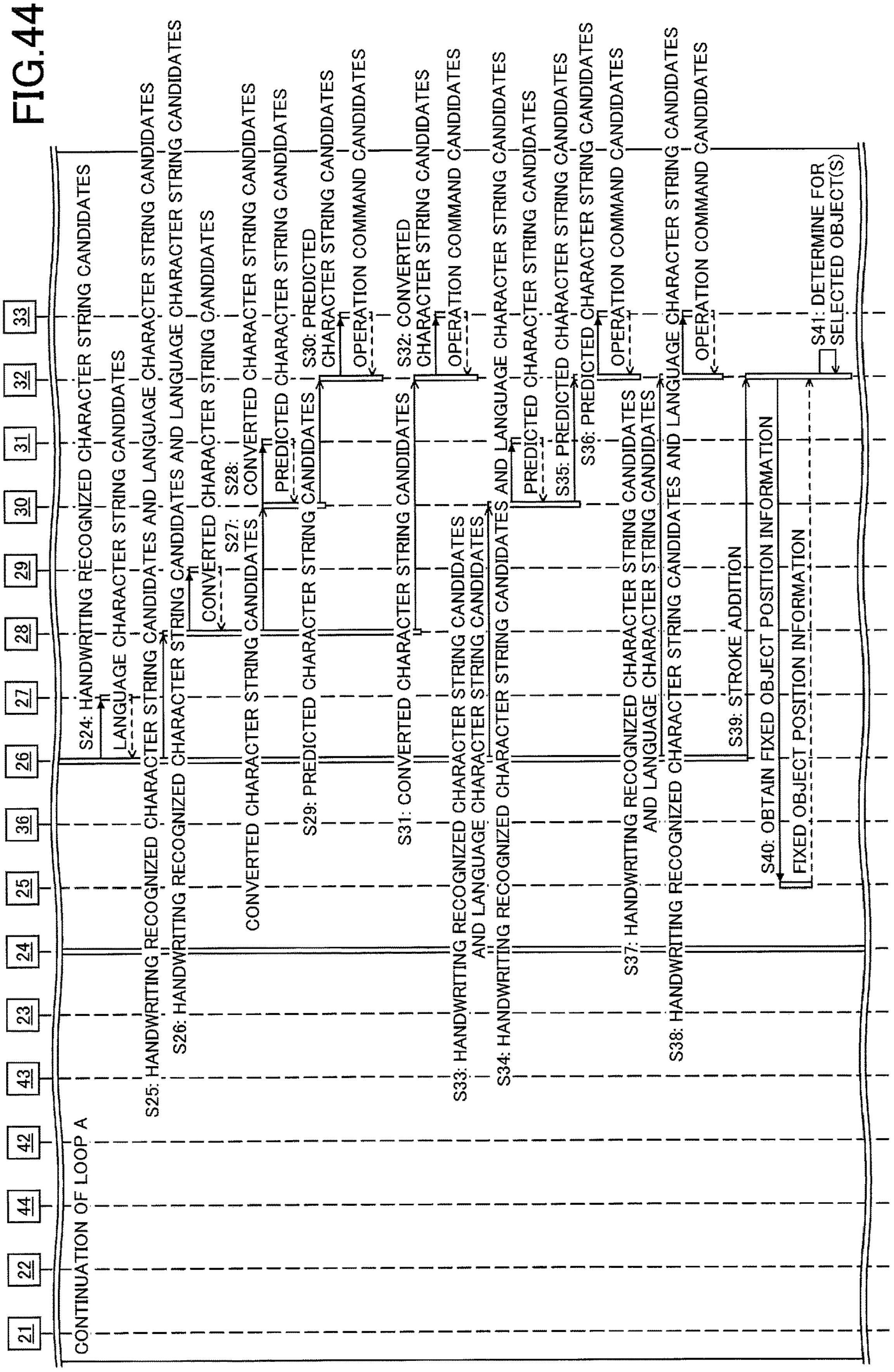
Figure 45:
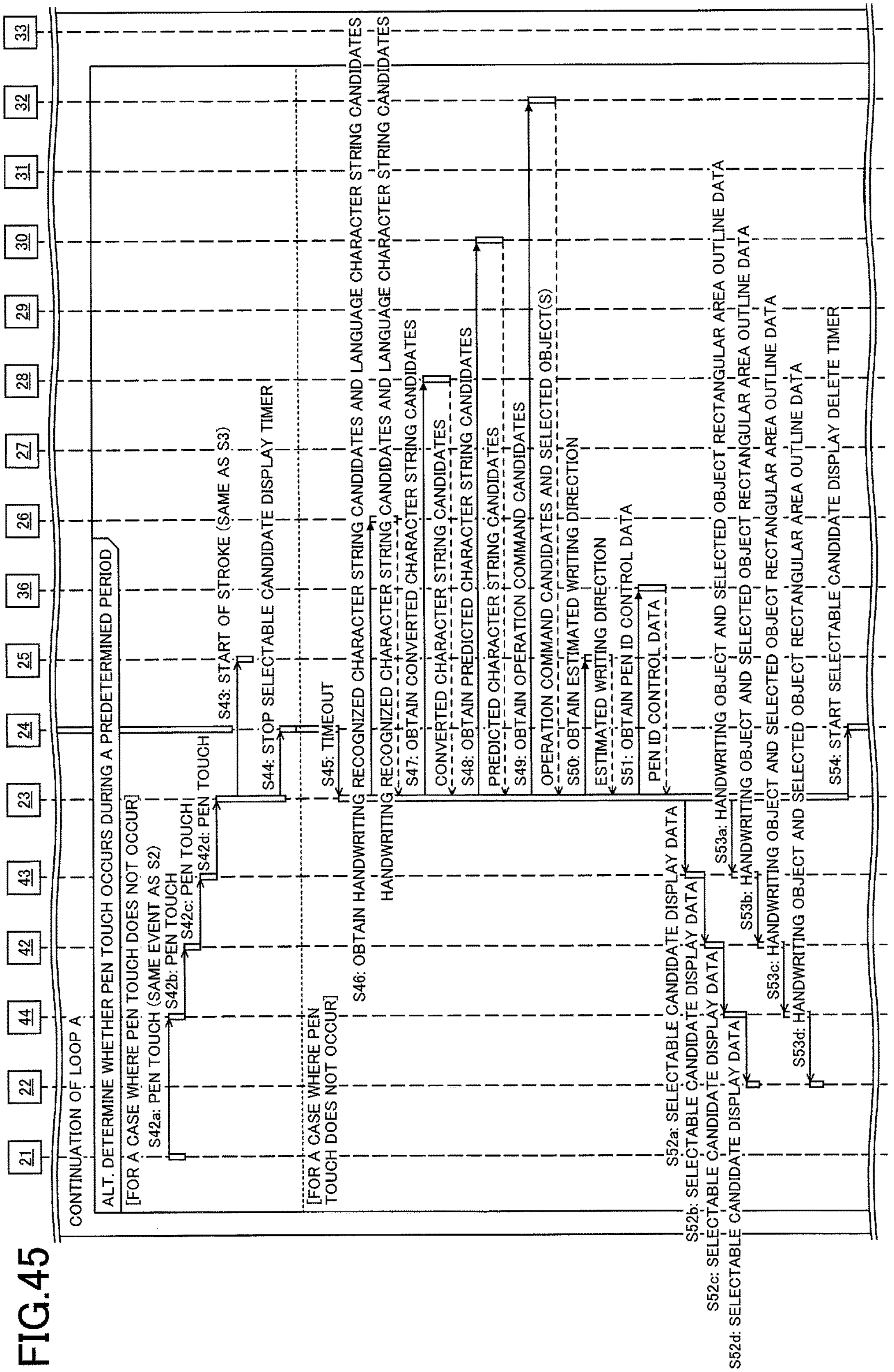
Figure 46:
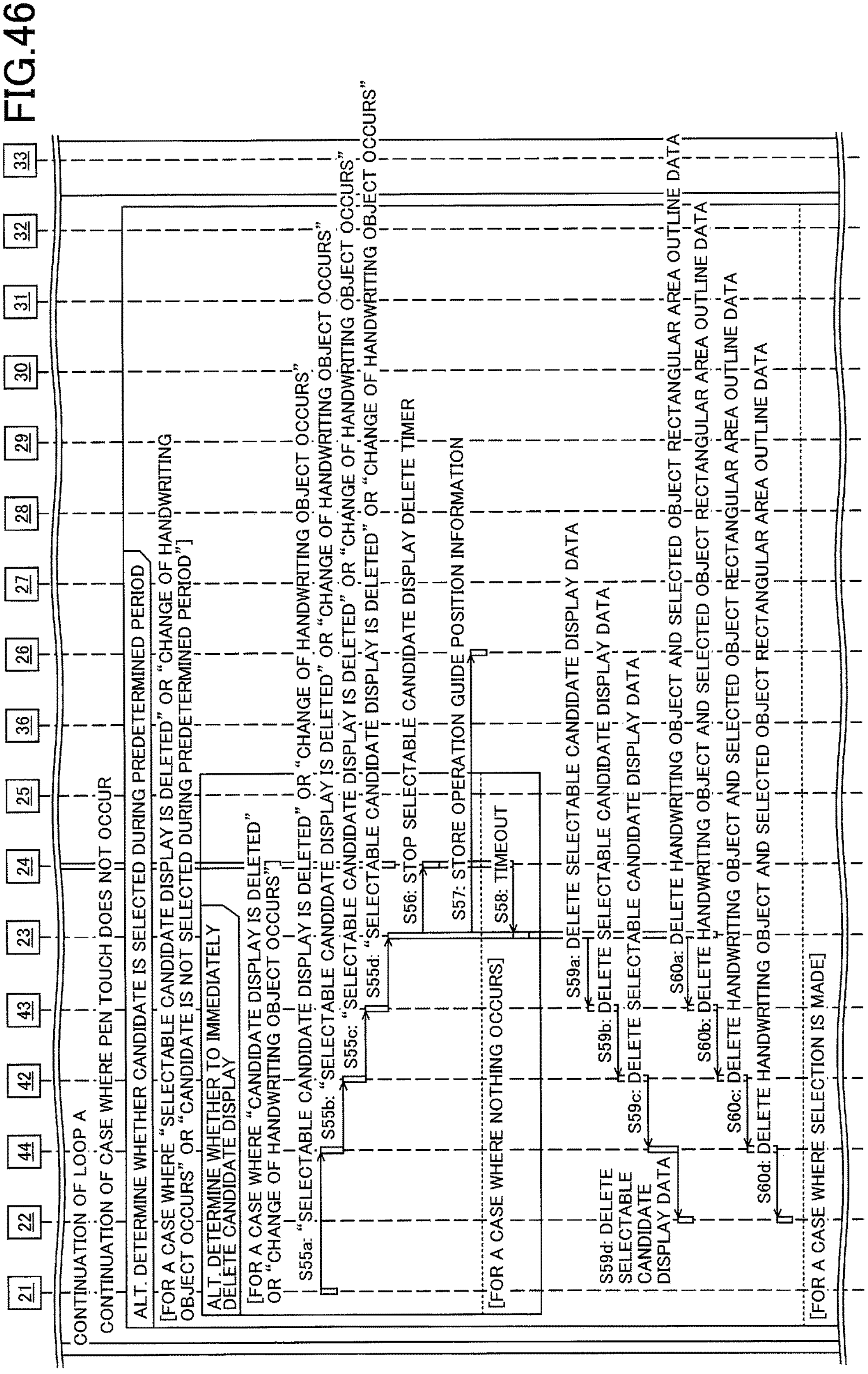
Figure 47:
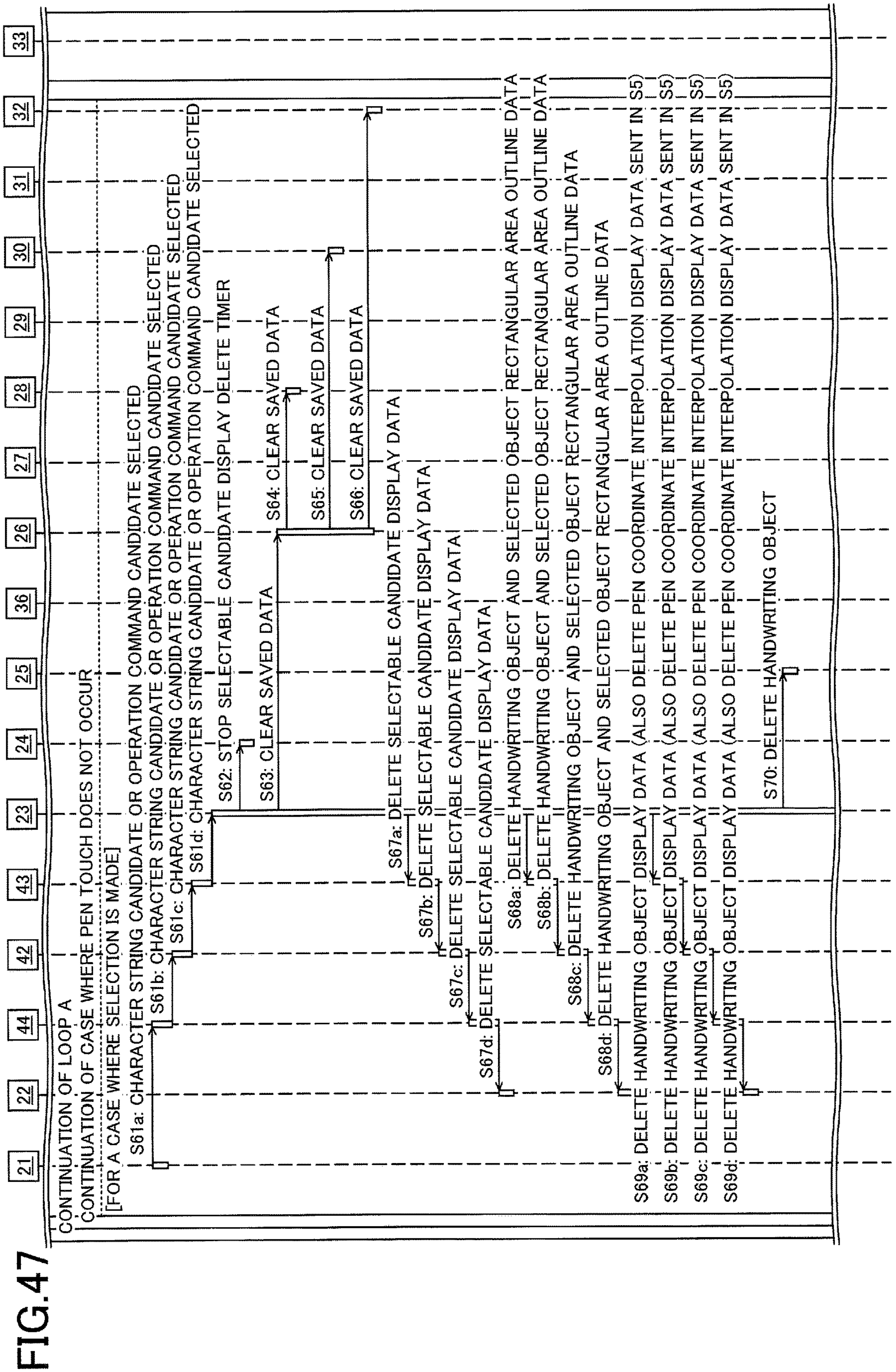
Figure 48:
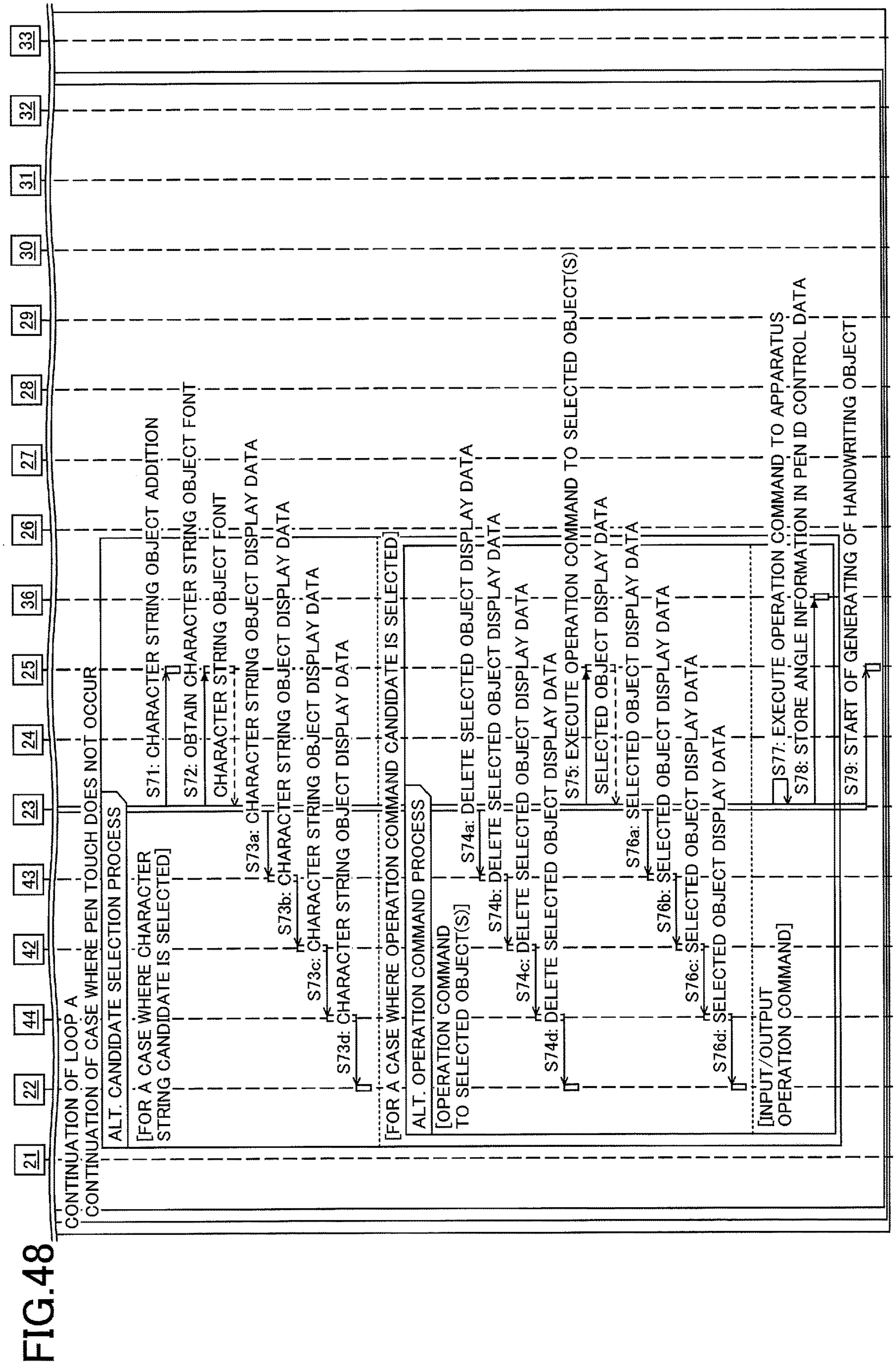

Functions of the handwriting input system 100 will be described with reference to FIG. 40. FIG. 40 depicts an example of a functional block diagram for illustrating the functions of the handwriting input system 100. In the description of FIG. 40, the differences from FIG. 6 will be mainly explained. The functions of the pen 2500 may be the same as the functions of the pen 2500 of the first embodiment.

In the present embodiment, the handwriting input apparatus 2 includes a display unit 22, a display control unit 44, a handwriting input unit 21, and a communication unit 42. Each function of the handwriting input apparatus 2 is implemented as a result of the corresponding components depicted in FIG. 39 being operated by instructions from the CPU 201 according to a program written from the SSD 204 to the RAM 203.

The functions of the handwriting input unit 21 according to the present embodiment may be the same as the corresponding functions in the first embodiment. The handwriting input unit 21 converts the user's pen input d1 to pen operation data da (pen removal, pen touch, or pen-coordinate data) and transmits the converted data to the display control unit 44.

The display control unit 44 controls the display of the handwriting input apparatus 2. First, the display control unit 44 interpolates coordinates between discrete values of the pen coordinate data, which have discrete values, and transmits the pen coordinate data from a pen touch through a pen removal as a single stroke db to the display unit 22.

The display control unit 44 transmits the pen operation data dc to the communication unit 42 and obtains various display data dd from the communication unit 42. The display data includes information for displaying the operation guide 500 of FIG. 17. The display control unit 44 transmits the display data de to the display unit 22.

The communication unit 42 transmits the pen operation data dc to the information processing system 10, receives the various display data dd from the information processing system 10, and transmits the received data to the display control unit 44. The communication unit 42 uses the JSON format or the XML format for data transmission and data reception.

The functions of the display unit 22 may be the same as the corresponding functions in the first embodiment. The display unit 22 displays a stroke db and display data de. The display unit 22 converts the stroke db or the display data de written in a video memory by the display control unit 44 into data corresponding to the characteristics of the display 220 and transmits the data to the display 220.

<Functions of Information Processing System>

The information processing system 10 includes a communication unit 43, a handwriting input display control unit 23, a candidate display timer control unit 24, a handwriting input storage unit 25, a handwriting recognition control unit 26, a handwriting recognition dictionary unit 27, a character string conversion control unit 28, a character string conversion dictionary unit 29, a predictive conversion control unit 30, a predictive conversion dictionary unit 31, an operation command recognition control unit 32, an operation command definition unit 33, and pen ID control data storage unit 36. These functions of the information processing system 10 are implemented as a result of the corresponding components depicted in FIG. 39 being operated according to instructions from the CPU 601 according to a program written from the HD 604 to the RAM 603.

The communication unit 43 receives the pen operation data dc from the handwriting input apparatus 2, and transmits the pen operation data df to the handwriting input display control unit 23. The communication unit 43 receives the display data dd from the handwriting input display control unit 23, and transmits the display data dd to the handwriting input apparatus 2. The communication unit 43 uses the JSON format or the XML format for data transmission and data reception.

The other functions are the same as the corresponding functions in the first embodiment, or, even if there are different functions, no problem occurs in the description of the present embodiment.

<Operation Procedure>

Operations of the handwriting input system 100 will be described with reference to the above-described configurations and FIGS. 41-48. FIGS. 41-48 depict sequence diagrams for illustrating an example of processes where the handwriting input apparatus 2 displays character string candidates and operation command candidates. The process of FIG. 41 starts in response to the handwriting input apparatus 2 starting (i.e., the web browser or the dedicated application starting) and communication with the information processing system 10 being established. The overall flow of FIGS. 41-48 may be the same as the overall flow of FIGS. 30-36 described above.

S1: In response to communication being established, in order to allocate a memory area in the handwriting input apparatus 2, the handwriting input display control unit 23 transmits an event of start of generating a handwriting object to the handwriting input storage unit 25. The handwriting input storage unit 25 allocates a handwriting object area (a memory area for storing a handwriting object). The user may have to touch the handwriting input unit 21 with the pen for allocating the handwriting object area.

S2*a*: The user then touches the handwriting input unit 21 with the pen. The handwriting input unit 21 detects the pen touch and transmits a pen touch event to the display control unit 44.

S2*b*: The display control unit 44 transmits the pen touch event to the communication unit 42 in order to indicate the pen touch to the information processing system 10.

S2*c*: The communication unit 42 transmits the pen touch event to the information processing system 10.

S2*d*: The communication unit 43 of the information processing system 10 receives the pen touch event and transmits the pen touch event to the handwriting input display control unit 23.

S3: The handwriting input display control unit 23 transmits an event of start of a stroke to the handwriting input storage unit 25, and the handwriting input storage unit 25 allocates a stroke area.

S4*a*: In response to the user moving the pen in contact with the handwriting input unit 21, the handwriting input unit 21 transmits the pen coordinates to the display control unit 44.

S4*b*: The display control unit 44 transmits the pen coordinates to the communication unit 42 in order to indicate the pen coordinates to the information processing system 10.

S4*c*: The communication unit 42 transmits the pen coordinates to the information processing system 10.

S4*d*: The communication unit 43 of the information processing system 10 receives the pen coordinates and indicates the pen coordinates to the handwriting input display control unit 23.

S5: The display control unit 44 transmits pen coordinate interpolation display data (data interpolating the discrete pen coordinates) to the display unit 22. The display unit 22 displays a line by interpolating the pen coordinates using the pen coordinate interpolation display data. The process of step S6 is the same as the corresponding process in the first embodiment described above.

S8*a*: In response to the user removing the pen from the handwriting input unit 21, the handwriting input unit 21 transmits a pen removal event to the display control unit 44.

S8*b*: The display control unit 44 transmits the pen removal event to the communication unit 42 in order to indicate the pen removal to the information processing system 10.

S8*c*: The communication unit 42 transmits the pen removal event to the information processing system 10.

S8*d*: The communication unit 43 of the information processing system 10 receives the pen removal event and transmits the pen removal event to the handwriting input display control unit 23.

Subsequent steps S9-S17 and steps S18-S41 are the same as the corresponding steps in the first embodiment described above.

S42*a*: In response to the user touching the handwriting input unit 21 with the pen before the selectable candidate display timer 401 expires, the handwriting input unit 21 transmits the pen touch event (the same event as the event of step S2) to the display control unit 44. Steps S42*b*-S42*d* may be the same as steps S2*b*-S2*d* described above. Further, steps S43-S51 are the same as the corresponding steps in the first embodiment described above.

S52*a*: The handwriting input display control unit 23 generates selectable candidate display data including character string candidates, operation command candidates, depicted in FIG. 17, selection probabilities, and an estimated writing direction, and transmits the selectable candidate display data including the character string candidates and the operation command candidates to the communication unit 43.

S52*b*: The communication unit 43 transmits the selectable candidate display data to the handwriting input apparatus 2.

S52*c*: The communication unit 42 of the handwriting input apparatus 2 receives the selectable candidate display data and transmits the selectable candidate display data to the display control unit 44.

S52*d*: The display control unit 44 receives the selectable candidate display data and transmits the selectable candidate display data to the display unit 22 to cause the display unit 22 to display the selectable candidate display data.

S53*a*: The handwriting input display control unit 23 transmits rectangular area outline data (a rectangular frame) (i.e., in the example of in FIG. 17, the handwriting object rectangular area outline 503) of the handwriting object and the selected object(s) to the communication unit 43.

S53*b*: The communication unit 43 transmits the rectangular area outline data to the handwriting input apparatus 2.

S53*c*: The communication unit 42 of the handwriting input apparatus 2 receives the rectangular area outline data and transmits the rectangular area outline data to the display control unit 44.

S53*d*: The display control unit 44 receives the rectangular area outline data and thus transmits the rectangular area outline data to the display unit 22 to cause the display unit 22 to display the rectangular area outline data. Step S54 is the same as the corresponding step in the first embodiment described above.

S55*a*: In response to the user performing an operation to delete the selectable candidate display or perform handwriting additionally to the handwriting object, the handwriting input unit 21 transmits an event of the selectable candidate display being deleted or the change in the handwriting object to the display control unit 44.

S55*b*: The display control unit 44 transmits the event of the selectable candidate display being deleted or the change of the handwriting object to the communication unit 42 to indicate to the information processing system 10 the event of the selectable candidate display being deleted or the change of the handwriting object.

S55*c*: The communication unit 42 transmits the event of the selectable candidate display being deleted or the change in the handwriting object to the information processing system 10.

S55*d*: The communication unit 43 of the information processing system 10 receives the event of the selectable candidate display being deleted or the change in the handwriting object and transmits the instruction to delete the selectable candidate display or the change in the handwriting object to the handwriting input display control unit 23. Steps S56-S58 are the same as the corresponding steps in the first embodiment described above.

S59*a*: The handwriting input display control unit 23 transmits an instruction to delete the selectable candidate display data to the communication unit 43.

S59*b*: The communication unit 43 transmits the instruction to delete the selectable candidate display data to the handwriting input apparatus 2.

S59*c*: The communication unit 42 of the handwriting input apparatus 2 receives the instruction to delete the selectable candidate display data and transmits the instruction to delete the selectable candidate display data to the display control unit 44.

S59*d*: The display control unit 44 receives the instruction to delete the selectable candidate display data and transmits the instruction to delete the selectable candidate display data to the display unit 22 to cause the display unit to delete the display of the selectable candidates.

S60*a*: The handwriting input display control unit 23 transmits an instruction to delete the rectangular area outline data of the handwriting object and the selected object(s) to the communication unit 43.

S60*b*: The communication unit 43 transmits the instruction to delete the rectangular area outline data of the handwriting object and the selected object(s) to the handwriting input apparatus 2.

S60*c*: The communication unit 42 of the handwriting input apparatus 2 receives the instruction to delete the rectangular area outline data of the handwriting object and the selected object(s) and transmits the instruction to delete the rectangular area outline data of the handwriting object and the selected object(s) to the display control unit 44.

S60*d*: The display control unit 44 receives the instruction to delete the rectangular area outline data of the handwriting object and the selected object(s) and thus transmits the instruction to delete the rectangular area outline data of the handwriting object and the selected object(s) to the display unit 22 to cause the rectangular area outline data of the handwriting object and the selected object(s) to be deleted. Thus, for a case where display of operation command candidates is deleted due to a condition other than a case of any operation command candidate being selected, the display of the handwriting object is maintained as it is.

In response to the user selecting any selectable candidate during operation of the selectable candidate delete timer, steps S61-S79 are executed.

S61*a*: In response to the user selecting a selectable candidate during operation of the selectable candidate delete timer, the handwriting input unit 21 transmits an event of the selection of a character string candidate or an operation command candidate to the display control unit 44.

S61*b*: The display control unit 44 transmits the event of the selection of a character string candidate or an operation command candidate to the communication unit 42 for indicating the event to the information processing system 10.

S61*c*: The communication unit 42 transmits the event of the selection of a character string candidate or an operation command candidate to the information processing system 10.

S61*d*: The communication unit 43 of the information processing system 10 receives the event of the selection of a character string candidate or an operation command candidate and transmits the event of the selection of a character string candidate or an operation command candidate to the handwriting input display control unit 23. Steps S62-S66 are the corresponding steps in the first embodiment described above.

S67*a*: The handwriting input display control unit 23 transmits an instruction to delete the selectable candidate display data to the communication unit 43.

S67*b*: The communication unit 43 transmits the instruction to delete the selectable candidate display data to the handwriting input apparatus 2.

S67*c*: The communication unit 42 of the handwriting input apparatus 2 receives the instruction to delete the selectable candidate display data and transmits the instruction to delete the selectable candidate display data to the display control unit 44.

S67*d*: The display control unit 44 receives the instruction to delete the selectable candidate display data and causes the display unit 22 to delete the selectable candidates.

S68*a*: The handwriting input display control unit 23 transmits an instruction to delete the rectangular area outline data of the handwriting object and the selected object(s) to the communication unit 43.

S68*b*: The communication unit 43 transmits the instruction to delete the rectangular area outline data of the handwriting object and the selected object(s) to the handwriting input apparatus 2.

S68*c*: The communication unit 42 of the handwriting input apparatus 2 receives the instruction to delete the rectangular area outline data of the handwriting object and the selected object(s) and transmits the instruction to delete the rectangular area outline data of the handwriting object and the selected object(s) to the display control unit 44.

S68*d*: The display control unit 44 receives the instruction to delete the rectangular area outline data of the handwriting object and the selected object(s) and thus causes the display unit 22 to delete the rectangular area outline data of the handwriting object and the selected object(s).

S69*a*: The handwriting input display control unit 23 transmits an instruction to delete the handwriting object display data to the communication unit 43.

S69*b*: The communication unit 43 transmits the instruction to delete the handwriting object display data to the handwriting input apparatus 2.

S69*c*: The communication unit 42 of the handwriting input apparatus 2 receives the instruction to delete the handwriting object display data and transmits the instruction to delete the handwriting object display data to the display control unit 44.

S69*d*: The display control unit 44 receives the instruction to delete the handwriting object display data and thus causes the display unit 22 to delete the display of the handwriting object and the pen coordinate interpolation display data. Step S70 may be the same as the corresponding step in the first embodiment described above.

In response to a character string candidate being selected, steps S71-S73 are executed. Steps S71 and S72 may be the same as the corresponding steps in the first embodiment described above.

S73*a*: The handwriting input display control unit 23 transmits character string object display data to be displayed at the same position as the position of the handwriting object to the communication unit 43 using the defined font received from the handwriting input storage unit 25.

S73*b*: The communication unit 43 transmits the character string object display data to the handwriting input apparatus 2.

S73*c*: The communication unit 42 of the handwriting input apparatus 2 receives the character string object display data and transmits the character string object display data to the display control unit 44.

S73*d*: The display control unit 44 receives the character string object display data and causes the display unit 22 to display the character string object.

In response to an operation command candidate being selected, steps S74-S78 are executed. Steps S74-S76 are executed for a case where there is a selected object(s).

S74*a*: In response to an operation command candidate for a selected object(s) being selected (for a case where the selected object(s) exists), the handwriting input display control unit 23 transmits an instruction to delete the selected object display data to the communication unit 43. This is because the display of the original selected object(s) is to be deleted at this time.

S74*b*: The communication unit 43 transmits the instruction to delete the selected object display data to the handwriting input apparatus 2.

S74*c*: The communication unit 42 of the handwriting input apparatus 2 receives the instruction to delete the selected object display data and transmits the instruction to delete the selected object display data to the display control unit 44.

S74*d*: The display control unit 44 receives the instruction to delete the selected object display data and causes the display unit 22 to delete the display of the selected object(s).

S75: The handwriting input display control unit 23 then transmits an instruction to execute the operation command on the selected object(s) to the handwriting input storage unit 25. The handwriting input storage unit 25 transmits display data of the new selected object(s) (display data of the selected object(s) having been edited or modified according to the operation command) to the handwriting input display control unit 23.

S76*a*: The handwriting input display control unit 23 transmits the selected object display data to the communication unit 43.

S76*b*: The communication unit 43 transmits the selected object display data to the handwriting input apparatus 2.

S76*c*: The communication unit 42 of the handwriting input apparatus 2 receives the selected object display data and transmits the selected object display data to the display control unit 44.

S76*d*: The display control unit 44 receives the selected object display data, and thus, causes the display unit 22 to newly displays the selected object(s) after being processed according to the operation command. Steps S77-S79 may be the same as the corresponding steps in the first embodiment described above.

As described above, even in the system configuration of the present embodiment where the handwriting input apparatus 2 and the information processing system 10 communicate with each other, the same advantageous effect as the advantageous effect of the first embodiment can be obtained. The processing flows of FIGS. 41-48 are an example, and processes to be executed with respect to the handwriting input apparatus 2 and the information processing system 10 communicating with each other may be included or omitted. Some of the processes performed by the information processing system 10 may be instead performed by the handwriting input apparatus 2. For example, the handwriting input apparatus 2 may perform processes with respect to deleting.

<Other Applications>

Thus, the handwriting input apparatuses, handwriting input methods, and non-transitory recording media have been described with reference to the specific embodiments. However, the present invention is not limited to the specific embodiments, and various modifications, substitutions, and so forth, may be made without departing from the scope of the claimed invention.

For example, although an electronic blackboard has been described in embodiments as an example, an information processing apparatus having a touch panel can be suitably used. An information processing apparatus having a touch panel may be, for example, an output apparatus such as a PJ (Projector) or a digital signage, a HUD (Head Up Display), an industrial machine, an imaging apparatus, a sound collector, a medical apparatus, a network home appliance, a notebook-type PC (Personal Computer), a cellular phone, a smartphone, a tablet terminal, a game machine, a PDA (Personal Digital Assistant), a digital camera, a wearable PC, or a desktop PC.

In the embodiments, the coordinates of the tip of the pen are detected by the touch panel, but the coordinates of the tip of the pen may be detected by ultrasound. In this case, the pen emits ultrasonic waves together with light emission, and the handwriting input apparatus 2 calculates the distance according to the time of arrival of the ultrasonic waves. The position of the pen can be identified from the direction and the distance. A projector draws (projects) the moving pen's path as a stroke.

In the embodiments, for a case where there is a selected object(s), operation command candidates of an editing system and a modifying system are displayed, whereas for a case where there is no selected object, operation command candidates of an input/output system are displayed. However, operation command candidates of an editing system and a modifying system and operation command candidates of an input/output system may be displayed at the same time.

The configuration example of FIG. 7, for example, is an example where, in order to facilitate understanding of processes executed by the handwriting input apparatus 2, functions are classified on a per-main function basis. However, embodiments of the present invention are not limited to the specific method of classifying the processing units or to the specific names of the processing units. The processes of the handwriting input apparatus 2 can be classified more finely depending on actual processing contents. Alternatively, it is possible to classify the functions in such a manner that each processing unit include more processes.

Each of the functions of the embodiments described above may be implemented by one or more processing circuits. A "processing circuit" or a "processing unit" described herein may be a processor programmed to perform each function by software, such as a processor implemented in electronic circuits, a device such an ASIC (Application Specific Integrated Circuit) designed to perform each function as described above, a digital signal processor (DSP), a field programmable gate array (FPGA), or a conventional circuit module.

The pen ID control data storage unit 36 is an example of a control data storage unit. The handwriting input display control unit 23 is an example of a display control unit. The handwriting recognition control unit 26 is an example of a handwriting identification control unit. The communication unit 42 is an example of a first communication unit. The communication unit 43 is an example of a second communication means.

Numerous additional modifications and variations are possible in light of the above teachings. It is therefore to be understood that, within the scope of the appended claims, the disclosure of this patent specification may be practiced otherwise than as specifically described herein.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by preparation of application-specific integrated circuits or by interconnecting an appropriate network of conventional component circuits, as will be readily apparent to those skilled in the relevant art.

Each of the functions of the described embodiments may be implemented by one or more processing circuits. A processing circuit includes a programmed processor. A processing circuit also includes devices such as an application specific integrated circuit (ASIC) and conventional circuit components arranged to perform the recited functions.

The processing circuitry is implemented as at least a portion of a microprocessor. The processing circuitry may be implemented using one or more circuits, one or more microprocessors, microcontrollers, application specific integrated circuits, dedicated hardware, digital signal processors, microcomputers, central processing units, field programmable gate arrays, programmable logic devices, state machines, super computers, or any combination thereof. Also, the processing circuitry may include one or more software modules executable within one or more processing circuits. The processing circuitry may further include a memory configured to store instructions and/or code that causes the processing circuitry to execute functions.

If embodied in software, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

The above-described embodiments are applicable to a character and a character string of other than Japanese such as other language like English, Chinese, German, Portuguese, and so on.

The present application is based on and claims the benefit of priority of Japanese patent application No. 2019-075825 filed on Apr. 11, 2019 and Japanese patent application No. 2020-051620 filed on Mar. 23, 2020. The entire contents of Japanese patent application No. 2019-075825 and Japanese patent application No. 2020-051620 are hereby incorporated herein by reference.

What is claimed is:

1. A handwriting input apparatus comprising processing circuitry configured to:
- receive identification information from an input device;
- cause control data with respect to the input device to be stored in association with the received identification information of the input device;
- reflect the control data associated with the received identification information in handwritten stroke data based on a position of the input device in contact with a touch panel and displayed, and display information based on the stroke data on a display unit, wherein
  - the control data includes angle information of a user using the input device, the angle information indicating an angle of a position of the user relative to a predetermined direction with respect the handwriting input apparatus, and
  - the circuitry is further configured to
    - reflect the angle information in the stroke data and display the information based on the stroke data;
    - rotate the stroke data on the basis of the angle information;
    - identify the stroke data;
    - convert the stroke data into one or more sets of text data; and

- display the one or more sets of text data as the information based on the stroke data.

2. The handwriting input apparatus according to claim 1, wherein the processing circuitry is further configured to
- display the information based on the stroke data in accordance with the position of the user.

3. The handwriting input apparatus according to claim 1, wherein
- the control data further includes position information of the user using the input device, and
- the processing circuitry is further configured to
  - reflect the position information in the stroke data and display the information based on the stroke data.

4. The handwriting input apparatus according to claim 1, wherein the processing circuitry is further configured to
- rotate the one or more sets of text data based on the angle information and display the rotated one or more sets of text data as the information based on the stroke data.

5. The handwriting input apparatus according to claim 4, wherein the processing circuitry is further configured to
- display, together with the one or more sets of text data, an operation header configured to receive the user's operation, and
- rotate the one or more sets of text data and the operation header based on the angle information and display the rotated one or more sets of text data and the operation header as the information based on the stroke data.

6. The handwriting input apparatus according to claim 1, wherein the processing circuitry is further configured to
- cause the angle information determined based on an angle formed by a line handwritten in a predetermined area and the predetermined direction to be stored in association with the received identification information when the stroke data of the line is handwritten.

7. The handwriting input apparatus according to claim 6, wherein
- the predetermined area is an area in which the one or more sets of text data obtained from the converting is displayed, and
- the processing circuitry is further configured to detect the line from the predetermined area, whereas, to convert the stroke data handwritten outside the predetermined area into the one or more sets of text data.

8. The handwriting input apparatus according to claim 1, wherein
- the angle information is determined based on an end point direction of a line that is handwritten in a predetermined area, and
- the processing circuitry is further configured to
  - cause the angle information to be stored in association with the received identification information of the input device when the stroke data of the line is handwritten.

9. The handwriting input apparatus according to claim 8, wherein
- the predetermined area is an area in which the one or more sets of text data obtained from the converting is displayed, and
- the processing circuitry is further configured to detect the line from the predetermined area, whereas, to convert the stroke data handwritten outside the predetermined area into the one or more sets of text data.

10. The handwriting input apparatus according to claim 1, wherein
- an operation header, configured to receive the user's operation, displayed together with the one or more sets of text data includes a rotating operation button configured to receive the angle information, and the processing circuitry is further configured to cause the angle information associated with the received identification information of the input device to be stored when the rotating operation button is pressed.

11. The handwriting input apparatus according to claim 1, wherein the processing circuitry is further configured to set the angle information in units of 90 degrees or 45 degrees.

12. The handwriting input apparatus according to claim 1, wherein the processing circuitry is further configured to display one set of text data selected by the user from among the one or more sets of text data that are rotated and displayed, display plural sets of text data respectively selected by plural users, and in response to detecting a user's predetermined operation, display the plural sets of text data together in the same orientation.

13. The handwriting input apparatus according to claim 1, wherein the processing circuitry is further configured to display an operation guide, including the one or more sets of text data, at a position depending on a position of the stroke data.

14. The handwriting input apparatus according to claim 1, wherein the processing circuitry is further configured to display an operation guide, including the one or more sets of text data, at a position in a display screen determined based on a position of the stroke data.

15. A handwriting input method for causing processing circuitry to receive identification information from an input device;

obtain control data with respect to the input device;

store the obtained control data in association with the received identification information of the input device; and reflect the control data associated with the received identification information in handwritten stroke data based on a position of the input device in contact with a touch panel of a handwriting input apparatus and displayed, and display information based on the stroke data on a display unit of the handwriting input apparatus, wherein the control data includes angle information of a user using the input device, the angle information indicating an angle of a position of the user relative to a predetermined direction with respect the handwriting input apparatus, and the method further causes the processing circuitry to reflect the angle information in the stroke data and display the information based on the stroke data;

rotate the stroke data on the basis of the angle information;

identify the stroke data;

convert the stroke data into one or more sets of text data; and display the one or more sets of text data as the information based on the stroke data.

16. A non-transitory recording medium storing a program when executed by processing circuitry of a handwriting input apparatus causing the processing circuitry to perform communication with an input device to receive identification information of input device; and obtain control data with respect to the input device;

store the obtained control data in association with the received identification information of the input device, to reflect the control data associated with the received identification information in handwritten stroke data based on a position of the input device in contact with a touch panel of the handwriting input apparatus and displayed, and display information based on the stroke data on a display unit, wherein the control data includes angle information of a user using the input device, the angle information indicating an angle of a position of the user relative to a predetermined direction with respect the handwriting input apparatus, and the program further causes the processing circuitry to reflect the angle information in the stroke data and display the information based on the stroke data;

rotate the stroke data on the basis of the angle information;

identify the stroke data;

convert the stroke data into one or more sets of text data; and display the one or more sets of text data as the information based on the stroke data.

* * * * *